US011082893B2

(12) United States Patent
Zhu et al.

(10) Patent No.: US 11,082,893 B2
(45) Date of Patent: Aug. 3, 2021

(54) SESSION MIGRATION METHOD AND DEVICE APPLIED TO A UE TRACKING AREA UPDATE

(71) Applicant: HUAWEI TECHNOLOGIES CO., LTD., Guangdong (CN)

(72) Inventors: Fangyuan Zhu, Beijing (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/563,346

(22) Filed: Sep. 6, 2019

(65) Prior Publication Data
US 2019/0394682 A1 Dec. 26, 2019

Related U.S. Application Data

(63) Continuation of application No. PCT/CN2017/075904, filed on Mar. 7, 2017.

(51) Int. Cl.
*H04W 4/00* (2018.01)
*H04W 36/00* (2009.01)
(Continued)

(52) U.S. Cl.
CPC ... *H04W 36/0016* (2013.01); *H04W 36/0033* (2013.01); *H04W 36/08* (2013.01); *H04W 36/32* (2013.01)

(58) Field of Classification Search
CPC ......... H04W 36/0016; H04W 36/0033; H04W 36/08; H04W 36/32
See application file for complete search history.

(56) References Cited

U.S. PATENT DOCUMENTS

| 2011/0039562 A1 | 2/2011 | Balasubramanian et al. |
| 2011/0045834 A1* | 2/2011 | Kim ............. H04W 36/0011 455/438 |

(Continued)

FOREIGN PATENT DOCUMENTS

| CN | 101094096 A | 12/2007 |
| CN | 102740268 A | 10/2012 |

(Continued)

OTHER PUBLICATIONS

MediaTek et al.,"Removal of "WB-E-UTRA" terminology",SA WG2 Meeting #113AH S2-161000,Feb. 23-26, 2016, Sophia Antipolis, France,Draft Change Request 23.401,Current version:13.5.0,total 20 pages.

(Continued)

*Primary Examiner* — Abdelnabi O Musa
(74) *Attorney, Agent, or Firm* — Womble Bond Dickinson (US) LLP

(57) ABSTRACT

Embodiments of this application provide a session migration method and a device. The method includes: determining, by a source session management function entity, whether to update a session of a terminal device; and if the source session management function entity determines to update the session of the terminal device, retaining, by the source session management function entity, a context of a first session, and sending instruction information to a first device, where the instruction information is used to instruct the first device to trigger creation of a second session after the first device obtains to-be-sent data of the terminal device, the first session is a session created between the source session management function entity and the terminal device, the first device is the terminal device or a target mobility management function entity, and the second session is a session (Continued)

between a target session management function entity and the terminal device.

17 Claims, 51 Drawing Sheets

(51) Int. Cl.
*H04W 36/08* (2009.01)
*H04W 36/32* (2009.01)

(56) References Cited

U.S. PATENT DOCUMENTS

| | | | |
|---|---|---|---|
| 2011/0122845 A1* | 5/2011 | Meirosu | H04W 36/0055 370/332 |
| 2012/0120932 A1 | 5/2012 | Liang et al. | |
| 2014/0160938 A1* | 6/2014 | Qu | H04W 8/065 370/236 |
| 2015/0139078 A1* | 5/2015 | Suh | H04W 8/26 370/328 |
| 2015/0156660 A1 | 6/2015 | Luo | |
| 2015/0282017 A1* | 10/2015 | Wang | H04W 72/0406 370/331 |
| 2015/0296557 A1 | 10/2015 | Kim et al. | |
| 2017/0078874 A1* | 3/2017 | Lee | H04W 12/0017 |
| 2018/0092154 A1 | 3/2018 | Ai | |
| 2019/0223060 A1* | 7/2019 | Zhou | H04W 36/0022 |
| 2020/0145953 A1* | 5/2020 | Youn | H04W 60/04 |

FOREIGN PATENT DOCUMENTS

| | | |
|---|---|---|
| CN | 103428668 A | 12/2013 |
| CN | 104660550 A | 5/2015 |
| CN | 104936237 A | 9/2015 |
| CN | 105075304 A | 11/2015 |
| CN | 106162705 A | 11/2016 |

OTHER PUBLICATIONS

Samsung,"Update to Solution 4.25: Local Area Data Network",SA WG2 Meeting #S2-117 S2-165546,Oct. 17-21, 2016, Kaohsiung, Taiwan,total 6 pages.

Huawei et al.,"Update Solution to 4.19: Infrequent small user data transfer via control plane",SA WG2 Meeting #116BIS S2-164515,Aug. 29-Sep. 2, 2016, Sanya, China,total 3 pages.

* cited by examiner

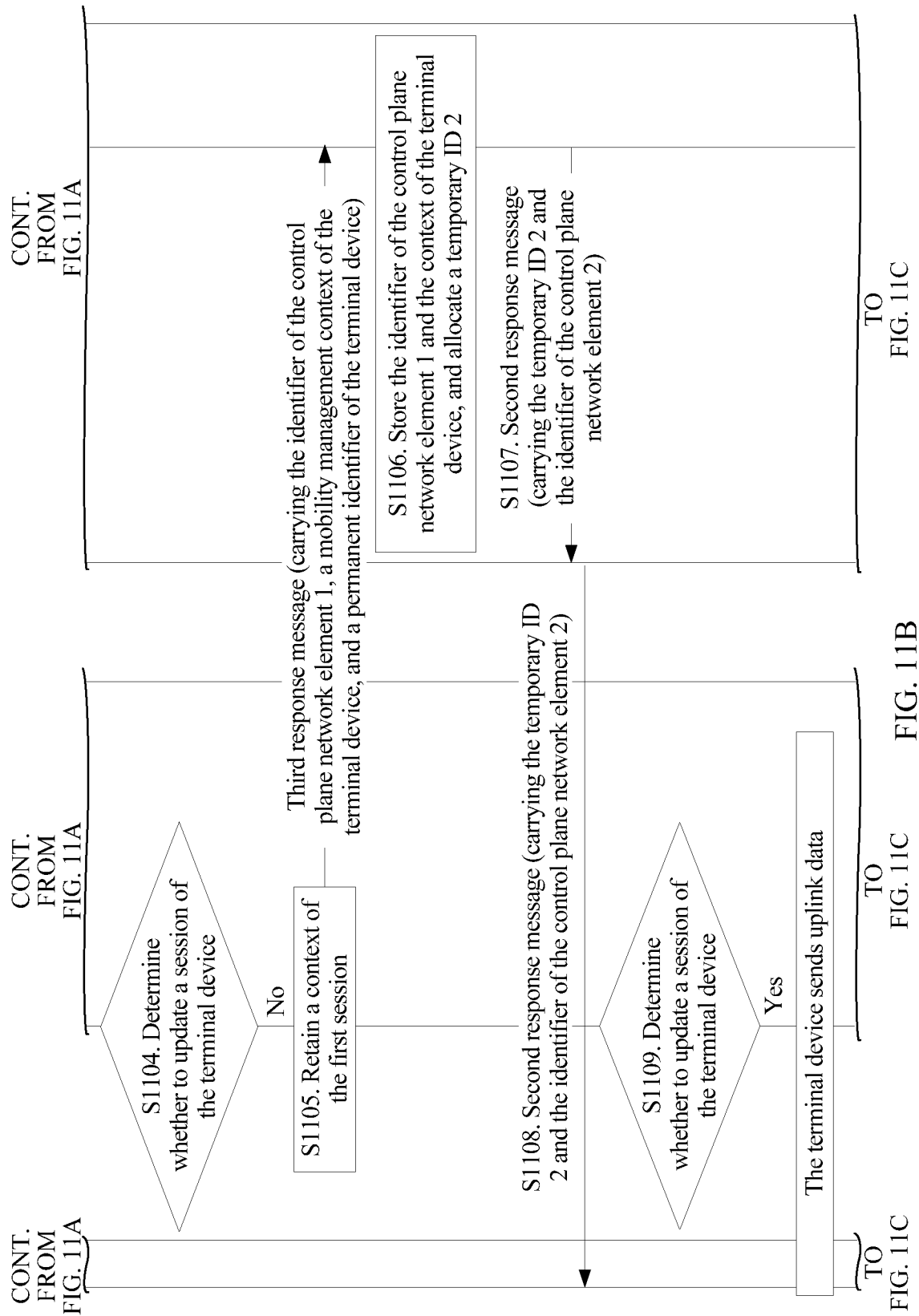

SESSION MIGRATION METHOD AND DEVICE APPLIED TO A UE TRACKING AREA UPDATE

CROSS-REFERENCE TO RELATED APPLICATIONS

This application is a continuation of International Application No. PCT/CN2017/075904, filed on Mar. 7, 2017, the disclosure of which is hereby incorporated by reference in its entirety.

TECHNICAL FIELD

Embodiments of this application relate to the field of communications technologies, and in particular, to a session migration method and a device.

BACKGROUND

With rapid development of communications technologies, a next-generation wireless communications system (for example, a narrowband internet of things (NB-IOT) system) emerges. In the next-generation wireless communications system, data transmitted between a terminal device and a core network device may be small data, and a service for transmitting the small data is usually referred to as a small packet service. The small packet service has a relatively low requirement on both a latency and quality of service (QoS). Therefore, a session between the terminal device and the core network device does not need to always be kept continuous.

In the prior art, if a session has been created between a terminal device in a first tracking area (TA) and a source core network device, in a scenario in which the terminal device moves from the first TA to a second TA, the source core network device releases the session between the source core network device and the terminal device, and instructs the terminal device to initiate a session create request to a target core network device, to create a session between the terminal device and the target core network device, so that the terminal device can transmit data of the terminal device by using the target core network device, where a service area of the source core network device includes the first TA, and a service area of the target core network device includes the second TA.

However, before the session is created between the terminal device and the target core network device, the session between the source core network device and the terminal device is released. Therefore, a packet loss may occur in downlink data to be sent to the terminal device. In addition, after the terminal device moves to the second TA, the session between the terminal device and the target core network device is created. If the terminal device does not transmit data in the second TA, waste of core network resources and unnecessary signaling transmission are caused.

SUMMARY

This application provides a session migration method and a device, to ensure that no packet loss occurs in downlink data after a TA of a terminal device changes, and reduce waste of core network resources and signaling transmission.

To achieve the foregoing objective, the following technical solutions are used in this application.

According to a first aspect, a session migration method is provided. A source session management function entity first determines whether to update a session of a terminal device. Then, if the source session management function entity determines to update the session of the terminal device, the source session management function entity retains a context of a first session created between the source session management function entity and the terminal device, and sends instruction information to a first device, where the instruction information is used to instruct the first device to trigger creation of a second session after the first device obtains to-be-sent data of the terminal device, the first device is the terminal device or a target mobility management function entity, and the second session is a session between a target session management function entity and the terminal device.

Before the second session is created, the source session management function entity retains the context of the first session. Therefore, even if there is downlink data to be sent to the terminal device, the downlink data can be accurately sent to the terminal device, so that no packet loss occurs in the downlink data. In addition, creation of the second session is triggered by the terminal device or the target mobility management function entity after the terminal device or the target mobility management function entity obtains to-be-sent data of the terminal device. Therefore, a case in which the second session is created but no data is transmitted does not occur, so that waste of core network resources and unnecessary signaling transmission are reduced.

In one embodiment, after the source session management function entity sends the instruction information to the first device, the source session management function entity further receives a first notification message from the target mobility management function entity. In this case, after receiving the first notification message, the source session management function entity releases the context of the first session.

After the source session management function entity sends the instruction information to the first device, the first device triggers creation of the second session after obtaining to-be-sent data of the terminal device. After the second session is created, the source session management function entity further receives the first notification message from the target mobility management function entity, and releases the context of the first session according to the first notification message, so that resource waste of the source session management function entity is reduced.

In one embodiment, in an application scenario in which the first device is the terminal device, the source session management function entity may send, to a source mobility management function entity, a first response message that carries the instruction information, where the instruction information is sent to the terminal device, and the instruction information is used to instruct the terminal device to send information used to trigger creation of the second session to the target mobility management function entity after the terminal device obtains to-be-sent data of the terminal device.

In one embodiment, in an application scenario in which the first device is the target mobility management entity, the source session management function entity may send, to a source mobility management function entity, a first response message that carries the instruction information, where the instruction information is sent to the target mobility management entity, and the instruction information is used to instruct the target mobility management function entity to select the target session management function entity after the target mobility management function entity obtains to-be-sent uplink data of the terminal device, to trigger creation of the second session.

In one embodiment, a method for sending the instruction information to the first device by the source session management function entity may be as follows: The source session management function entity receives uplink data from the terminal device, obtains an uplink data answer message, adds the instruction information to the uplink data answer message, and sends, to the first device, the uplink data answer message that carries the instruction information.

It can be learned that methods for sending the instruction information by the source session management function entity are different in different application scenarios.

In one embodiment, the source session management function entity further receives, from the source mobility management function entity, a second notification message that carries an identifier of the target mobility management function entity. In this case, a method for determining whether to update the session of the terminal device by the source session management function entity is as follows: The source session management function entity determines, based on a first condition, whether to update the session of the terminal device. The first condition herein includes that an identifier of the source mobility management function entity is different from the identifier of the target mobility management.

In one embodiment, the first condition further includes that an amount of uplink data received by the source session management function entity in a preset time period is greater than or equal to a preset threshold.

According to a second aspect, a session management function entity is provided. The session management function entity is a source session management function entity, and the session management function entity includes a processing unit and a sending unit.

Functions implemented by each unit module provided in this application are as follows:

The processing unit is configured to: determine whether to update a session of a terminal device, and if it is determined to update the session of the terminal device, retain a context of a first session, where the first session is a session created between the source session management function entity and the terminal device. The sending unit is configured to: if the processing unit determines to update the session of the terminal device, send instruction information to a first device, where the instruction information is used to instruct the first device to trigger creation of a second session after the first device obtains to-be-sent data of the terminal device, the first device is the terminal device or a target mobility management function entity, and the second session is a session between a target session management function entity and the terminal device Further, the session management function entity in this embodiment of this application further includes a receiving unit. The receiving unit is configured to: after the sending unit sends the instruction information to the first device, receive a first notification message from the target mobility management function entity. Correspondingly, the processing unit is further configured to: after the receiving unit receives the first notification message, release the context of the first session.

Further, in one embodiment, in an application scenario in which the first device is the terminal device, the sending unit is configured to send, to a source mobility management function entity, a first response message that carries the instruction information, where the instruction information is sent to the terminal device, and the instruction information is used to instruct the terminal device to send information used to trigger creation of the second session to the target mobility management function entity after the terminal device obtains to-be-sent data of the terminal device. In an application scenario in which the first device is the target mobility management entity, the sending unit is configured to send, to a source mobility management function entity, a first response message that carries the instruction information, where the instruction information is sent to the target mobility management entity, and the instruction information is used to instruct the target mobility management function entity to select the target session management function entity after the target mobility management function entity obtains to-be-sent uplink data of the terminal device, to trigger creation of the second session.

Further, the session management function entity in this embodiment of this application further includes the receiving unit. The receiving unit is configured to: receive uplink data from the terminal device, and obtain an uplink data answer message. Correspondingly, the processing unit is further configured to add the instruction information to the uplink data answer message obtained by the receiving unit. The sending unit is configured to send, to the first device, the uplink data answer message that carries the instruction information.

Further, the session management function entity in this embodiment of this application further includes the receiving unit. The receiving unit is configured to receive a second notification message from the source mobility management function entity, where the second notification message carries an identifier of the target mobility management function entity. Correspondingly, the processing unit is configured to determine, based on a first condition, whether to update the session of the terminal device, where the first condition includes that an identifier of the source mobility management function entity is different from the identifier of the target mobility management that is carried in the second notification message received by the receiving unit.

Further, in one embodiment, the first condition further includes that an amount of uplink data received by the receiving unit in a preset time period is greater than or equal to a preset threshold.

According to a third aspect, a session management function entity is provided. The session management function entity is the foregoing source session management function entity, and the session management function entity includes a processor, a memory, and a communications interface. The memory is configured to store computer program code, the computer program code includes an instruction, and the processor, the communications interface, and the memory are connected to each other by using a bus. When the session management function entity runs, the processor executes the instruction stored in the memory, so that the session management function entity performs the session migration method according to any of the embodiments.

According to a fourth aspect, a computer storage medium is provided. The computer storage medium stores computer program code. When the processor in the session management function entity in the third aspect executes the computer program code, the session management function entity performs the session migration method according to any of the embodiments.

According to a fifth aspect, a computer program product including an instruction is further provided. When the computer program product runs on a session management function entity, the session management function entity performs the session migration method according to any of the embodiments.

In this application, a name of the session management function entity constitutes no limitation on devices or functional modules. The devices or the functional modules may have other names in actual implementation. All devices or functional modules with functions similar to those in this application fall within the scope defined by the claims of this application and equivalent technologies of this application.

For detailed descriptions of the second aspect, the third aspect, the fourth aspect, the fifth aspect, and the implementations thereof in this application, refer to detailed descriptions of the first aspect and the implementations of the first aspect. In addition, for beneficial effects of the second aspect, the third aspect, the fourth aspect, the fifth aspect, and the implementations thereof, refer to analysis of beneficial effects in the first aspect and the implementations of the first aspect.

According to a sixth aspect, a session migration method is provided. A terminal device creates a first session between the terminal device and a source session management function entity, where a service area of the source session management function entity includes a first tracking area (TA). The terminal device obtains instruction information after moving from the first TA to a second TA, and sends information used to trigger creation of a second session to a target mobility management function entity according to the instruction information, where the second session is a session between a target session management function entity and the terminal device, and both a service area of the target mobility management function entity and a service area of the target session management function entity include the second TA.

In one embodiment, a method for obtaining the instruction information by the terminal device may be as follows: The terminal device sends a first request message to the target mobility management function entity, and correspondingly, the terminal device receives, from the target mobility management function entity, a second response message that carries the instruction information; or the terminal device receives, from the target mobility management function entity, an uplink data answer message that carries the instruction information.

In one embodiment, in an application scenario in which the terminal device receives the second response message that carries the instruction information or receives the uplink data answer message that carries the instruction information, the information used to trigger creation of the second session is a session create request. In this case, a method for sending the information used to trigger creation of the second session to the target mobility management function entity by the terminal device according to the instruction information is as follows: The terminal device sends the session create request to the target mobility management function entity according to the instruction information after obtaining to-be-sent data of the terminal device.

In this application scenario, creation of the second session is triggered by the terminal device after the terminal device obtains to-be-sent data of the terminal device. Therefore, a case in which the second session is created but no data is transmitted does not occur, so that waste of core network resources and unnecessary signaling transmission are reduced.

In one embodiment, a method for obtaining the instruction information by the terminal device may be as follows: The terminal device receives downlink data that carries the instruction information.

In one embodiment, in an application scenario in which the terminal device receives the downlink data that carries the instruction information, the information used to trigger creation of the second session is a session create request or a first uplink registration packet. In this case, a method for sending the information used to trigger creation of the second session to the target mobility management function entity by the terminal device according to the instruction information is as follows: After receiving the instruction information, the terminal device sends the session create request or the first uplink registration packet to the target mobility management function entity.

In the application scenario in which the terminal device receives the downlink data that carries the instruction information, because there is downlink data that needs to be transmitted, the instruction information is used to instruct the terminal device to send the session create request or the first uplink registration packet to the target mobility management function entity immediately after the terminal device obtains the instruction information, to trigger creation of the second session.

In one embodiment, in the application scenario in which the terminal device receives the downlink data that carries the instruction information, if the information used to trigger creation of the second session is a session create request, the terminal device further sends a second uplink registration packet to the target mobility management function entity, where the second registration packet is used to instruct the target mobility management function entity to instruct an application server to update a downlink transmission path, and the downlink transmission path is a path used to transmit downlink data to be sent to the terminal device.

According to a seventh aspect, a terminal device is provided. The terminal device includes a processing unit, an obtaining unit, and a sending unit.

Functions implemented by each unit module provided in this application are as follows:

The processing unit is configured to create a first session between the terminal device and a source session management function entity, where a service area of the source session management function entity includes a first tracking area (TA). The obtaining unit is configured to obtain instruction information after the terminal device moves from the first TA to a second TA. The sending unit is configured to send information used to trigger creation of a second session to a target mobility management function entity according to the instruction information obtained by the obtaining unit, where the second session is a session between a target session management function entity and the terminal device, and both a service area of the target mobility management function entity and a service area of the target session management function entity include the second TA.

Further, in one embodiment, the sending unit is further configured to send a first request message to the target mobility management function entity, and correspondingly, the obtaining unit is configured to receive, from the target mobility management function entity, a second response message that carries the instruction information. In one embodiment, the obtaining unit is configured to receive, from the target mobility management function entity, an uplink data answer message that carries the instruction information.

Further, in one embodiment, the information used to trigger creation of the second session is a session create request, and the sending unit is configured to send the session create request to the target mobility management function entity according to the instruction information after to-be-sent data of the terminal device is obtained.

Further, in one embodiment, the obtaining unit is configured to receive downlink data that carries the instruction information.

Further, in one embodiment, if the obtaining unit is configured to receive the downlink data that carries the instruction information, the information used to trigger creation of the second session is a session create request or a first uplink registration packet. Correspondingly, the sending unit is configured to: after the obtaining unit receives the instruction information, send the session create request or the first uplink registration packet to the target mobility management.

Further, in one embodiment, the sending unit is further configured to send a second uplink registration packet to the target mobility management function entity, where the second registration packet is used to instruct the target mobility management function entity to instruct an application server to update a downlink transmission path, and the downlink transmission path is a path used to transmit downlink data to be sent to the terminal device.

According to an eighth aspect, a terminal device is provided. The terminal device includes a processor, a memory, and a communications interface. The memory is configured to store computer program code, the computer program code includes an instruction, and the processor, the communications interface, and the memory are connected to each other by using a bus. When the terminal device runs, the processor executes the instruction stored in the memory, so that the terminal device performs the session migration method according to any of the embodiments.

According to a ninth aspect, a computer storage medium is provided. The computer storage medium stores computer program code. When the processor in the terminal device in the eighth aspect executes the computer program code, the terminal device performs the session migration method according to any of the embodiments.

According to a tenth aspect, a computer program product including an instruction is further provided. When the computer program product runs on a terminal device, the terminal device performs the session migration method according to any of the embodiments.

In this application, a name of the terminal device constitutes no limitation on devices or functional modules. The devices or the functional modules may have other names in actual implementation. All devices or functional modules with functions similar to those in this application fall within the scope defined by the claims of this application and equivalent technologies of this application.

For detailed descriptions of the seventh aspect, the eighth aspect, the ninth aspect, the tenth aspect, and the implementations thereof in this application, refer to detailed descriptions of the sixth aspect and the implementations of the sixth aspect. In addition, for beneficial effects of the seventh aspect, the eighth aspect, the ninth aspect, the tenth aspect, and the implementations thereof, refer to analysis of beneficial effects in the sixth aspect and the implementations of the sixth aspect.

According to an eleventh aspect, a session migration method is provided. After obtaining instruction information, a target mobility management function entity selects a target session management function entity according to the obtained instruction information after obtaining to-be-sent uplink data of a terminal device, to trigger creation of a second session, where the second session is a session between the target session management function entity and the terminal device.

Creation of the second session is triggered by the target mobility management function entity after the target mobility management function entity obtains to-be-sent uplink data of the terminal device. Therefore, a case in which the second session is created but no data is transmitted does not occur, so that waste of core network resources and unnecessary signaling transmission are reduced.

In one embodiment, a method for obtaining the instruction information by the target mobility management function entity may be as follows: The target mobility management function entity sends a second request message to a source mobility management function entity, and correspondingly, the target mobility management function entity receives, from the source mobility management function entity, a third response message that carries the instruction information; or the target mobility management function entity receives, from a source session management function entity, an uplink data answer message that carries the instruction information.

In one embodiment, after the second session is created, the target mobility management function entity further sends a first notification message to the source session management function entity, to instruct the source session management function entity to release a context of a first session, where the first session is a session created between the terminal device and the source session management function entity before the terminal device moves.

According to a twelfth aspect, a mobility management function entity is provided. The mobility management function entity is the foregoing target mobility management function entity, and the mobility management function entity includes an obtaining unit and a processing unit.

Functions implemented by each unit module provided in this application are as follows:

The obtaining unit is configured to obtain instruction information. The processing unit is configured to select, according to the instruction information obtained by the obtaining unit, a target session management function entity after to-be-sent uplink data of a terminal device is obtained, to trigger creation of a second session, where the second session is a session between the target session management function entity and the terminal device.

The mobility management function entity in this embodiment of this application further includes a sending unit. The sending unit is configured to send a second request message to a source mobility management function entity, and correspondingly, the obtaining unit is configured to receive, from the source mobility management function entity, a third response message that carries the instruction information. In one embodiment, the obtaining unit is configured to receive, from a source session management function entity, an uplink data answer message that carries the instruction information.

The mobility management function entity in this embodiment of this application further includes the sending unit. The sending unit is configured to: after the second session is created, send, by the target mobility management function entity, a first notification message to the source session management function entity, where the first notification message is used to instruct the source session management function entity to release a context of a first session, and the first session is a session created between the terminal device and the source session management function entity before the terminal device moves.

According to a thirteenth aspect, a mobility management function entity is provided. The mobility management function entity is the foregoing target mobility management function entity, and the mobility management function entity includes a processor, a memory, and a communications interface. The memory is configured to store computer program code, the computer program code includes an instruction, and the processor, the communications interface, and the memory are connected to each other by using a bus. When the mobility management function entity runs, the processor executes the instruction stored in the memory, so that the mobility management function entity performs the session migration method according to any of the embodiments.

According to a fourteenth aspect, a computer storage medium is provided. The computer storage medium stores computer program code. When the processor in the mobility management function entity in the thirteenth aspect executes the computer program code, the mobility management function entity performs the session migration method according to any of the embodiments.

According to a fifteenth aspect, a computer program product including an instruction is further provided. When the computer program product runs on a mobility management function entity, the mobility management function entity performs the session migration method according to any of the embodiments.

In this application, a name of the mobility management function entity constitutes no limitation on devices or functional modules. The devices or the functional modules may have other names in actual implementation. All devices or functional modules with functions similar to those in this application fall within the scope defined by the claims of this application and equivalent technologies of this application.

For detailed descriptions of the twelfth aspect, the thirteenth aspect, the fourteenth aspect, the fifteenth aspect, and the implementations thereof in this application, refer to detailed descriptions of the eleventh aspect and the implementations of the eleventh aspect. In addition, for beneficial effects of the twelfth aspect, the thirteenth aspect, the fourteenth aspect, the fifteenth aspect, and the implementations thereof, refer to analysis of beneficial effects in the eleventh aspect and the implementations of the eleventh aspect.

These aspects or other aspects in the embodiments of this application are clearer and more comprehensible in the following descriptions.

DESCRIPTION OF DRAWINGS

FIG. 11A, FIG. 11B, and FIG. 11C are a schematic flowchart 9 of a session migration method according to an embodiment of this application;

DESCRIPTION OF EMBODIMENTS

The following describes in detail the technical solutions in the embodiments of this application with reference to the accompanying drawings in the embodiments of this application.

In the specification, claims, and accompanying drawings of this application, the terms "first", "second", "third", "fourth", and the like are intended to distinguish between different objects but do not indicate a particular order.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a suitable manner.

With development of communications technologies, a next-generation wireless communications system emerges. The next-generation wireless communications system is similar to a common communications system in that a terminal device is connected, by using a radio access network device and a core network device, to an application server located in an external data network.

Figure 1:
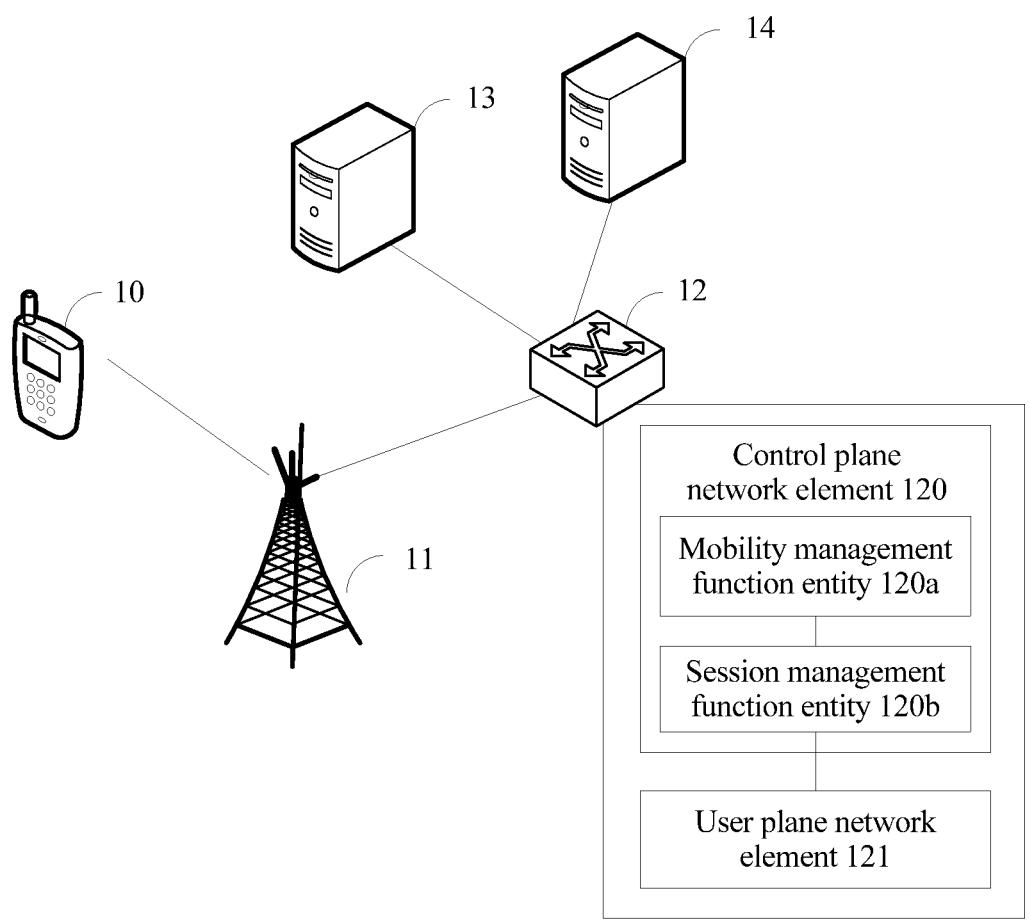
FIG. 1 is a schematic structural diagram of an existing next-generation wireless communications system.

As shown in FIG. 1, an existing next-generation wireless communications system includes a terminal device 10, a radio access network device 11, a core network device 12, and an application server 13. The terminal device 10 is connected to the radio access network device 11, the radio access network device 11 is further connected to the core network device 12, and the core network device 12 is connected to the application server 13. In actual application, connections between the foregoing plurality of devices are wireless connections. A solid line is used in FIG. 1 to conveniently and intuitively represent a connection relationship between devices.

A control plane function and a user plane function of the core network device 12 may be independently disposed, or may be integrated into a same device.

In this embodiment of this application, a control plane network element 120 represents a device that can implement the control plane function of the core network device 12, and a user plane network element 121 represents a device that can implement the user plane function of the core network device 12. Correspondingly, the control plane network element 120 and the user plane network element 121 may be independently disposed, or may be integrated into a same device. In a scenario in which the control plane network element 120 and the user plane network element 121 are independently disposed, the application server 13 is connected to the user plane network element 121.

The control plane network element 120 has a function of managing mobility of the terminal device, a function of managing a session of the terminal device, an internet protocol (IP) address allocation function, a function of generating a gateway user plane forwarding rule, and the like. The control plane network element 120 may be a mobility management entity (MME), may be a policy and charging rules function (PCRF) entity, or may be a device into which a function of MME, a function of a PCRF, and a function of another gateway are integrated.

The control plane network element 120 may include a mobility management (MM) function entity 120a and a session management (SM) function entity 120b. The mobility management function entity 120a and the session management function entity 120b may be independently disposed, or may be integrated into a same device.

The mobility management function entity 120a is responsible for attachment, mobility management, and a TA update of the terminal device, temporary identity (ID) allocation to the terminal device, authentication and authorization on the terminal device, and the like. The session management function entity 120b is responsible for selecting the user plane network element 121 for the terminal device, migrating the user plane network element 121, allocating an IP address, and the like.

In addition, the next-generation wireless communications system shown in FIG. 1 further includes a user data management (UDM) device 14. The UDM device 14 is connected to both the mobility management function entity 120a and the session management function entity 120b. The mobility management function entity 120a may obtain mobility management subscription data of the terminal device 10 from the UDM device 14, and the session management function entity 120b may obtain session management subscription data of the terminal device 10 from the UDM device 14.

In the next-generation wireless communications system shown in FIG. 1, when a data transmission service between the terminal device 10 and the core network device 12 is a small packet service, because the small packet service has a relatively low requirement on both a latency and QoS, a session between the terminal device 10 and the core network device 12 does not need to always be kept continuous.

A TA is used to locate a position of the terminal device. After the terminal device attaches to a network, a control plane network element in the network allocates a group of registered TAs, namely, a TA list, to the terminal device. When the terminal device enters a new TA (the terminal device determines that the TA list does not include the TA in which the terminal device is currently located), or after a periodic TA update timer of the terminal device expires, the terminal device initiates a TA update procedure. If a new TA is managed by another control plane network element after the terminal device moves to the new TA, the terminal device is triggered to initiate a cross-control plane network element TA update procedure. In this case, a session of the terminal device needs to be migrated.

Figure 2:
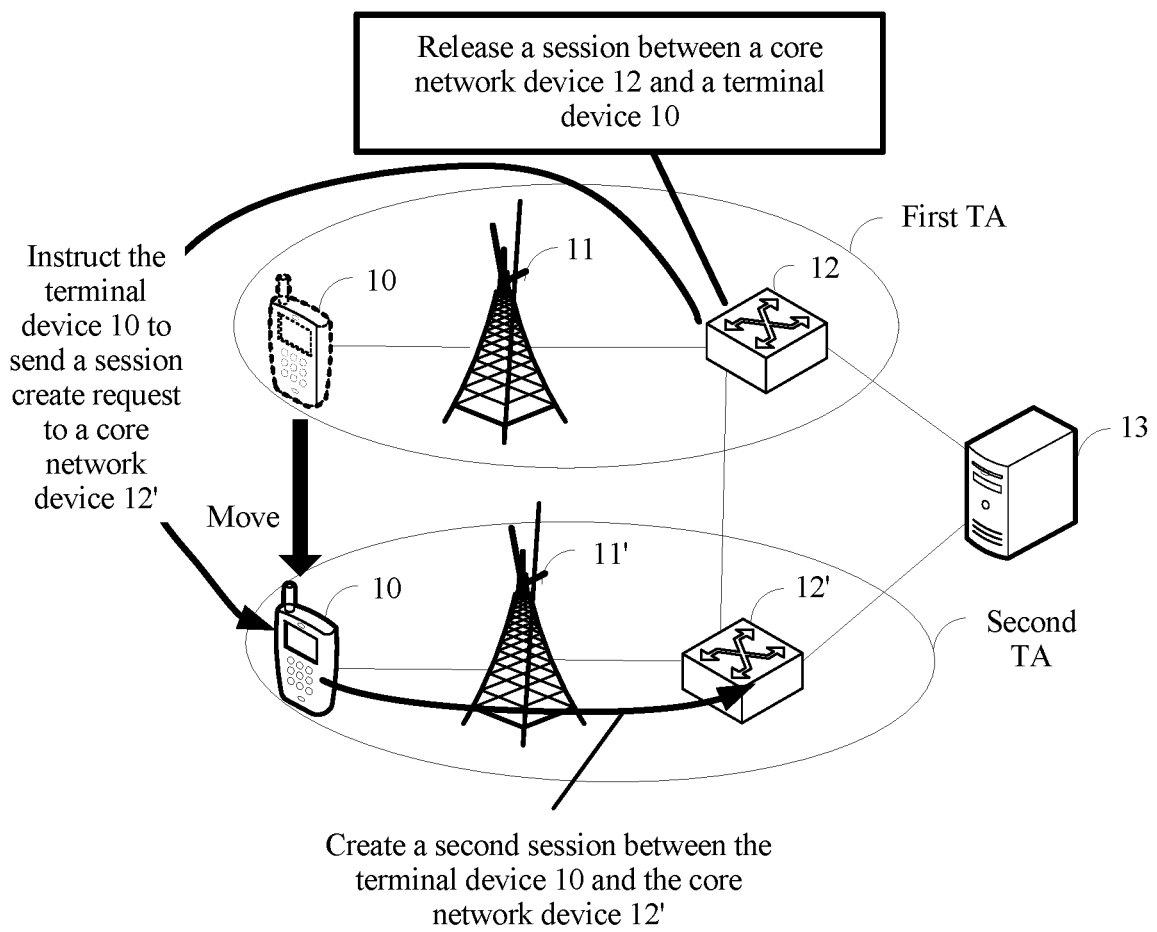
FIG. 2 is a schematic flowchart of session migration in the prior art.

FIG. 2 shows a process of migrating a session of a terminal device in the prior art. With reference to FIG. 1, as shown in FIG. 2, both the core network device 12 and a core network device 12' are connected to the application server 13, both a service area of the radio access network device 11 and a service area of the core network device 12 include a first TA, and both a service area of a radio access network device 11' and a service area of the core network device 12' include a second TA. At a moment, a first session is created between the terminal device 10 and the core network device 12, and the core network device 12 stores a context of the first session. After the terminal device 10 moves from the first TA to the second TA, the core network device 12 releases the first session between the core network device 12 and the terminal device 10, in other words, the core network device 12 deletes the context of the first session, and instructs the terminal device 10 to send a session create request to the core network device 12'. In this case, a second session is created between the terminal device 10 and the core network device 12', and the terminal device 10 may transmit data of a terminal device 10 by using the core network device 12'.

It can be learned that the terminal device 10 creates the second session between the terminal device 10 and the core network device 12' after receiving the instruction sent by the core network device 12, but the core network device 12 releases the first session between the core network device 12 and the terminal device 10 when sending the instruction to the terminal device 10. Therefore, for downlink data to be sent to the terminal device 10, there may be no data transmission link for transmitting the downlink data, causing a packet loss in the downlink data. In addition, if the terminal device 10 does not transmit data (that is, does not send uplink data and does not receive downlink data) after moving to the second TA, creating the second session between the terminal device 10 and the core network device 12' causes waste of core network resources and unnecessary signaling transmission.

To resolve the foregoing problem, the embodiments of this application provide a session migration method. In the session migration method, if a first session is created between a source session management function entity and a terminal device, when the source session management function entity determines to update a session of the terminal device, the source session management function entity retains a context of a first session, and sends instruction information to the terminal device or a target mobility management function entity, to instruct the terminal device or the target mobility management function entity to trigger creation of a second session after the terminal device or the target mobility management function entity obtains to-be-sent data of the terminal device, where the second session is a session between the terminal device and a target session management function entity. Before the second session is created, the source session management function entity retains the context of the first session. Therefore, even if there is downlink data to be sent to the terminal device, the downlink data can be accurately sent to the terminal device, so that no packet loss occurs in the downlink data. In addition, creation of the second session is triggered by the terminal device or the target mobility management function entity after the terminal device or the target mobility management function entity obtains to-be-sent data of the terminal device. Therefore, in a scenario in which no data of the terminal device is transmitted, the second session does not need to be created. In this way, waste of core network resources and unnecessary signaling transmission are reduced.

The session migration method provided in the embodiments of this application is applicable to a wireless communications system in which a small packet service exists. The wireless communications system may be the foregoing next-generation wireless communications system. For ease of description, an example in which the wireless communications system is the next-generation wireless communications system shown in FIG. 1 is used for description in the embodiments of this application.

The terminal device 10 in the embodiments of this application may be a device that provides a user with voice and/or data connectivity, a handheld device with a wireless connection function, or another processing device connected to a wireless modem. A wireless terminal may communicate with one or more core networks by using a radio access network (RAN). The wireless terminal may be a mobile terminal such as a mobile phone (also referred to as a "cellular" phone) or a computer with a mobile terminal, or may be a portable, pocket-sized, handheld, computer built-in, or in-vehicle mobile apparatus that exchanges voice and/or data with the radio access network, for example, a mobile phone, a tablet computer, a notebook computer, a netbook, or a personal digital assistant (PDA).

The radio access network device 11 in the embodiments of this application may be a radio access point (AP), or may be an evolved NodeB (eNB), or may be an NR gNB. The NR gNB represents a base station in a 5th generation mobile communications technology (5G) network. This is not limited in the embodiments of this application.

It can be learned from the foregoing description that the control plane network element and the user plane network element may be independently disposed, or may be integrated into a same device. An example in which the control plane network element and the user plane network element are independently disposed is mainly used for description in the embodiments of this application.

Generally, there may be three methods for creating a session for a terminal device that executes a small packet transmission service:

1. An attach process and a session creation process of the terminal device are completed simultaneously.

When attaching to a network, the terminal device sends, to a mobility management function entity in the network, an attach request that carries a permanent identifier of the terminal device and a data network name (DNN). After receiving the attach request, the mobility management function entity obtains mobility management subscription data of the terminal device from a UDM device, performs authentication on the terminal device, allocates a temporary identity to the terminal device, and selects a session management function entity. The session management function entity selected by the mobility management function entity obtains session management subscription data of the terminal device from the UDM device, creates a session for the terminal device based on the attach request sent by the terminal device and capability information of the terminal device, and stores a context of the session. The context of the session includes an identifier of a user plane network element, an IP address, and the like that are allocated by the session management function entity to the terminal device. In this case, the terminal device may normally execute a small packet transmission service.

2. An attach process and a session creation process of the terminal device are independent of each other. A session is created after the terminal device attaches to a network, and uplink data is sent after the session is created.

In the attach process of the terminal device, a mobility management function entity obtains mobility management subscription data of the terminal device from a UDM device, performs authentication on the terminal device, and allocates a temporary identity to the terminal device. After the terminal device attaches to the network, the terminal device sends a session create request to the mobility management function entity in the network. After receiving the session create request, the mobility management function entity selects a session management function entity, and sends the session create request to the selected session management function entity, to request the session management function entity to create a session for the terminal device, and in one embodiment, request the session management function entity to allocate a user plane network element, an IP address, and the like to the terminal device. The session management function entity obtains session management subscription data of the terminal device from the UDM device. After the session management function entity creates the session for the terminal device, the terminal device may normally execute a small packet transmission service.

3. An attach process and a session creation process of the terminal device are independent of each other. After attaching to a network, the terminal device directly sends uplink data, to trigger a control plane network element to create a session for the terminal device.

In the attach process of the terminal device, a mobility management function entity performs authentication on the terminal device, and allocates a temporary identity to the terminal device. The mobility management function entity may obtain mobility management subscription data of the terminal device. After attaching to the network, the terminal device directly sends uplink data. The uplink data is represented in a form of an uplink data packet. Because no session is created for the terminal device in this case, no IP address is allocated to the terminal device, and the uplink data packet is a non-IP packet. After receiving the uplink data packet, the mobility management function entity determines, based on a source address of the uplink data packet, that no session context is created for the terminal device. The mobility management function entity selects a session management function entity, and requests the session management function entity to create a session for the terminal device. The session management function entity allocates a user plane network element and an IP address (the IP address is not returned to the terminal device, but is only used to encapsulate the non-IP packet into an IP packet for sending to a communications peer end) to the terminal device based on session management subscription data of the terminal device, and creates a session context. After the session is created, the session management function entity forwards, to the user plane network element, the uplink data packet sent by the mobility management function entity. The user plane network element encapsulates, based on the session context, the uplink data packet received by the user plane network element, and sends an uplink data packet obtained after the encapsulation to an external network. Then the terminal device may normally execute a small packet transmission service.

It should be noted that the method 3 is applicable only to a case in which data sent by the terminal device is represented in a form of a non-IP packet.

Based on the method 2, after determining to update a session of the terminal device, a source session management function entity in the embodiments of this application may instruct the terminal device to send information used to trigger creation of a second session to a target mobility management function entity after the terminal device obtains to-be-sent data of the terminal device, or may instruct the terminal device to send information used to trigger creation of a second session to a target mobility management function entity immediately after the terminal device obtains instruction information. Based on the method 3, after determining to update a session of the terminal device, a source session management function entity in the embodiments of this application may instruct a target mobility management function entity to select a target session management function entity after the target mobility management function entity obtains to-be-sent uplink data of the terminal device, to trigger creation of a second session.

To facilitate understanding of the session migration method provided in the embodiments of this application, an example in which a mobility management function entity and a session management function entity are independently disposed is used for description in the embodiments of this application.

For ease of description, in the embodiments of this application, a source radio access network device is represented by a base station 1, a source mobility management function entity is represented by MM 1, a source session management function entity is represented by SM 1, a source user plane network element is represented by a user plane network element 1, a target radio access network device is represented by a base station 2, a target mobility management function entity is represented by MM 2, a target session management function entity is represented by SM 2, and a target user plane network element is represented by a user plane network element 2.

Figure 3:
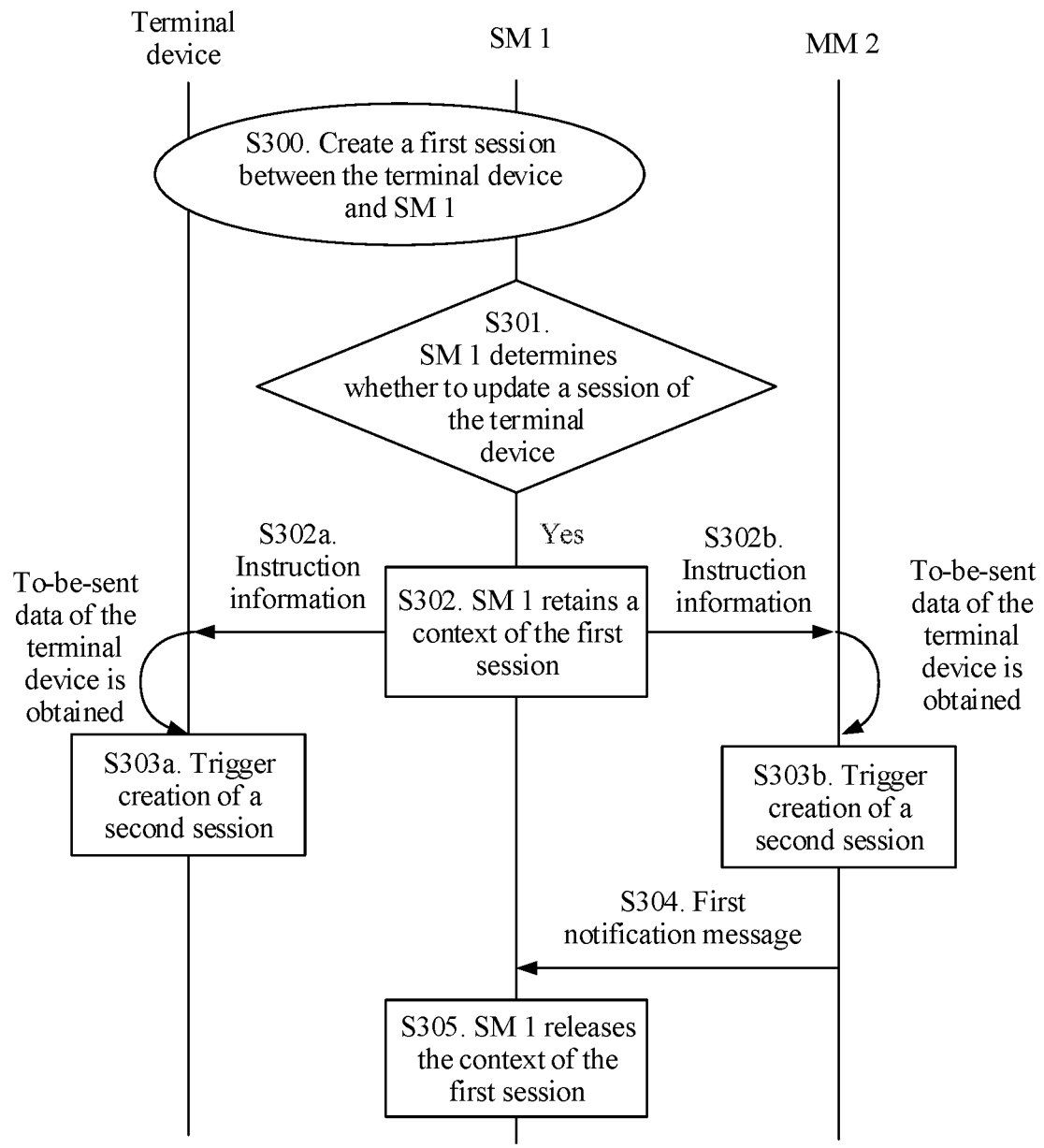
FIG. 3 is a schematic flowchart 1 of a session migration method according to an embodiment of this application.
Figure 4A:
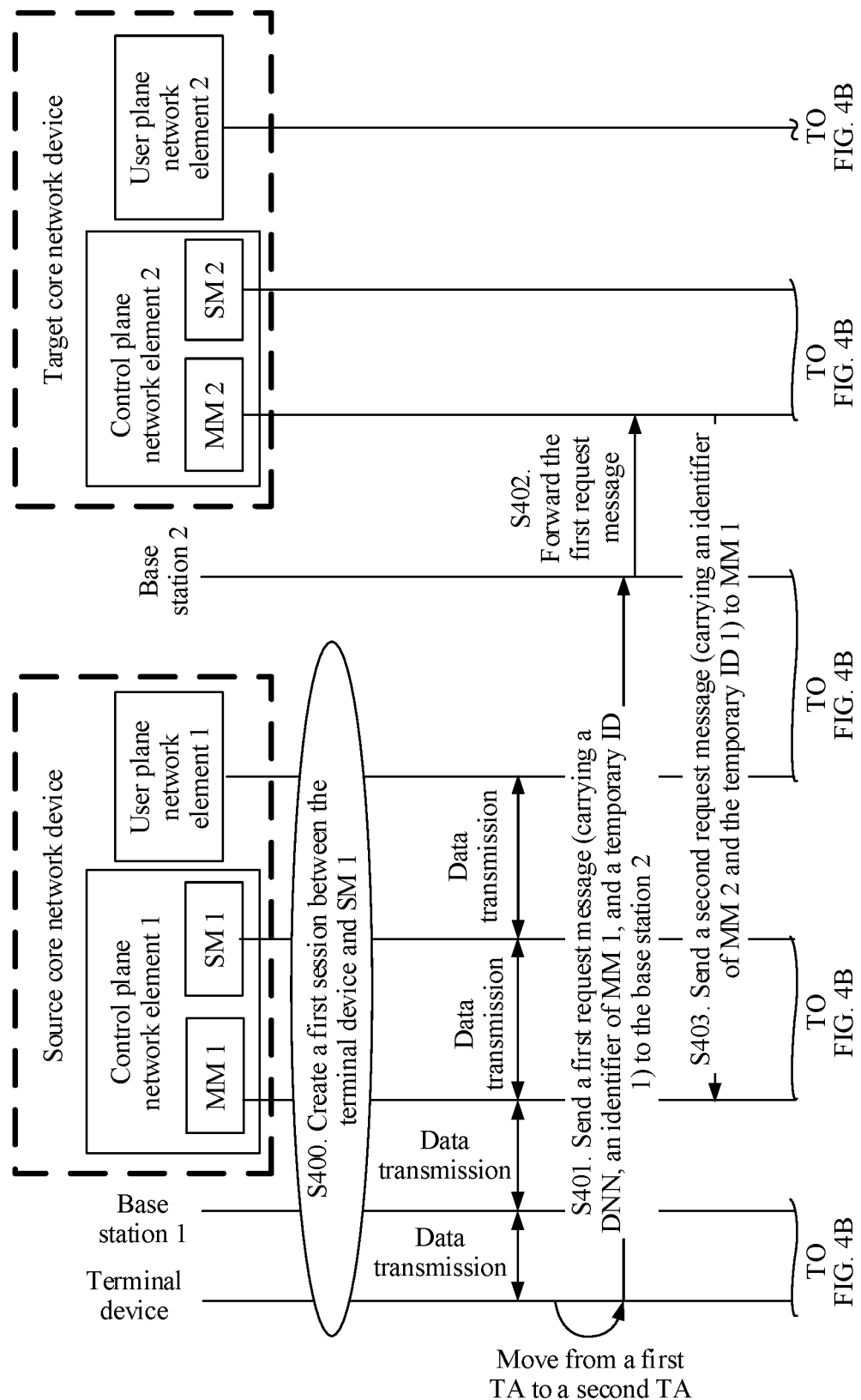
FIG. 4A, FIG. 4B, FIG. 4C, and FIG. 4D are a schematic flowchart 2 of a session migration method according to an embodiment of this application.
Figure 4B:
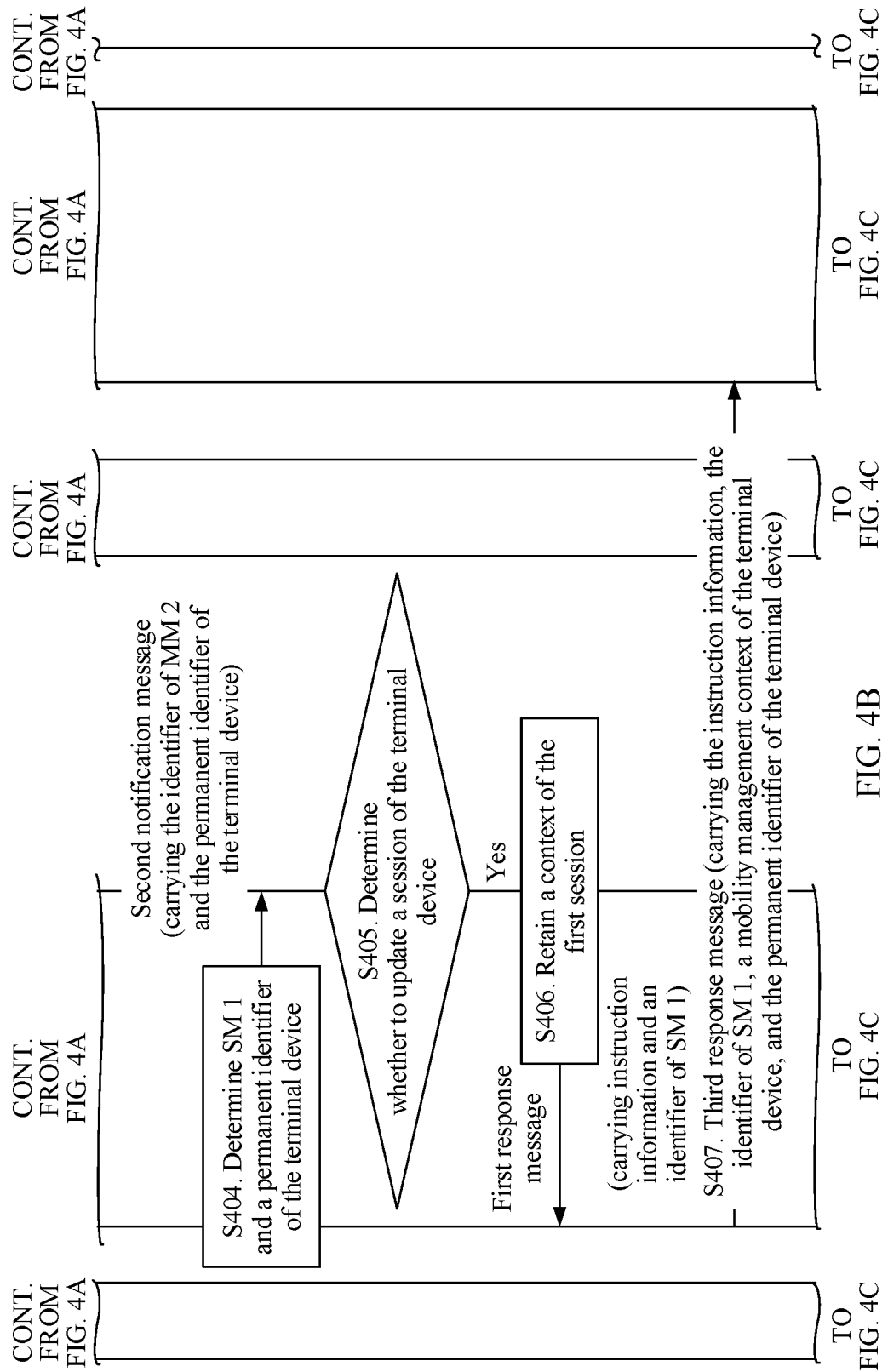
Figure 4C:
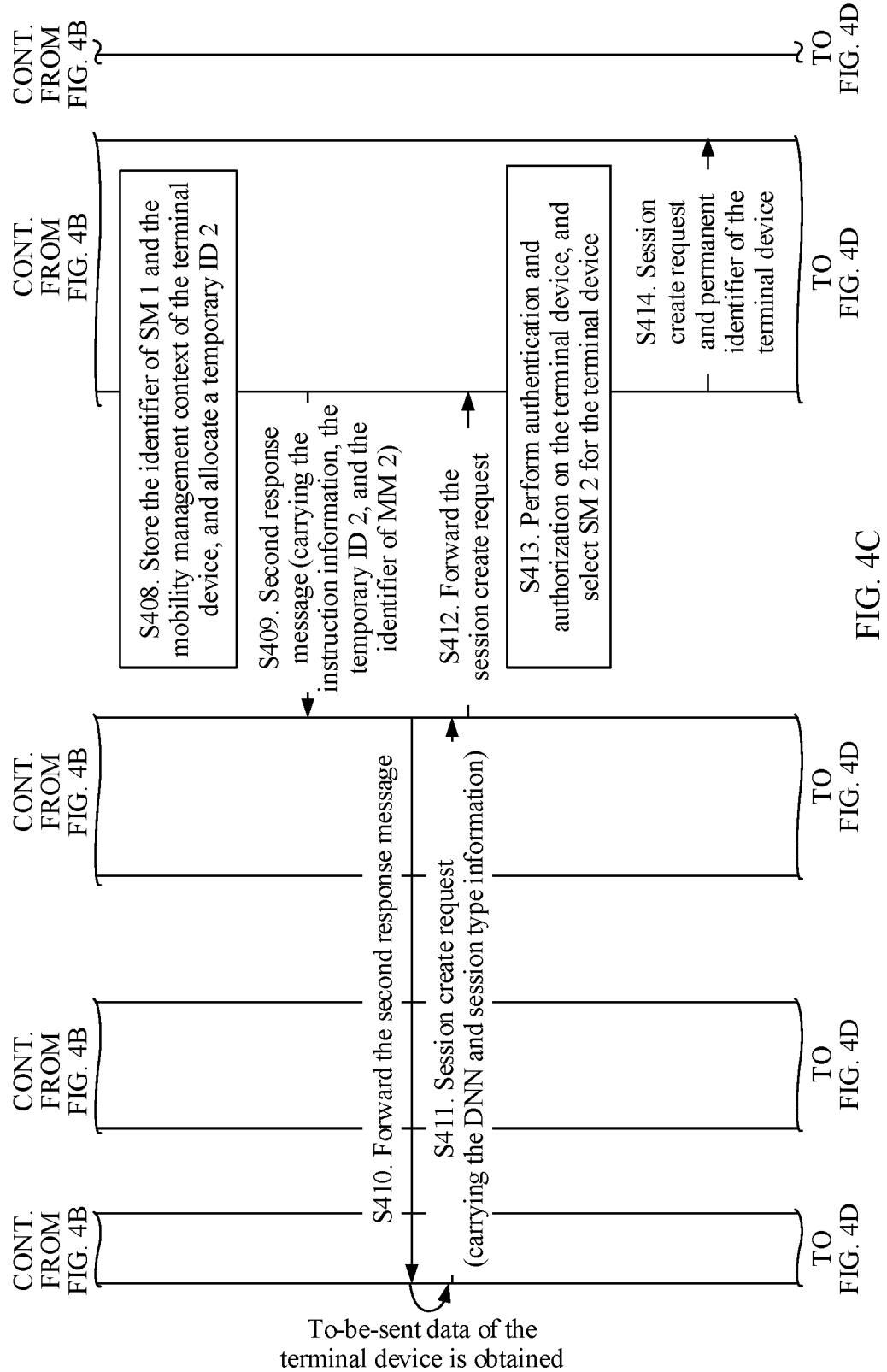
Figure 4D:
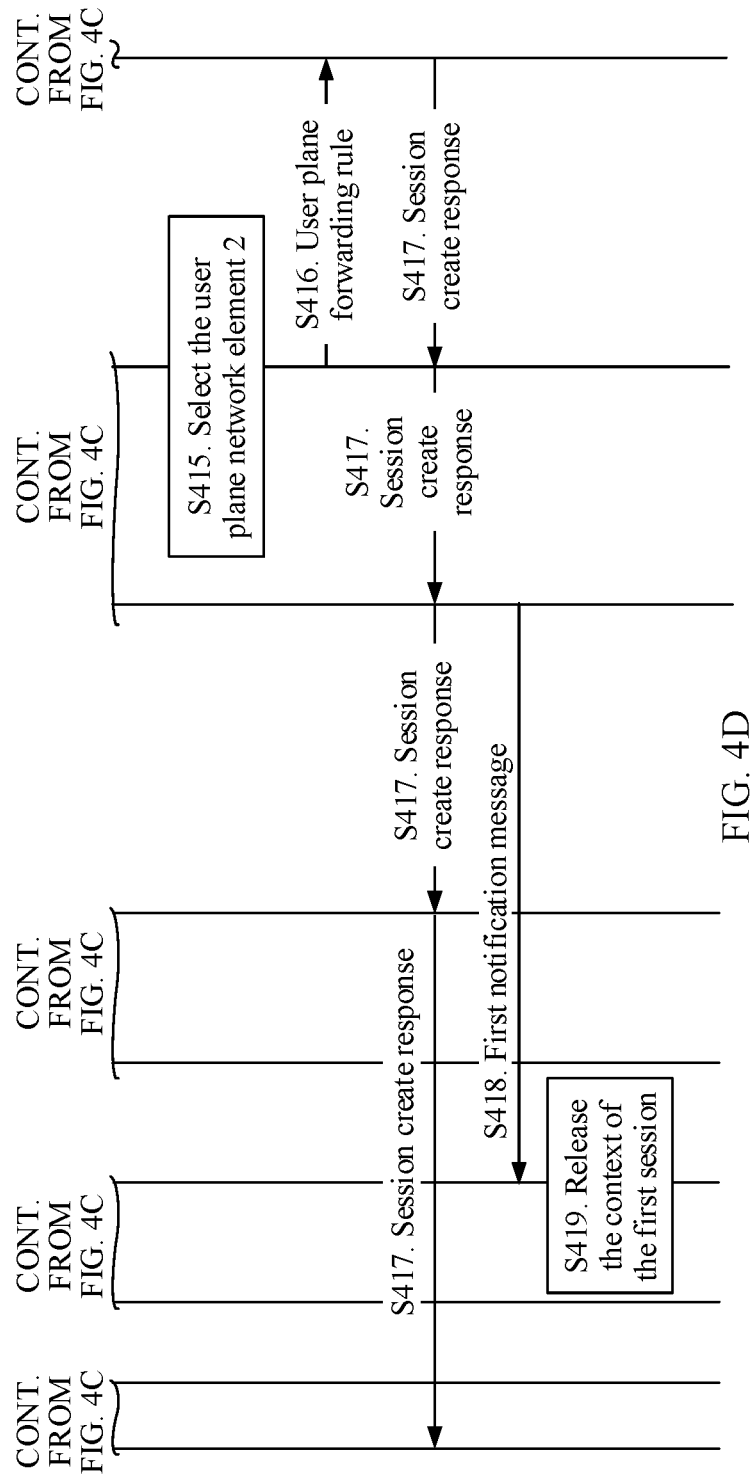
Figure 5A:
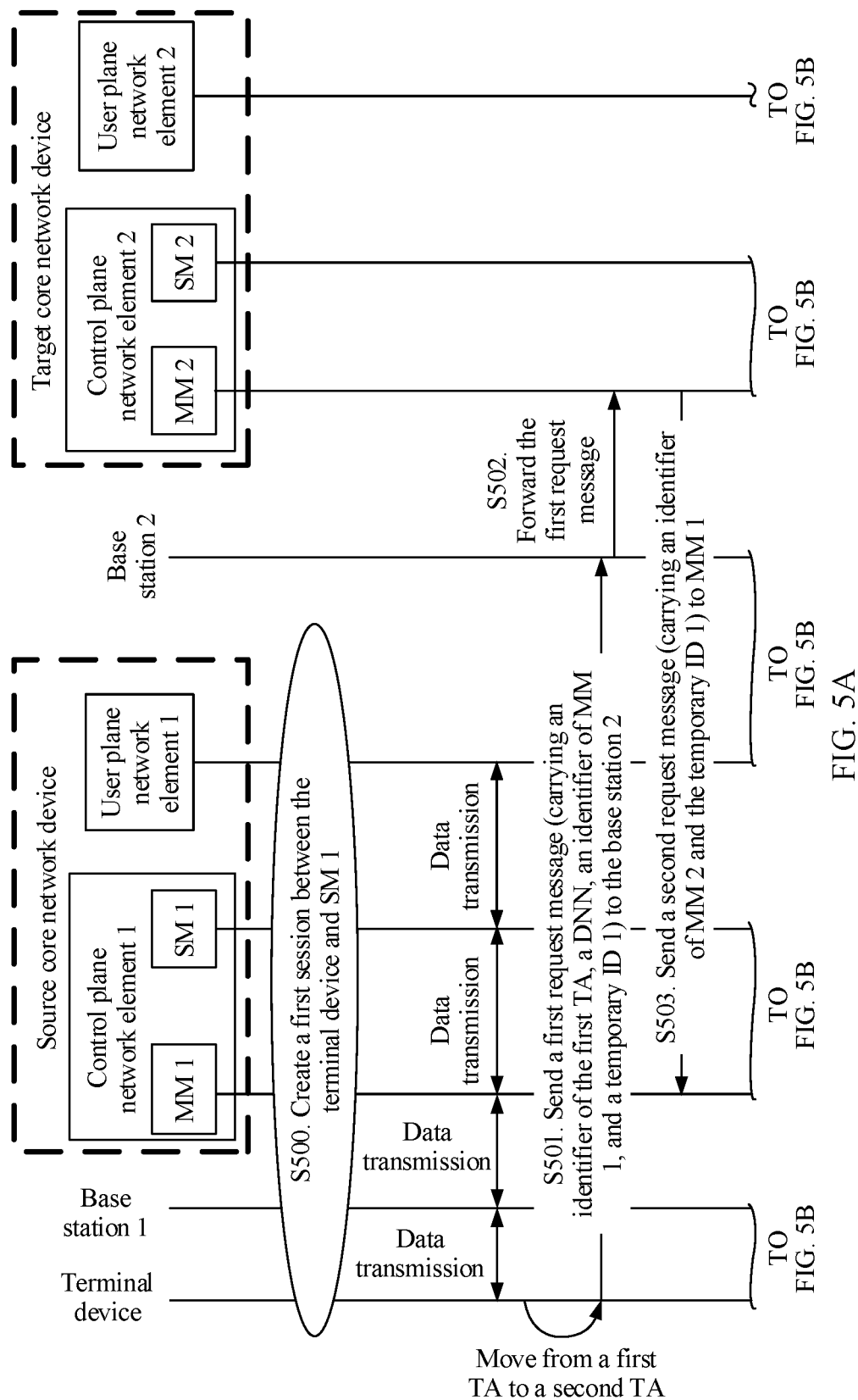
FIG. 5A, FIG. 5B, FIG. 5C, and FIG. 5D are a schematic flowchart 3 of a session migration method according to an embodiment of this application.
Figure 5B:
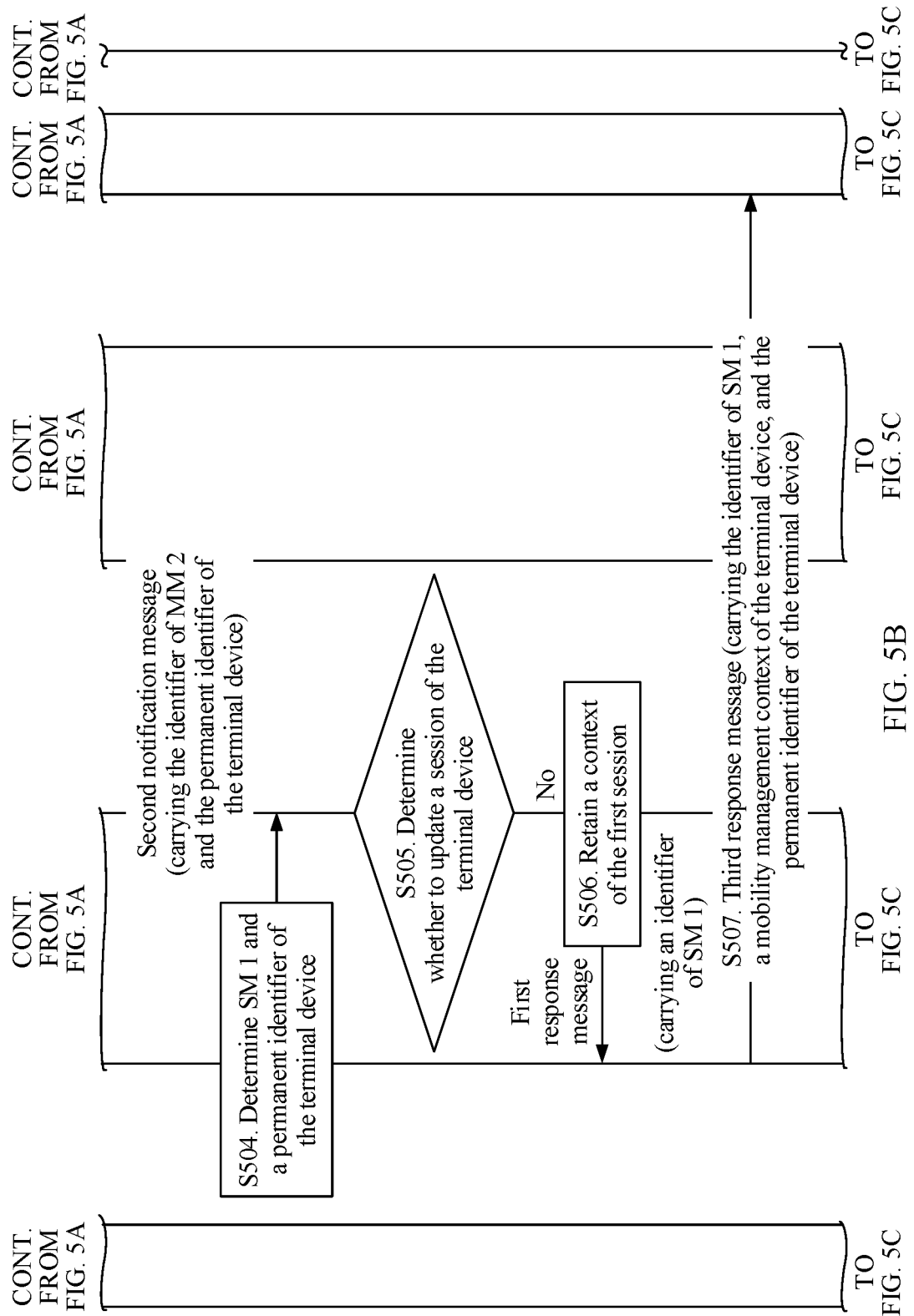
Figure 5C:
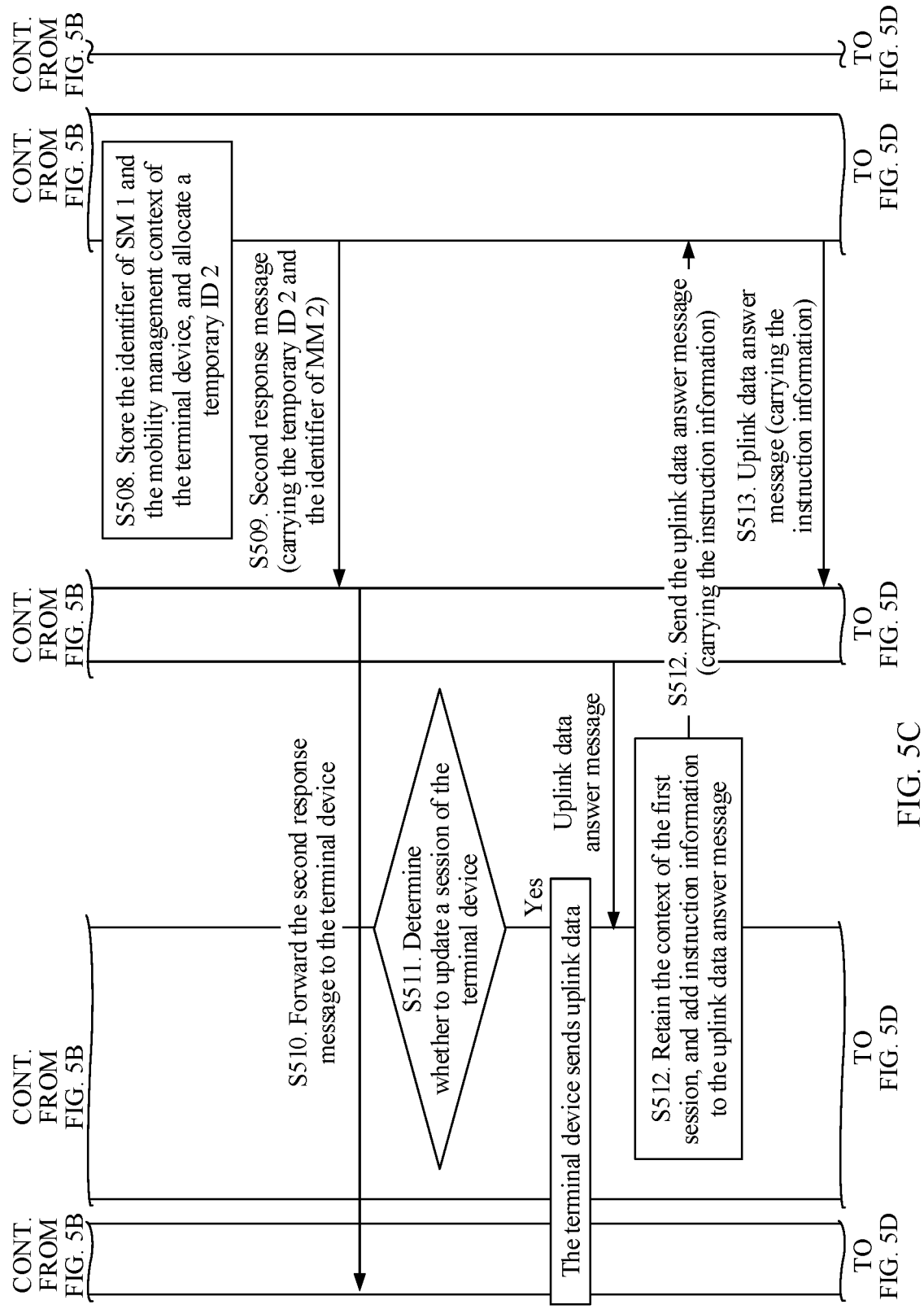
Figure 5D:
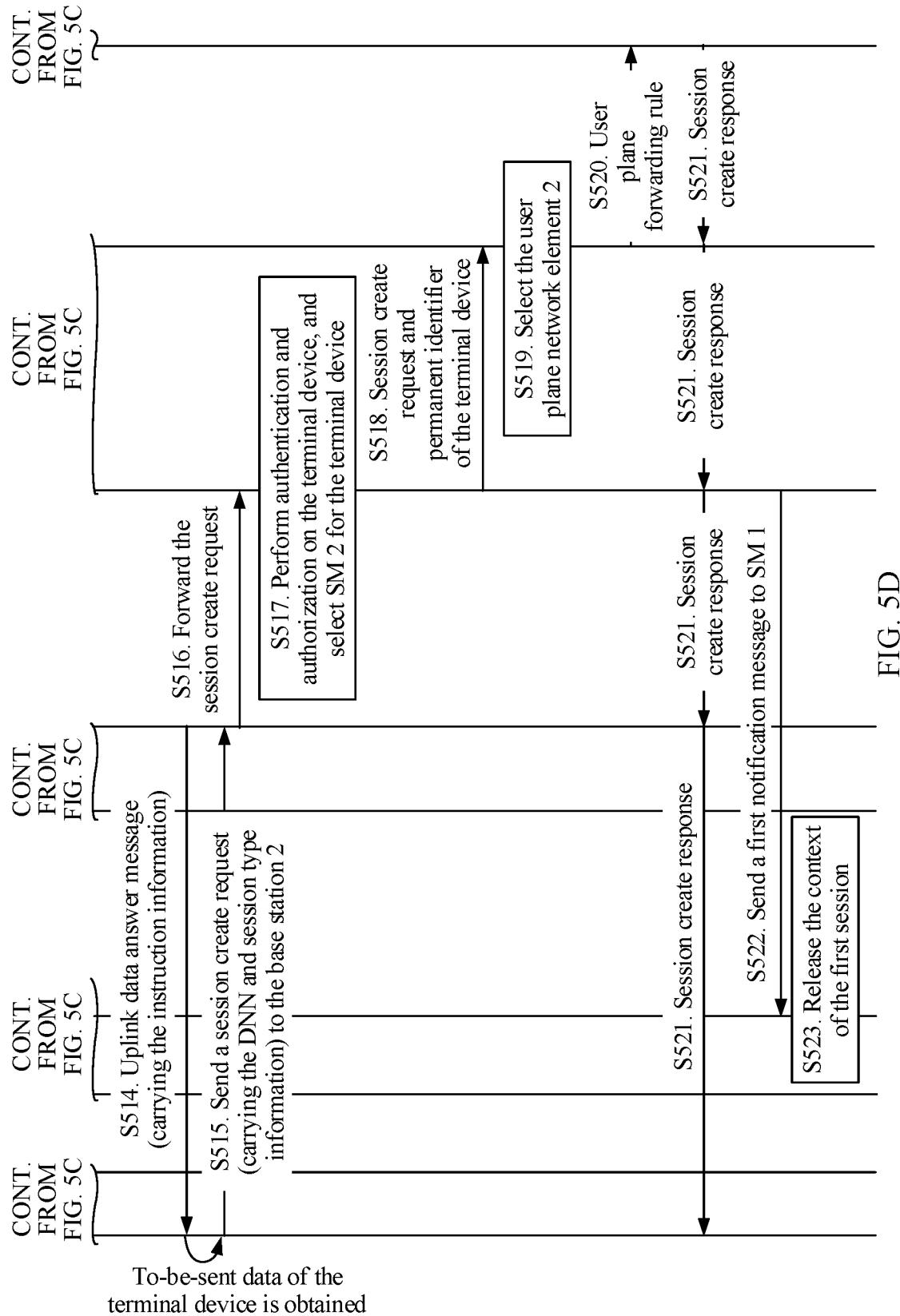
Figure 6A:
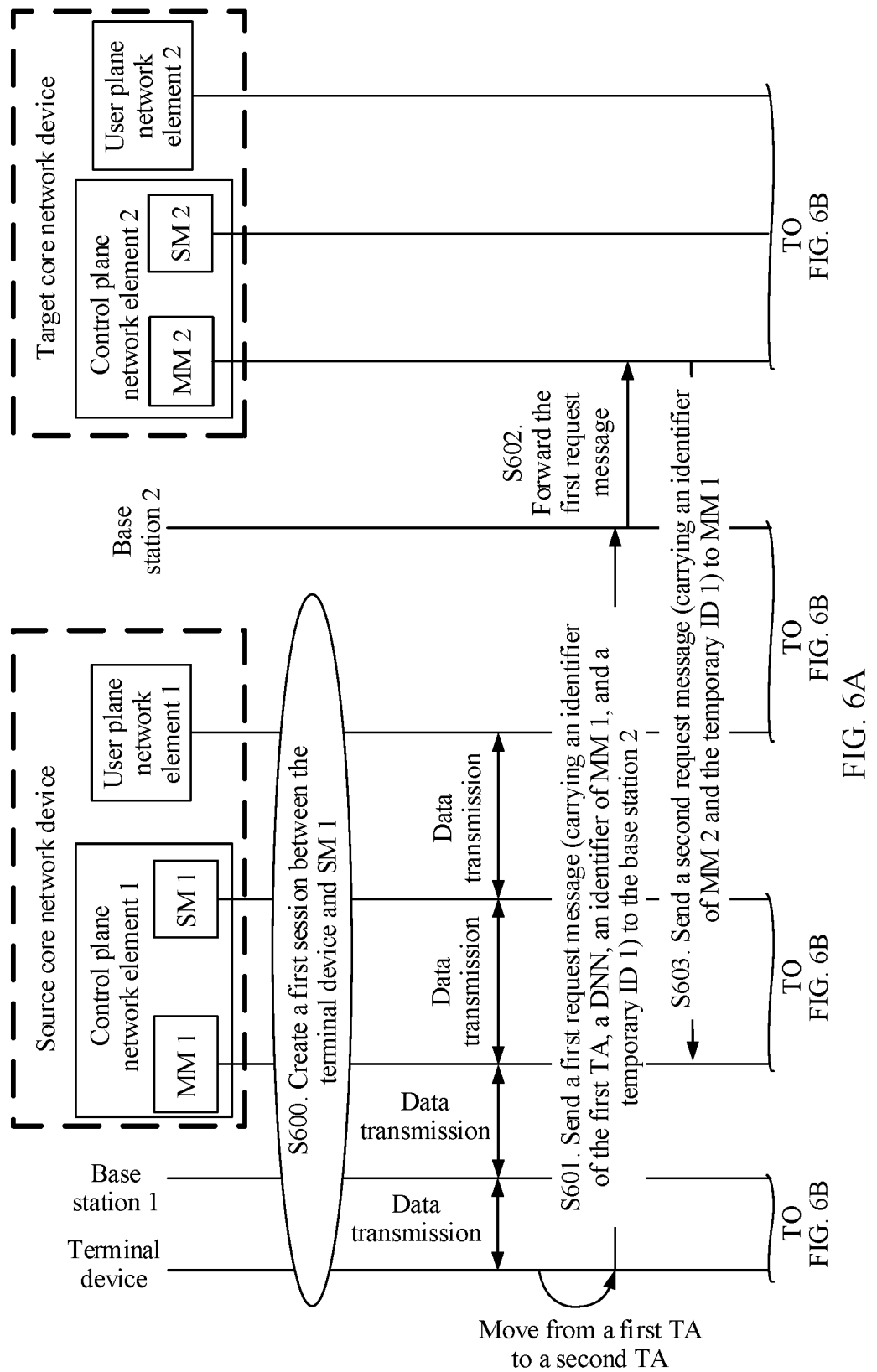
FIG. 6A, FIG. 6B, FIG. 6C, and FIG. 6D are a schematic flowchart 4 of a session migration method according to an embodiment of this application.
Figure 6B:
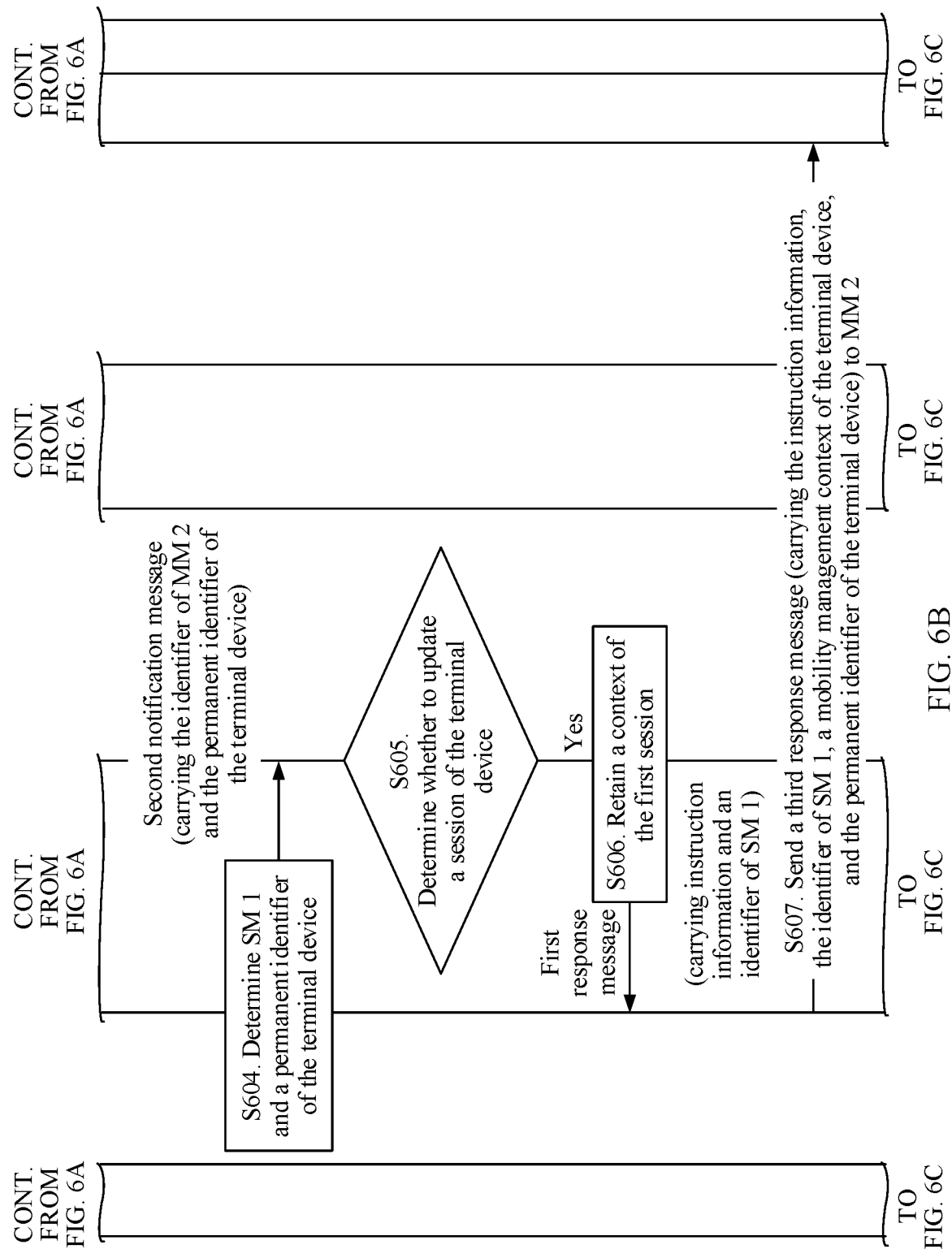
Figure 6C:
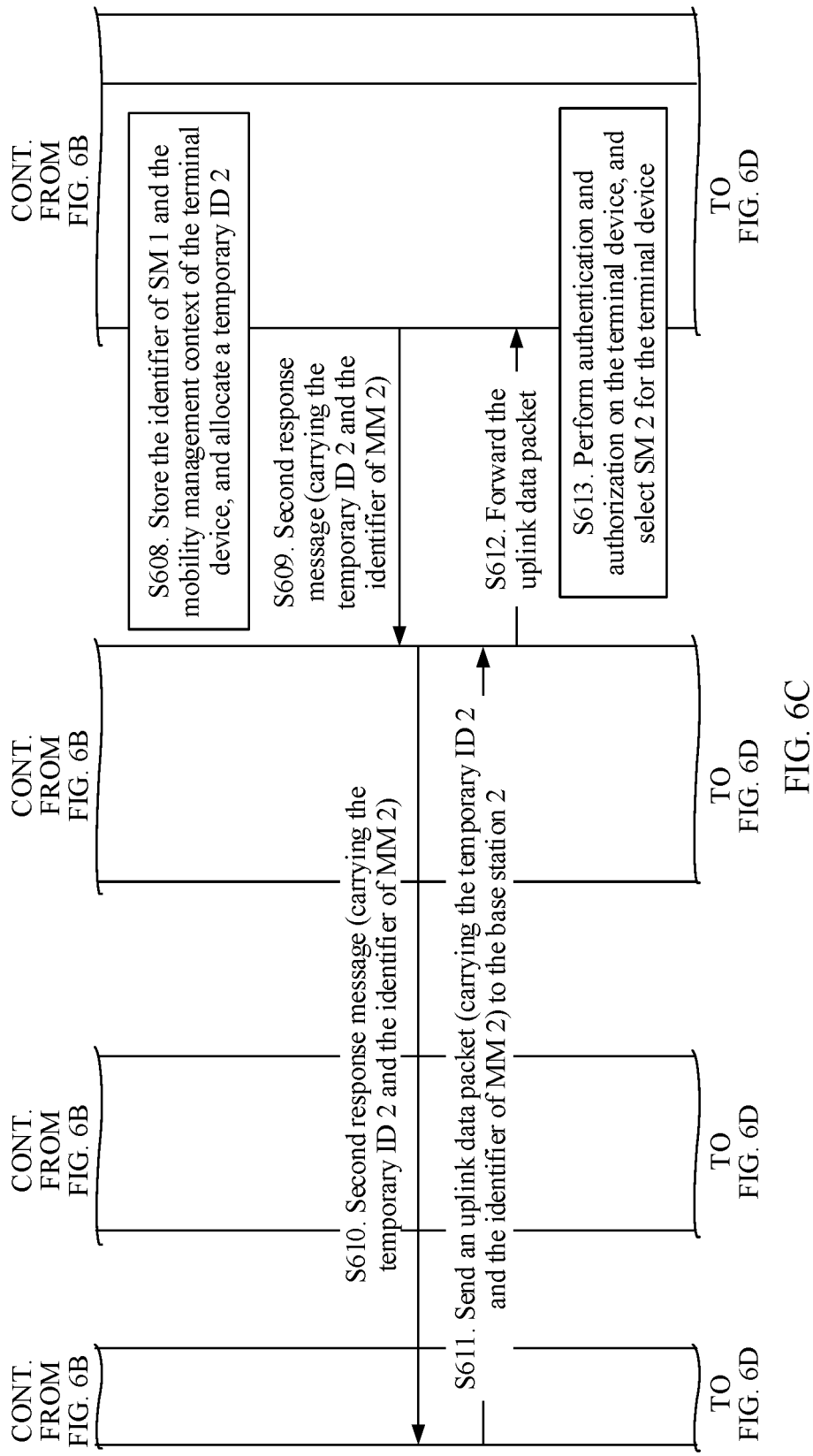
Figure 6D:
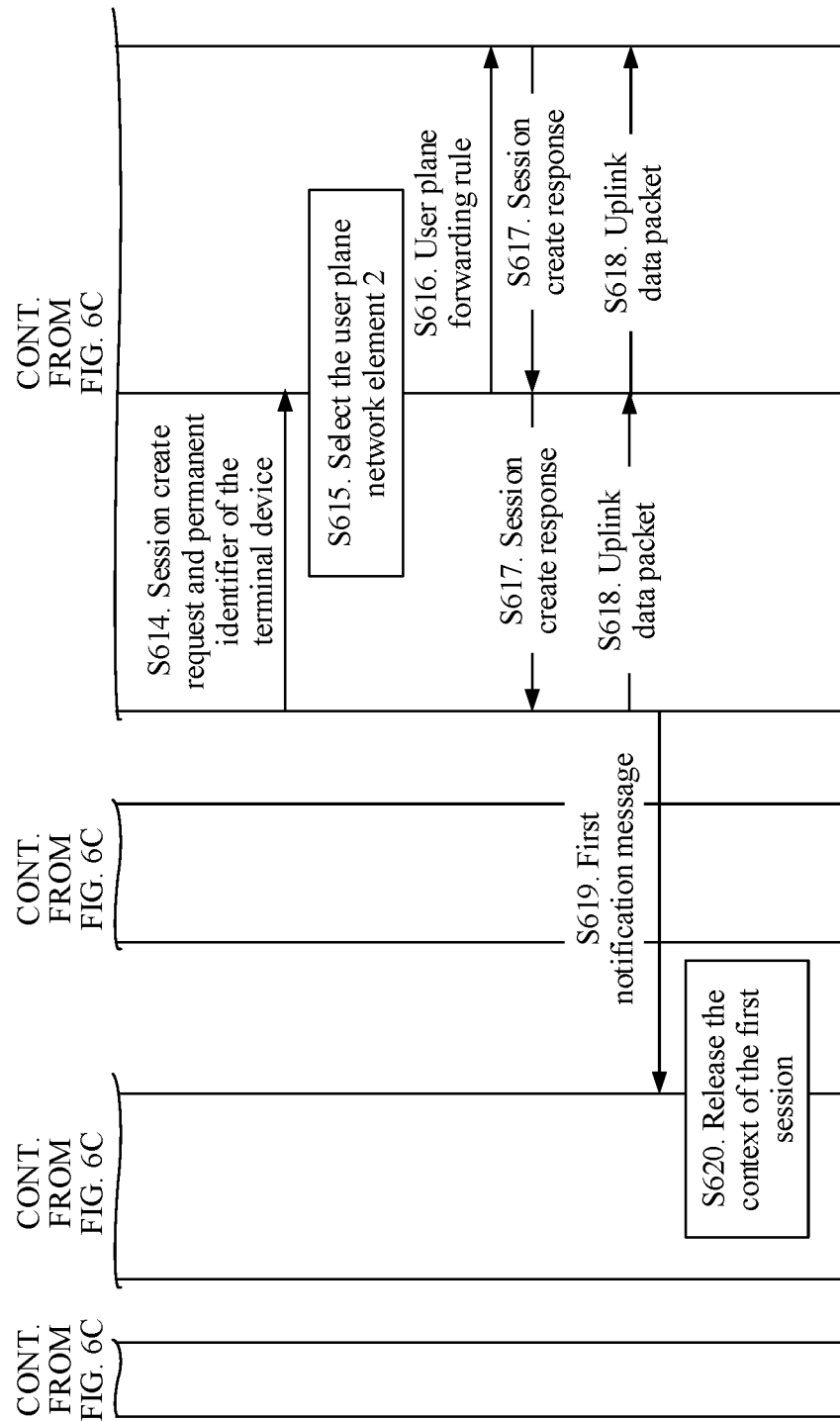
Figure 7A:
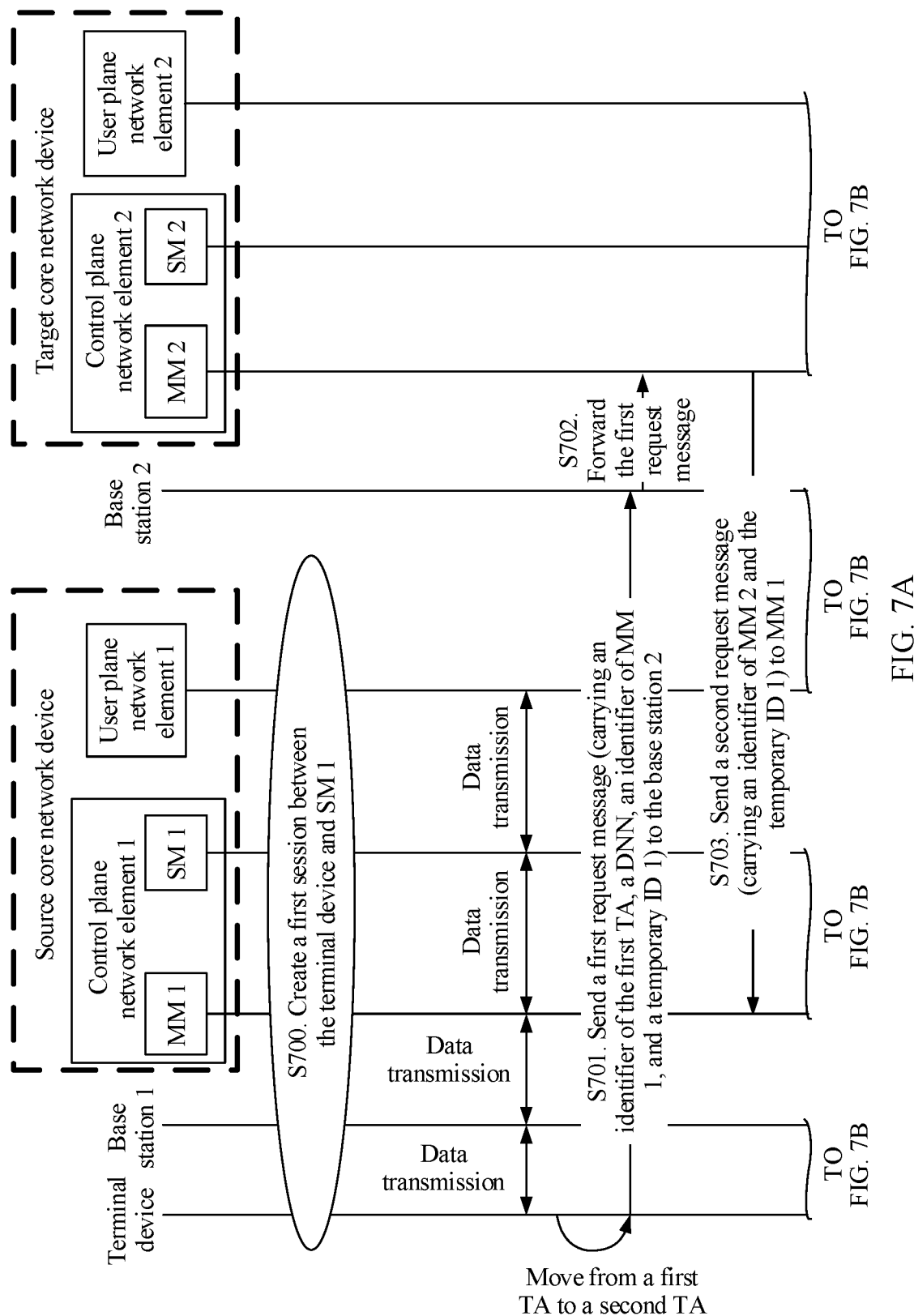
FIG. 7A, FIG. 7B, FIG. 7C, and FIG. 7D are a schematic flowchart 5 of a session migration method according to an embodiment of this application.
Figure 7B:
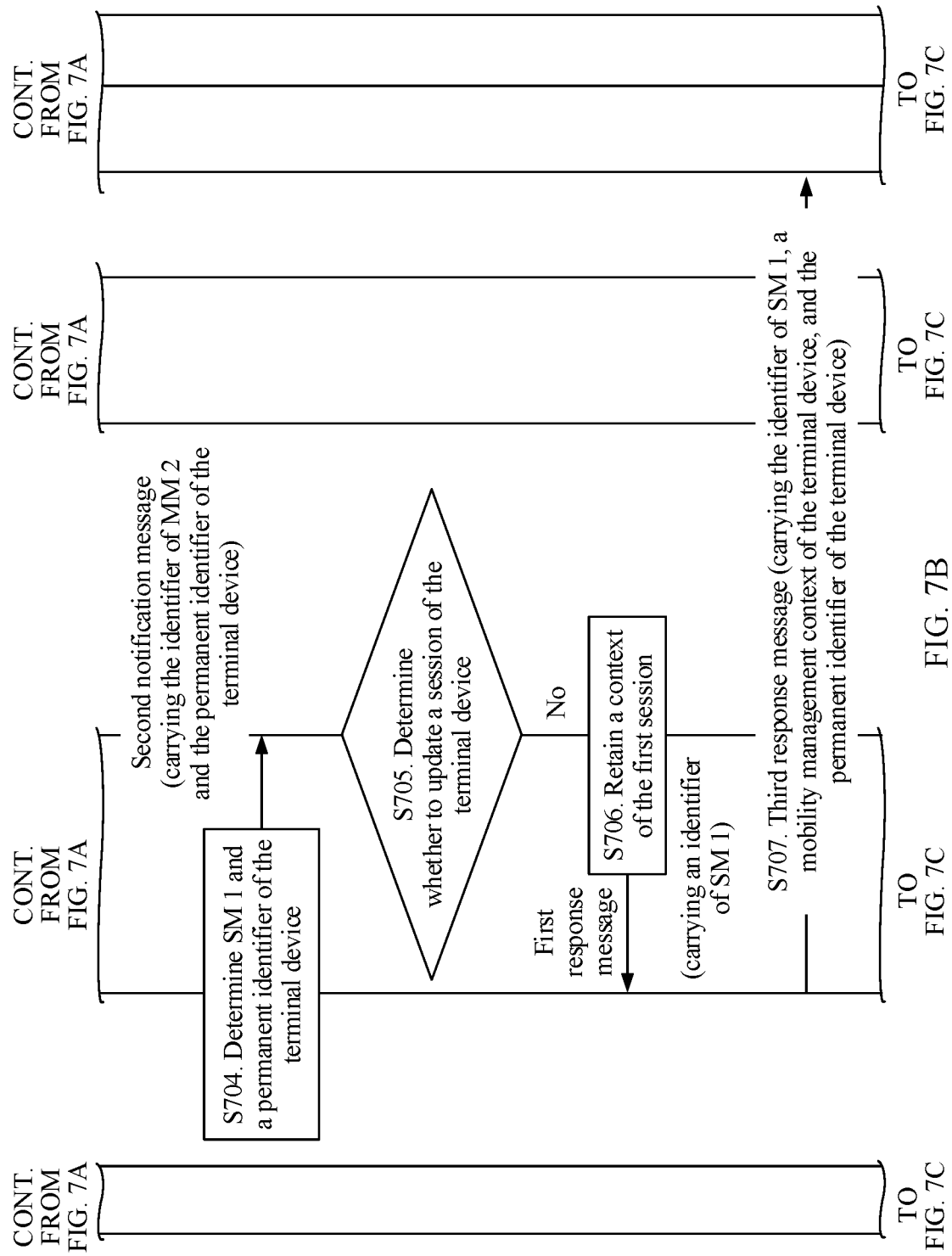
Figure 7C:
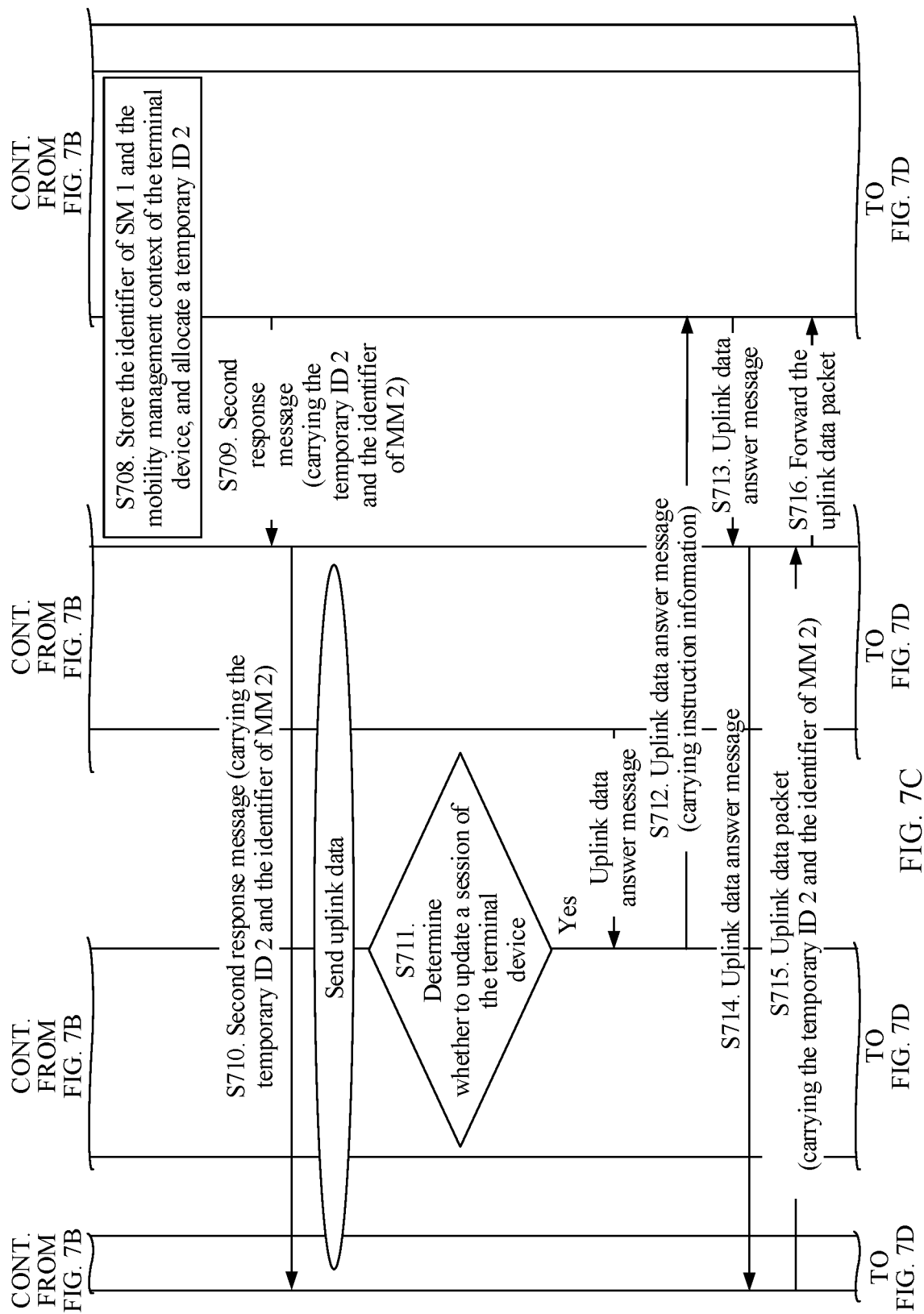
Figure 7D:
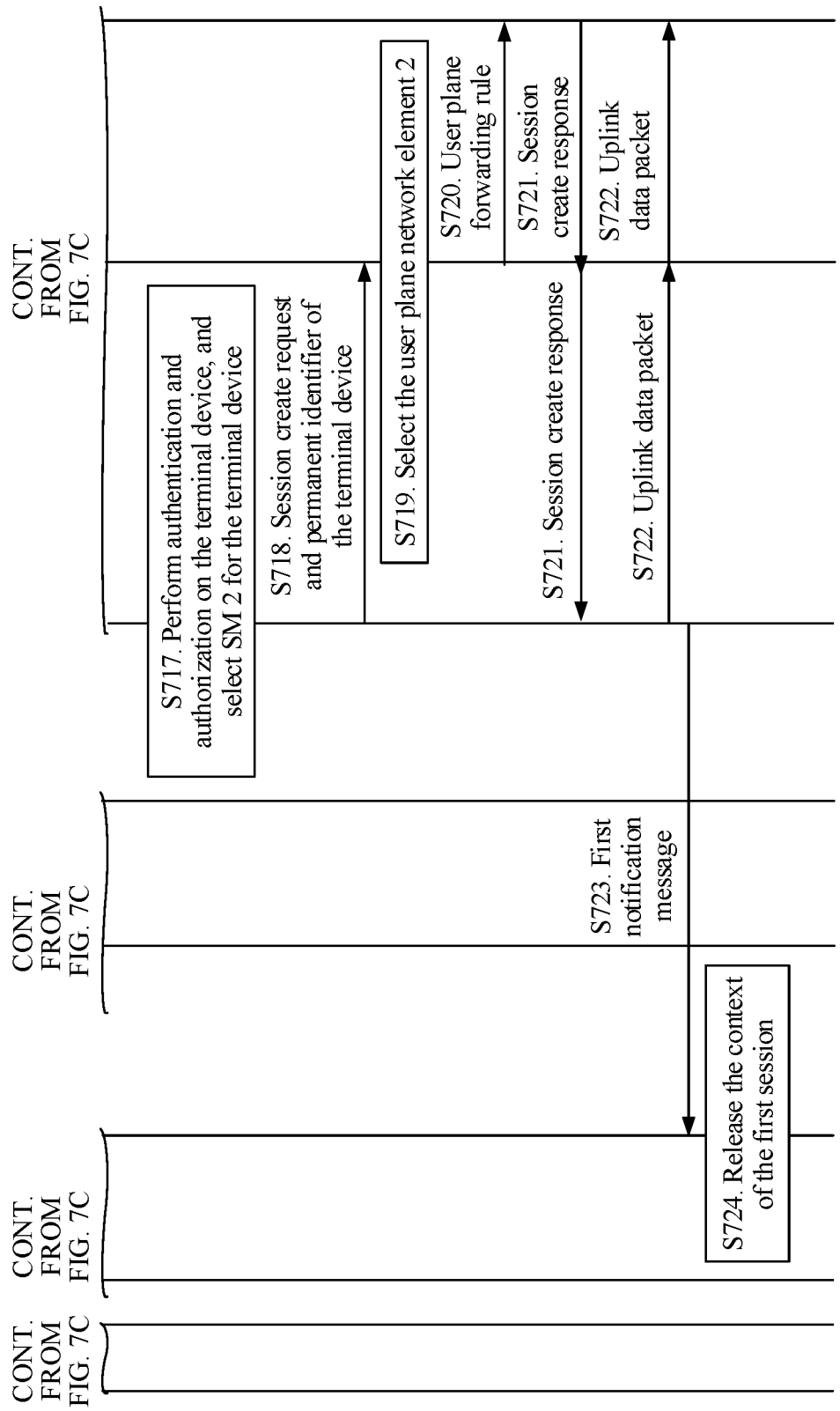
Figure 8A:
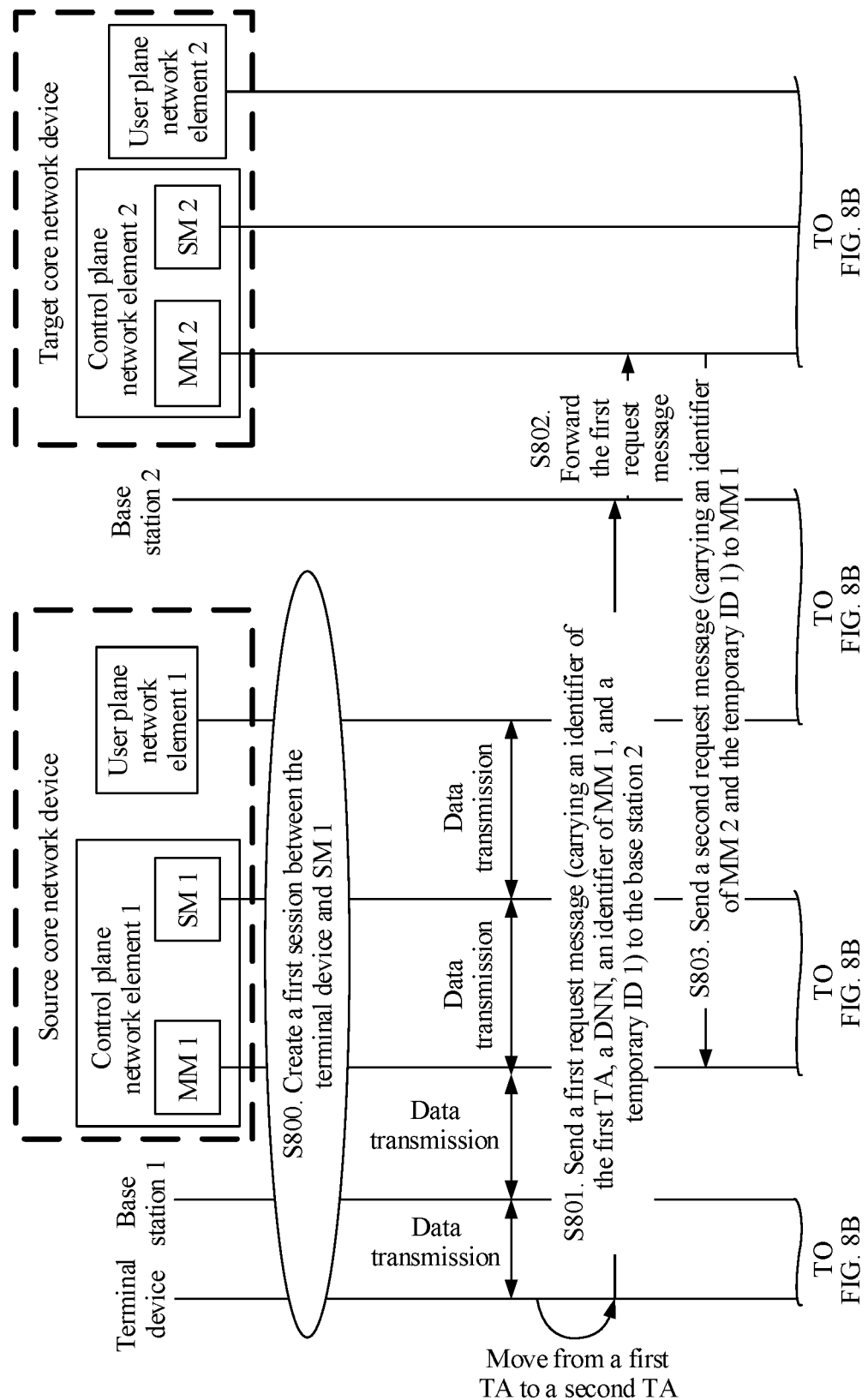
FIG. 8A, FIG. 8B, FIG. 8C, and FIG. 8D are a schematic flowchart 6 of a session migration method according to an embodiment of this application.
Figure 8B:
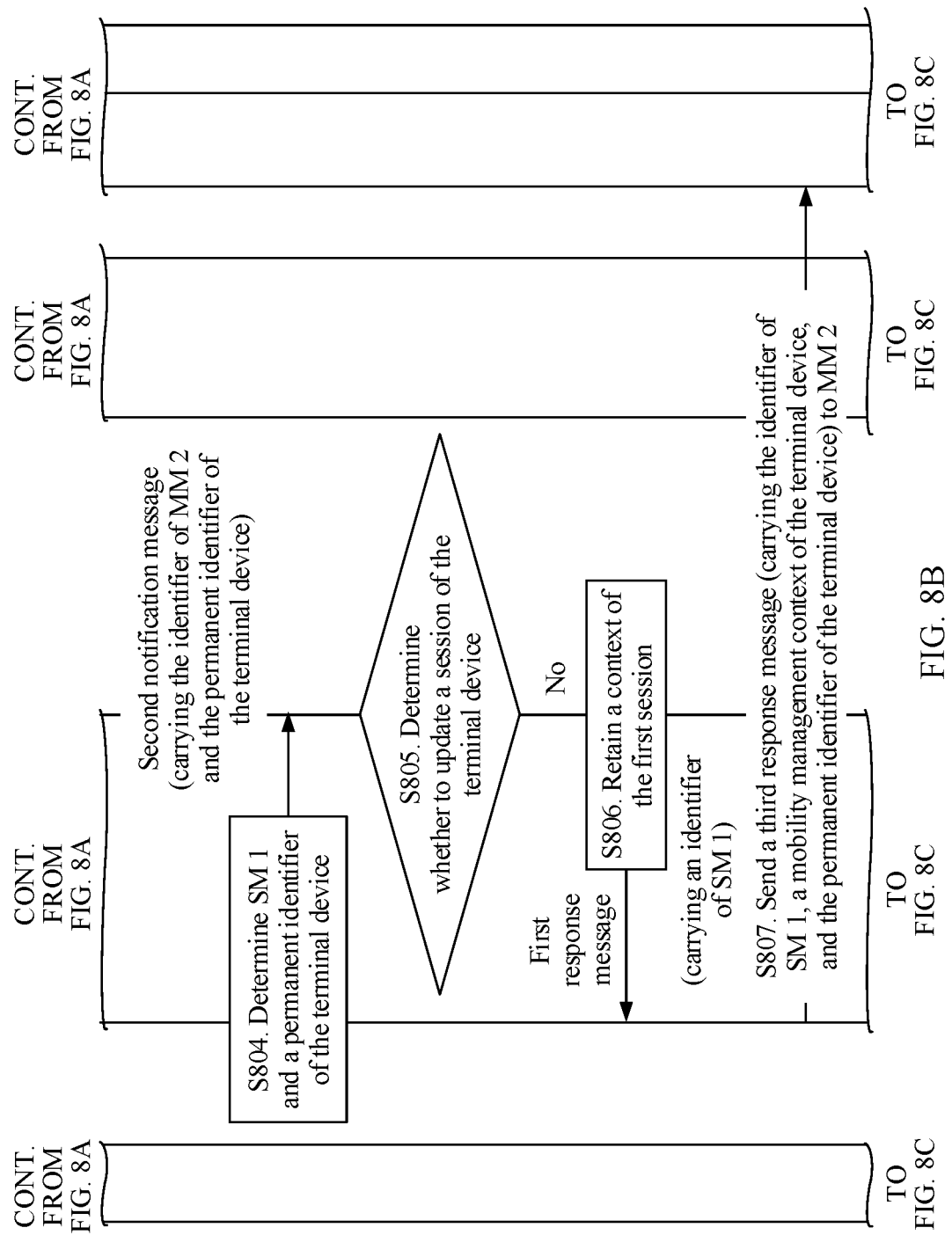
Figure 8C:
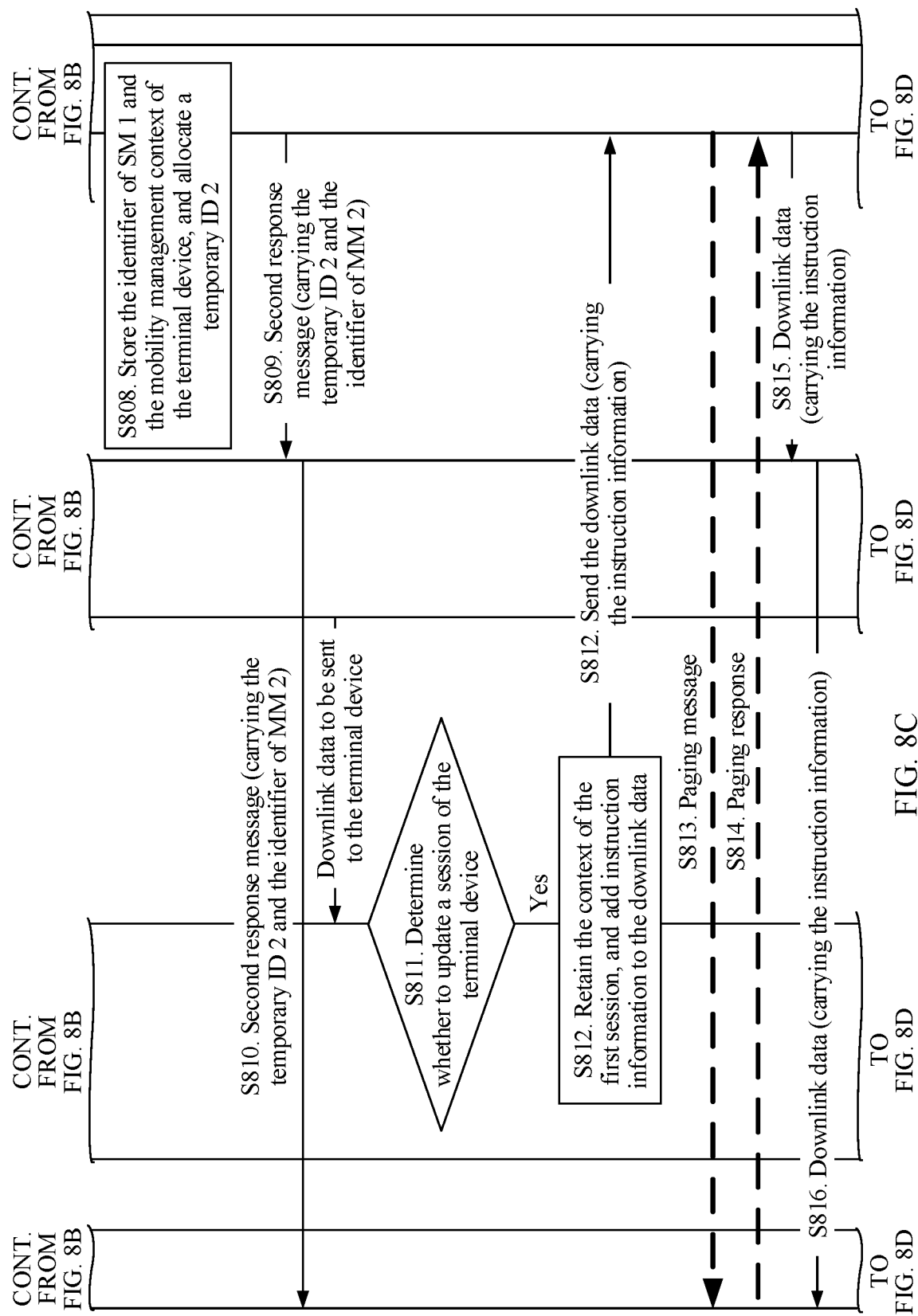
Figure 8D:
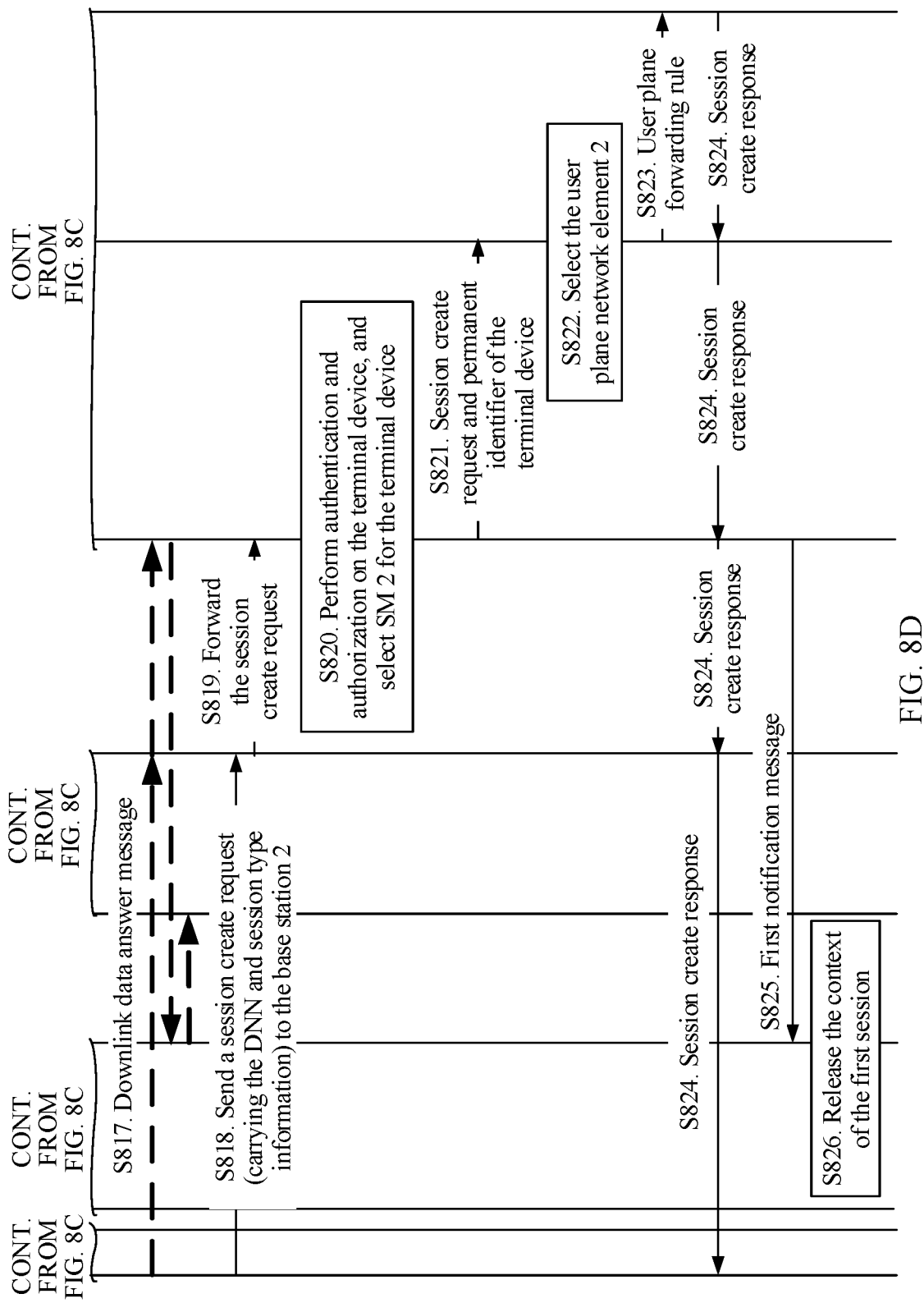
Figure 9A:
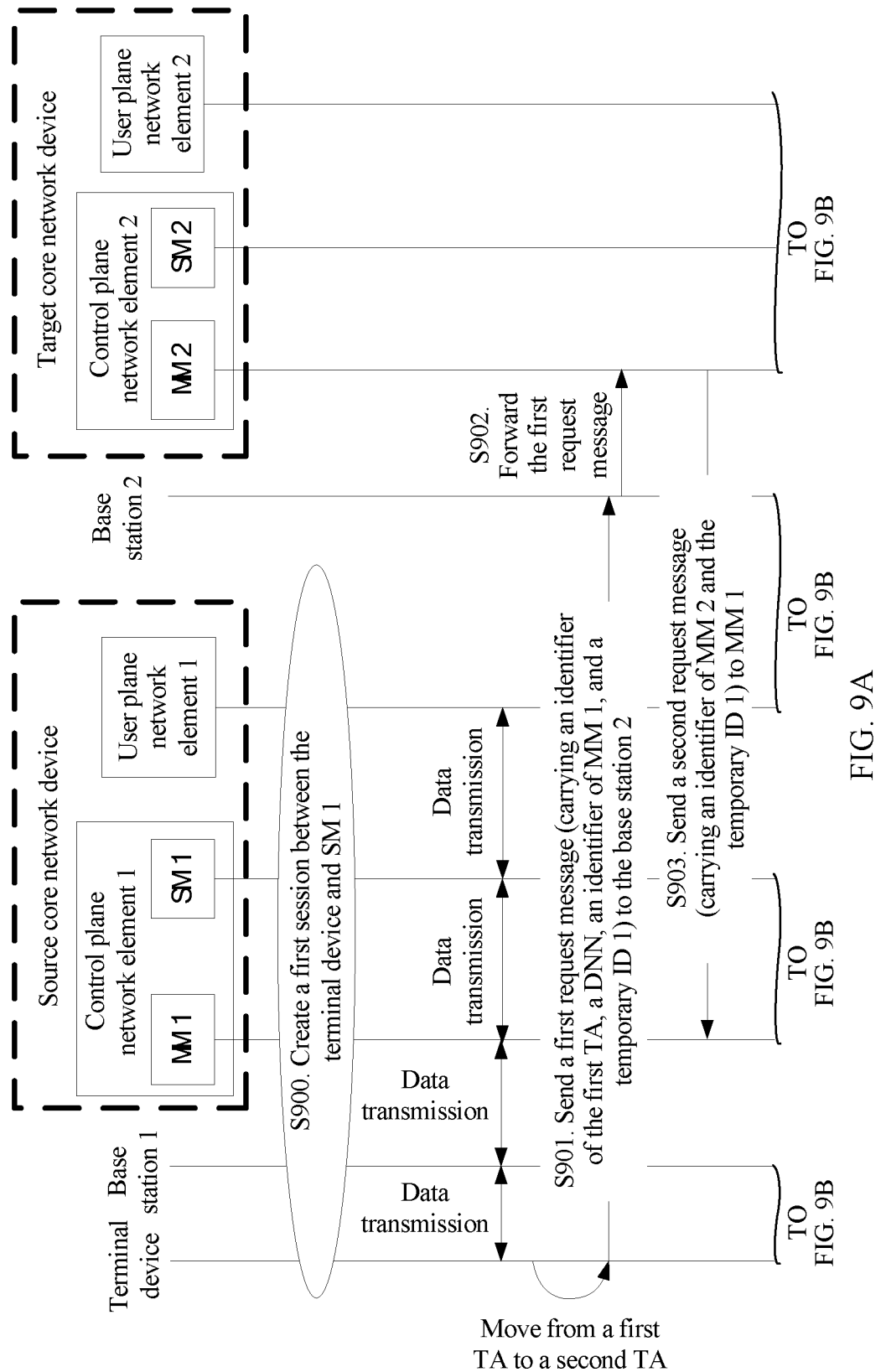
FIG. 9A, FIG. 9B, FIG. 9C, and FIG. 9D are a schematic flowchart 7 of a session migration method according to an embodiment of this application.
Figure 9B:
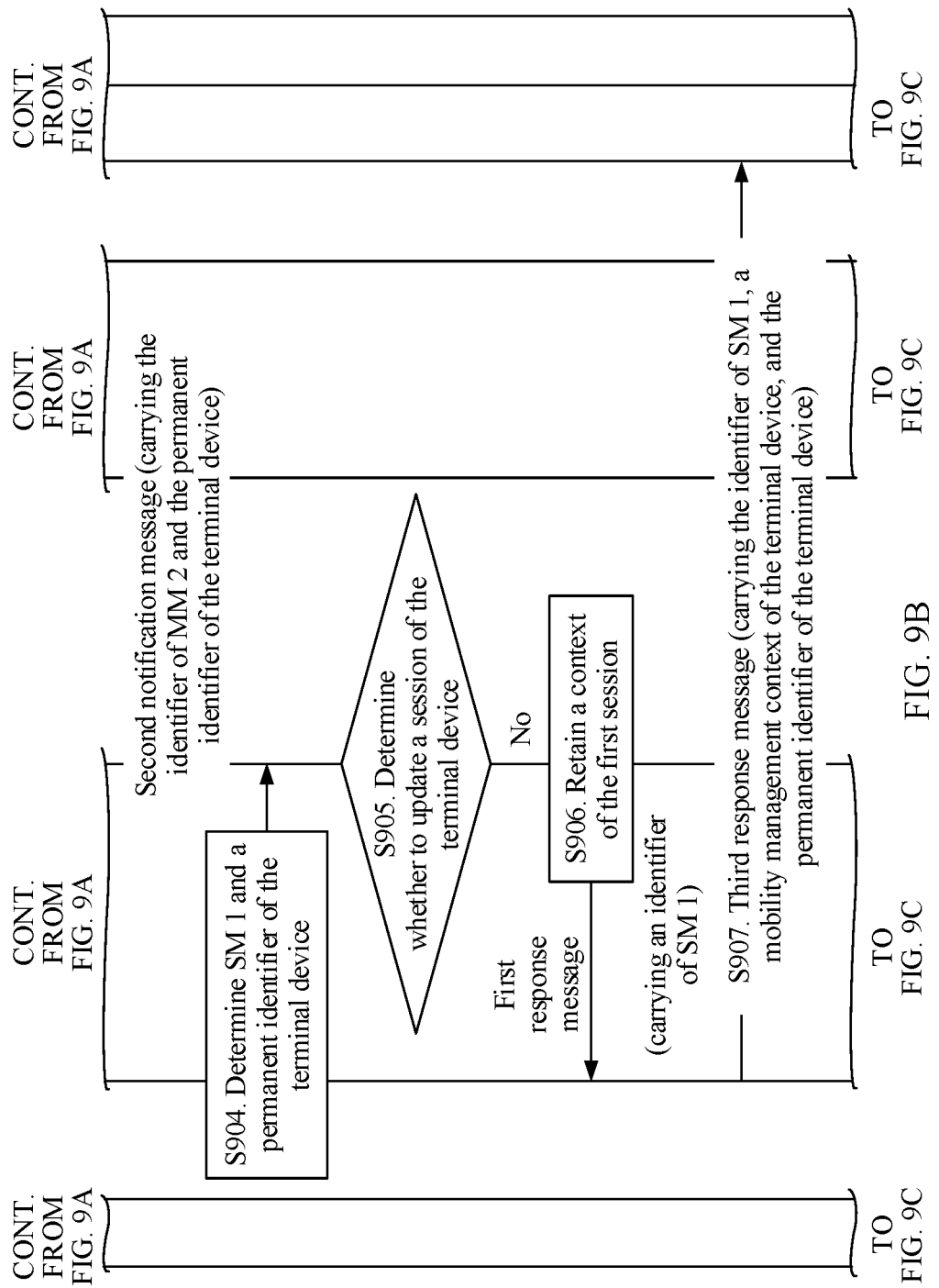
Figure 9C:
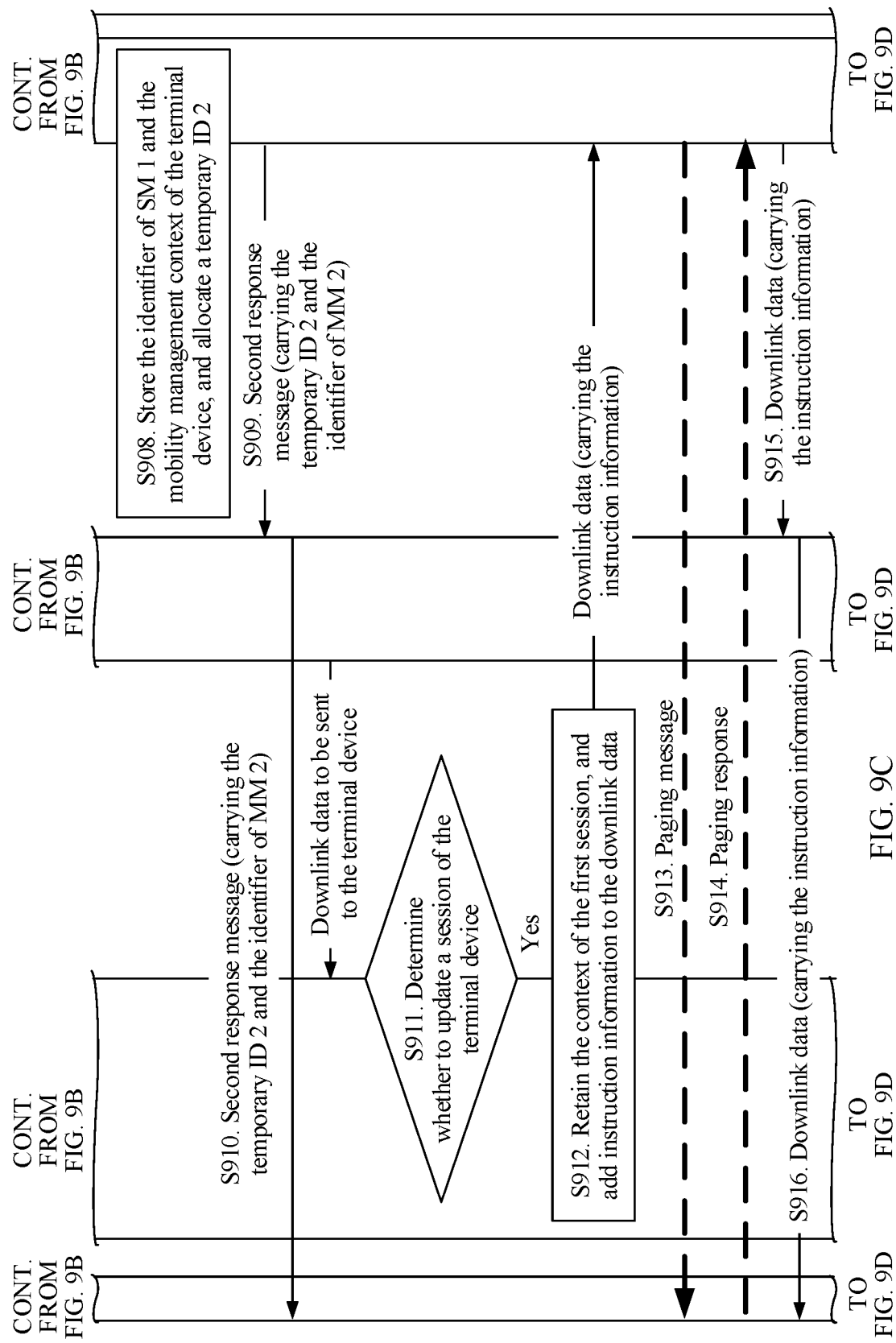
Figure 9D:
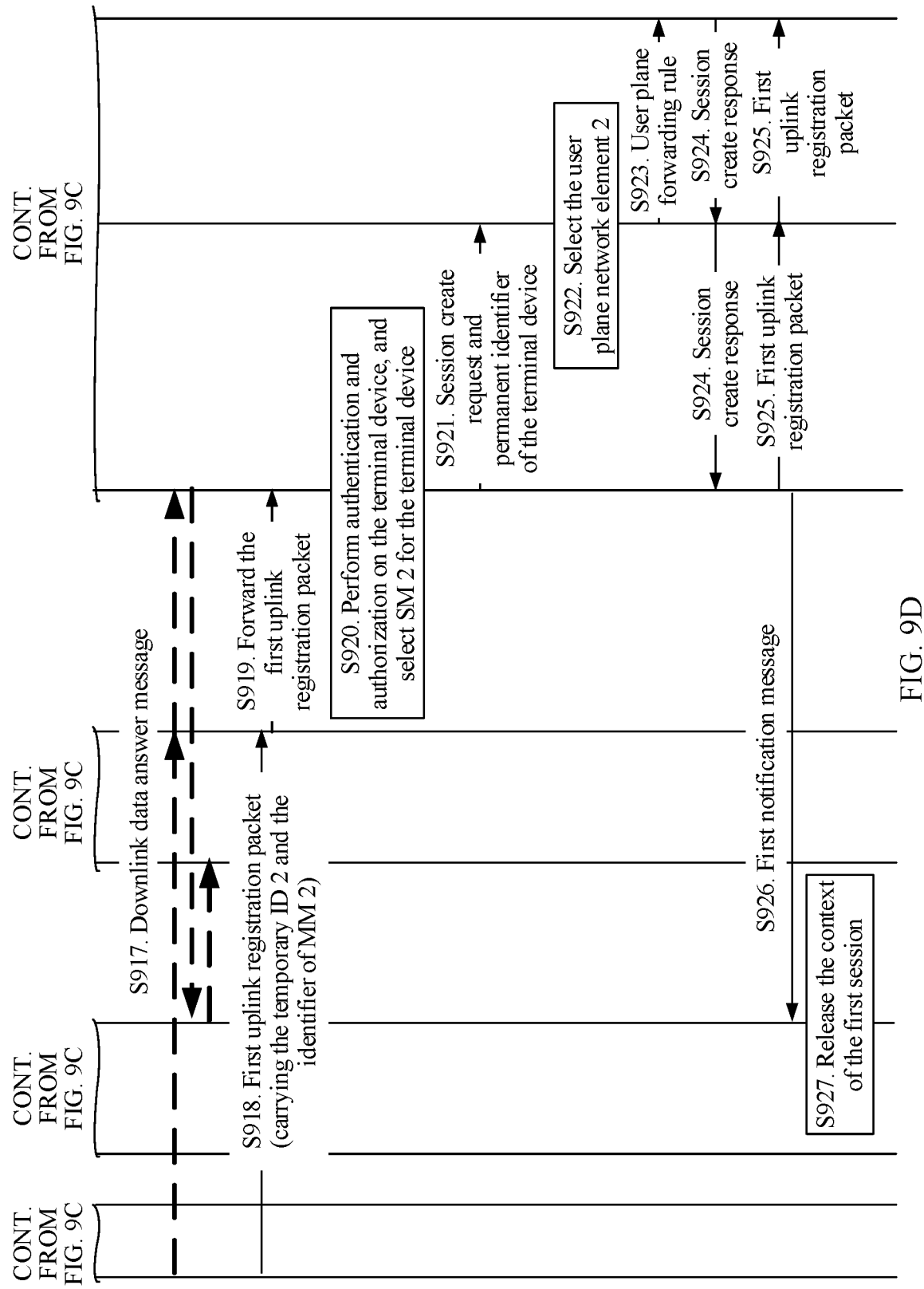

FIG. 3 is a schematic flowchart of a session migration method according to an embodiment of this application. The session migration method may be applied to the next-generation wireless communications system shown in FIG. 1.

Referring to FIG. 3, the session migration method includes the following operations.

S300. Create a first session between a terminal device and SM 1.

A service area of SM 1 includes a first TA, and SM 1 stores a context of the first session.

If the first session is created between the terminal device and SM 1, it indicates that MM 1 has authenticated and authorized the terminal device, has allocated a temporary ID (in this embodiment of this application, the temporary ID is represented by a temporary ID 1) to the terminal device, and the like. SM 1 has selected a user plane network element 1 for the terminal device, has allocated an IP address to the terminal device, and the like.

A method for creating the first session herein may be as follows: When the terminal device attaches to a network corresponding to the first TA, MM 1 selects SM 1, and SM 1 creates the first session for the terminal device based on session management subscription data of the terminal device, and stores the context of the first session. Alternatively, after the terminal device attaches to a network, the terminal device sends a session create request to MM 1, to request MM 1 to select SM 1, so that SM 1 creates the session for the terminal device, and the terminal device sends uplink data after the session is created. Alternatively, after the terminal device attaches to a network of the first TA, the terminal device directly sends uplink data, to trigger MM 1 to create the first session between SM 1 and the terminal device. In other words, for the method for creating the first session herein, refer to the method 1, the method 2, or the method 3 for creating a session.

S301. SM 1 determines whether to update a session of the terminal device.

In one embodiment, SM 1 determines, based on the first condition, whether to update a session of the terminal device.

The first condition includes that an identifier of MM 1 is different from an identifier of MM 2. A method for obtaining the identifier of MM 2 by SM 1 is as follows: After the first session is created between SM 1 and the terminal device, SM 1 receives a second notification message that is sent by MM 1 and that carries the identifier of MM 2.

In one embodiment, the first condition further includes that an amount of uplink data received by SM 1 in a preset time period is greater than or equal to a preset threshold. The uplink data received by SM 1 in the preset time period herein may include uplink data sent by the terminal device, or may include uplink data sent by another terminal device, where a session is created between SM 1 and the another terminal device.

S302. If SM 1 determines to update a session of the terminal device, SM 1 retains the context of the first session, and sends instruction information to a first device.

The instruction information is used to instruct the first device to trigger creation of a second session after the first device obtains to-be-sent data of the terminal device. The first device is the terminal device or MM 2, and the second session is a session between SM 2 and the terminal device.

If the first device is the terminal device, the instruction information is used to instruct the terminal device to send a session create request to MM 2 after the terminal device obtains to-be-sent data of the terminal device, to trigger creation of the second session. FIG. 4A, FIG. 4B, FIG. 4C, and FIG. 4D or FIG. 5A, FIG. 5B, FIG. 5C, and FIG. 5D show a procedure in this application scenario. Alternatively, the instruction information is used to instruct the terminal device to send a session create request to MM 2 immediately after the terminal device obtains the instruction information, to trigger creation of the second session. FIG. 8A, FIG. 8B, FIG. 8C, and FIG. 8D show a procedure in this application scenario. Alternatively, the instruction information is used to instruct the terminal device to send a first uplink registration packet to MM 2 immediately after the terminal device obtains the instruction information, to trigger creation of the second session. FIG. 9A, FIG. 9B, FIG. 9C, and FIG. 9D show a procedure in this application scenario.

A case in which the first device is the terminal device is represented by S302a in FIG. 3.

If the first device is MM 2, the instruction information is used to instruct MM 2 to select SM 2 after MM 2 obtains uplink data sent by the terminal device, to trigger creation of the second session. FIG. 6A, FIG. 6B, FIG. 6C, and FIG. 6D or FIG. 7A, FIG. 7B, FIG. 7C, and FIG. 7D show a procedure in this application scenario.

A case in which the first device is MM 2 is represented by S302b in FIG. 3.

S303. The first device triggers creation of the second session after obtaining the to-be-sent data of the terminal device.

If the first device is the terminal device, S303a is performed after S302a. If the first device is MM 2, S303b is performed after S302b.

S304. After the second session is created, MM 2 sends a first notification message to SM 1.

Regardless of whether the first device is the terminal device or MM 2, after the second session is created, MM 2 may send the first notification message to SM 1.

S305. SM 1 releases the context of the first session.

In this embodiment of this application, before the second session is created, SM 1 retains the context of the first session. Therefore, even if there is downlink data to be sent to the terminal device, the downlink data can be accurately sent to the terminal device, so that no packet loss occurs in the downlink data. In addition, creation of the second session is triggered by the first device after the first device obtains the to-be-sent data of the terminal device. Therefore, a case in which the second session is created but no data is transmitted does not occur, so that waste of core network resources and unnecessary signaling transmission are reduced.

For better understanding of the session migration method provided in the embodiments of this application, the embodiments of this application describe each of the foregoing application scenarios.

Referring to FIG. 4A, FIG. 4B, FIG. 4C, and FIG. 4D, a session migration method provided in an embodiment of this application includes the following operations.

S400. Create a first session between a terminal device and SM 1.

Herein, a service area of SM 1 includes a first TA, and SM 1 stores a context of the first session.

If the first session is created between the terminal device and SM 1, it indicates that MM 1 has authenticated and authorized the terminal device, has allocated a temporary ID (in this embodiment of this application, the temporary ID is represented by a temporary ID 1) to the terminal device, and the like. SM 1 has selected a user plane network element 1 for the terminal device, has allocated an IP address to the terminal device, and the like.

A method for creating the first session herein may be as follows: When the terminal device attaches to a network of the first TA, MM 1 selects SM 1, and SM 1 creates the first session for the terminal device based on session management subscription data of the terminal device, and stores the context of the first session. Alternatively, after the terminal device attaches to a network, the terminal device sends a session create request to MM 1, to request MM 1 to select SM 1, so that SM 1 creates the session for the terminal device, and the terminal device sends uplink data after the session is created. In other words, for the method for creating the first session herein, refer to the method 1 or the method 2 for creating a session.

After the first session is created between the terminal device and SM 1, data of the terminal device is transmitted based on the first session. As shown in FIG. 4A, FIG. 4B, FIG. 4C, and FIG. 4D, uplink data of the terminal device is transmitted in a path of the terminal device→a base station 1→MM 1→SM 1→the user plane network element 1. Correspondingly, downlink data to be sent to the terminal device is transmitted in a path of the user plane network element 1→SM 1→MM 1→the base station 1→the terminal device.

In this embodiment of this application, the context of the first session includes an IP address of the terminal device, address information of the user plane network element 1, and address information of SM 1 function entity in the first session.

S401. The terminal device sends a first request message to a base station 2 after moving from the first TA to a second TA.

After the terminal device moves from the first TA to the second TA, a base station serving the terminal device is updated from the base station 1 to the base station 2.

After moving to the second TA, the terminal device detects whether the second TA is in a TA list (the TA list is sent by MM 1 to the terminal device in a process in which the terminal device attaches to the network) stored on the terminal device. If the second TA is not in the TA list stored on the terminal device, the terminal device sends, to the base station 2, the first request message that carries an identifier of the first TA, a DNN, an identifier of MM 1, and the temporary ID 1 of the terminal device.

The DNN is used to identify a data network to which the terminal device is connected by using the base station 1, MM 1, and SM 1.

In this embodiment of this application, the first request message may be a tracking area update (TAU) request message.

S402. The base station 2 forwards the first request message in S401 to MM 2.

Because there is no interface connection between the base station 2 and MM 1, the base station 2 cannot find MM 1 through addressing based on the identifier of MM 1 carried in the first request message. After the terminal device moves to the second TA, the base station 2 serves the terminal device, and correspondingly, the base station 2 may obtain position information of the terminal device. In this case, the base station 2 selects MM 2 in the second TA for the terminal device based on the position information of the terminal device, and forwards the first request message to MM 2.

S403. MM 2 sends a second request message to MM 1, to request to obtain a mobility management context of the terminal device.

Different from the context of the first session, the mobility management context of the terminal device in this embodiment of this application is a context related to mobility management. For example, the mobility management context of the terminal device includes mobility management subscription data of the terminal device.

MM 2 determines MM 1 based on the identifier of MM 1 that is carried in the first request message received by MM 2, and sends the second request message to MM 1, to request to obtain the mobility management context of the terminal device. The second request message carries an identifier of MM 2 and the temporary ID 1.

Although MM 1 and MM 2 belong to different TAs, there is a communication connection between MM 1 and MM 2. Therefore, MM 2 may directly send the second request message to MM 1.

S404. MM 1 searches a mobility management context list stored on MM 1, to determine that SM corresponding to the temporary ID 1 is SM 1 and determine a permanent identifier of the terminal device corresponding to the temporary ID 1, and sends a second notification message to SM 1, to instruct SM 1 to update, to the identifier of MM 2, the identifier of MM 1 in the context that is of the first session and that is stored on SM 1.

The second notification message carries the identifier of MM 2 and the permanent identifier of the terminal device.

S405. SM 1 determines, based on the identifier of MM 2, whether to update a session of the terminal device.

For example, after receiving the second notification message, SM 1 determines that the identifier of MM 2 in the second notification message is different from the identifier of MM 1 that is stored on SM 1. In this case, SM 1 determines that the terminal device moves. After determining that the terminal device moves, SM 1 updates the identifier of MM 1 in the context of the first session to the identifier of MM 2.

After determining that the terminal device moves, SM 1 determines whether a current data transmission path meets a preset condition (the preset condition may be that a hop count of the data transmission path is greater than or equal to a preset hop count), to determine whether to update a session of the terminal device; or SM 1 determines whether an amount of uplink data received by SM 1 in a preset time period is greater than or equal to a preset threshold, to determine, based on a determining result, whether to update a session of the terminal device, where the preset time period herein is any time period whose time length is a preset length.

In one embodiment, if SM 1 determines that the hop count of the current data transmission path is greater than or equal to the preset hop count, SM 1 determines to update a session of the terminal device. On the contrary, SM 1 determines that a session of the terminal device does not need to be updated temporarily.

In one embodiment, if SM 1 determines that the amount of uplink data received by SM 1 in the preset time period is greater than or equal to the preset threshold, SM 1 determines to update a session of the terminal device. On the contrary, SM 1 determines that a session of the terminal device does not need to be updated temporarily.

S406. If SM 1 determines to update a session of the terminal device, SM 1 retains the context of the first session, and sends, to MM 1, a first response message that carries instruction information and an identifier of SM 1.

For example, if the identifier of MM 2 is different from the identifier of MM 1 that is stored on SM 1, and the amount of uplink data received by SM 1 in the preset time period is greater than or equal to the preset threshold, SM 1 determines to update a session of the terminal device.

The instruction information in this embodiment (the embodiment shown in FIG. 4A, FIG. 4B, FIG. 4C, and FIG. 4D) is used to instruct the terminal device to send a session create request to MM 2 after the terminal device obtains to-be-sent data of the terminal device, to trigger creation of a second session.

S407. MM 1 sends, to MM 2, a third response message that carries the instruction information, the identifier of SM 1, the mobility management context of the terminal device, and the permanent identifier of the terminal device.

S408. MM 2 stores the identifier of SM 1 and the mobility management context of the terminal device, and allocates a new temporary ID (in this embodiment of this application, the new temporary ID is represented by a temporary ID 2) to the terminal device.

S409. MM 2 sends, to the base station 2, a second response message that carries the instruction information, the temporary ID 2, and the identifier of MM 2.

S410. The base station 2 forwards the second response message in S409 to the terminal device.

After receiving the second response message that carries the instruction information, the terminal device sends the session create request to MM 2 after obtaining the to-be-sent data of the terminal device, to trigger creation of the second session between the terminal device and SM 2.

Because SM 1 retains the context of the first session, before the second session is created, even if the user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device (for example, in a roaming scenario). This is not limited in this embodiment of this application.

S411. After obtaining the to-be-sent data of the terminal device, the terminal device sends, to the base station 2, the session create request that carries the DNN and session type information.

It can be learned from the foregoing description that uplink data may be represented in a form of an uplink data packet, and the uplink data packet sent by the terminal device may be an IP packet, or may be a non-IP packet. The session type information in the session create request is used to indicate a type of the uplink data packet (in other words, whether the session is a session of an IP type).

S412. The base station 2 forwards the session create request in S411 to MM 2.

S413. MM 2 performs authentication and authorization on the terminal device based on the mobility management context of the terminal device, and selects SM 2 for the terminal device based on the DNN and the session type information that are carried in the session create request in S412 and subscription data of the terminal device that is locally stored on MM 2.

S414. MM 2 sends the session create request and the permanent identifier of the terminal device to SM 2.

S415. SM 2 obtains the session management subscription data of the terminal device based on the permanent identifier of the terminal device, and selects a user plane network element 2 for the terminal device based on the session management subscription data of the terminal device.

For example, SM 2 sends a subscription data request to a UDM function entity based on the permanent identifier of the terminal device, to obtain the session management subscription data of the terminal device.

If the session type information in the session create request indicates that the uplink data packet transmitted in the session is an IP packet, SM-2 further needs to allocate a new IP address to the terminal device.

S416. SM 2 sends a user plane forwarding rule to the user plane network element 2, and creates a context of the second session.

S417. SM 2 sends a session create response to MM 2, MM 2 sends the session create response to the base station 2, and the base station 2 sends the session create response to the terminal device.

After the terminal device receives the session create response, a creation process of the second session ends. In this case, uplink data of the terminal device is transmitted in a path of the terminal device→the base station 2→MM 2→SM 2→the user plane network element 2. Correspondingly, downlink data to be sent to the terminal device is transmitted in a path of the user plane network element 2→SM 2→MM 2→the base station 2→the terminal device.

After the second session is created, MM 2 may further send a first notification message to SM 1, to instruct SM 1 to release the context of the first session, so that resource waste of a source core network device is reduced.

As shown in FIG. 4A, FIG. 4B, FIG. 4C, and FIG. 4D, after S417, the session migration method provided in this embodiment of this application further includes S418 and S419.

S418. MM 2 sends the first notification message to SM 1, to instruct SM 1 to release the context of the first session.

A transmission path of the first notification message may be MM 2→SM 1, or may be MM 2→MM 1→SM 1. This is not limited in this embodiment of this application.

S419. SM 1 releases the context of the first session.

It can be learned from the foregoing description that there is also another application scenario in this embodiment of this application: After receiving the second notification message, SM 1 determines that a session of the terminal device does not need to be updated. A procedure in this application scenario is shown in FIG. 5A, FIG. 5B, FIG. 5C, and FIG. 5D in the embodiments of this application.

Referring to FIG. 5A, FIG. 5B, FIG. 5C, and FIG. 5D, a session migration method provided in an embodiment of this application includes the following operations.

S500. Create a first session between a terminal device and SM 1.

S501. The terminal device sends a first request message to a base station 2 after moving from a first TA to a second TA.

The first request message carries an identifier of the first TA, a DNN, an identifier of MM 1, and a temporary ID 1 of the terminal device.

S502. The base station 2 forwards the first request message in S501 to MM 2.

S503. MM 2 sends a second request message to MM 1, to request to obtain a mobility management context of the terminal device.

S504. MM 1 searches a mobility management context list stored on MM 1, to determine that SM corresponding to the temporary ID 1 is SM 1 and determine a permanent identifier of the terminal device corresponding to the temporary ID 1, and sends a second notification message to SM 1, to instruct SM 1 to update, to an identifier of MM 2, the identifier of MM 1 in a context that is of the first session and that is stored on SM 1.

The second notification message carries the identifier of MM 2 and the permanent identifier of the terminal device.

S505. SM 1 determines, based on the identifier of MM 2, whether to update a session of the terminal device.

After receiving the second notification message, SM 1 determines that the identifier of MM 2 in the second notification message is different from the identifier of MM 1 that is stored on SM 1. In this case, SM 1 determines that the terminal device moves. After determining that the terminal device moves, SM 1 updates the identifier of MM 1 in the context of the first session to the identifier of MM 2.

After determining that the terminal device moves, SM 1 determines whether to update a session of the terminal device. For a method for determining whether to update a session of the terminal device by SM 1 herein, refer to the description in S405. Details are not described herein again.

S506. If SM 1 determines that a session of the terminal device does not need to be updated temporarily, SM 1 retains the context of the first session, and sends, to MM 1, a first response message that carries an identifier of SM 1.

In comparison with S406, in S506, although the identifier of MM 2 is different from the identifier of MM 1 that is stored on SM 1, an amount of uplink data received by SM 1 in a preset time period is less than a preset threshold, and therefore SM 1 determines that a session of the terminal device does not need to be updated temporarily.

S507. MM 1 sends, to MM 2, a third response message that carries the identifier of SM 1, the mobility management context of the terminal device, and the permanent identifier of the terminal device.

S508. MM 2 stores the identifier of SM 1 and the mobility management context of the terminal device, and allocates a temporary ID 2 to the terminal device.

S509. MM 2 sends, to the base station 2, a second response message that carries the temporary ID 2 and the identifier of MM 2.

S510. The base station 2 forwards the second response message in S509 to the terminal device.

As in the embodiment shown in FIG. 4A, FIG. 4B, FIG. 4C, and FIG. 4D, in the embodiment shown in FIG. 5A, FIG. 5B, FIG. 5C, and FIG. 5D, because SM 1 retains the context of the first session, before a second session is created, even if a user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device. This is not limited in this embodiment of this application.

After the preset time period elapses after SM 1 determines, in S506, that a session of the terminal device does not need to be updated temporarily, SM 1 re-determines whether to update a session of the terminal device.

S511. SM 1 determines whether to update a session of the terminal device.

SM 1 has determined, in S505, that the terminal device moves. Therefore, in S511, SM 1 determines whether an amount of uplink data received by SM 1 in the preset time period that elapses after S506 is greater than or equal to the preset threshold.

If the amount of uplink data received by SM 1 in the preset time period that elapses after S506 is greater than or equal to the preset threshold, SM 1 determines to update a session of the terminal device. If the amount of uplink data received by SM 1 in the preset time period that elapses after S506 is less than the preset threshold, SM 1 still determines that a session of the terminal device does not need to be updated temporarily.

In a process of performing S511, the terminal device may send uplink data, and correspondingly, SM 1 receives the uplink data, and sends the uplink data received by SM 1 to the user plane network element 1. Then SM 1 receives an uplink data answer message sent by the user plane network element 1.

In one embodiment, the uplink data answer message may be a message that carries an ACK.

S512. If SM 1 determines to update a session of the terminal device, SM 1 retains the context of the first session, adds instruction information to the received uplink data answer message, and sends, to MM 2, the uplink data answer message that carries the instruction information.

The instruction information in this embodiment (the embodiment shown in FIG. 5A, FIG. 5B, FIG. 5C, and FIG. 5D) is used to instruct the terminal device to send a session create request to MM 2 after the terminal device obtains to-be-sent data of the terminal device, to trigger creation of the second session.

S513. MM 2 forwards, to the base station 2, the uplink data answer message that carries the instruction information.

S514. The base station 2 forwards, to the terminal device, the uplink data answer message that carries the instruction information.

After receiving the uplink data answer message that carries the instruction information, the terminal device sends the session create request to MM 2 after obtaining the to-be-sent data of the terminal device, to trigger creation of the second session between the terminal device and SM 2.

S515. After obtaining the to-be-sent data of the terminal device, the terminal device sends, to the base station 2, the session create request that carries the DNN and session type information.

S516. The base station 2 forwards the session create request in S515 to MM 2.

S517. MM 2 performs authentication and authorization on the terminal device based on the mobility management context of the terminal device, and selects SM 2 for the terminal device based on the DNN and the session type information that are carried in the session create request in S516 and subscription data of the terminal device that is locally stored on MM 2.

S518. MM 2 sends the session create request and the permanent identifier of the terminal device to SM 2.

S519. SM 2 obtains session management subscription data of the terminal device based on the permanent identifier of the terminal device, and selects a user plane network element 2 for the terminal device based on the session management subscription data of the terminal device.

S520. SM 2 sends a user plane forwarding rule to the user plane network element 2, and creates a context of the second session.

S521. SM 2 sends a session create response to MM 2, MM 2 sends the session create response to the base station 2, and the base station 2 sends the session create response to the terminal device.

After the second session is created, MM 2 may further send a first notification message to SM 1, to instruct SM 1 to release the context of the first session, so that resource waste of a source core network device is reduced.

As shown in FIG. 5A, FIG. 5B, FIG. 5C, and FIG. 5D, after S521, the session migration method provided in this embodiment of this application further includes S522 and S523.

S522. MM 2 sends the first notification message to SM 1, to instruct SM 1 to release the context of the first session.

S523. SM 1 releases the context of the first session.

For S500 to S505, refer to the description of S400 to S405 in FIG. 4A, FIG. 4B, FIG. 4C, and FIG. 4D. For S515 to S523, refer to the description of S411 to S419 in FIG. 4A, FIG. 4B, FIG. 4C, and FIG. 4D. Details are not described herein again.

In the embodiment shown in FIG. 4A, FIG. 4B, FIG. 4C, and FIG. 4D or FIG. 5A, FIG. 5B, FIG. 5C, and FIG. 5D, before the second session is created, SM 1 retains the context of the first session. Therefore, even if there is downlink data to be sent to the terminal device, the downlink data can be accurately sent to the terminal device, so that no packet loss occurs in the downlink data. In addition, the second session is created by the target MM 2, and this is triggered by the terminal device after the terminal device obtains the to-be-sent data of the terminal device. Therefore, a case in which the second session is created but no data is transmitted does not occur, so that waste of core network resources and unnecessary signaling transmission are reduced.

In the embodiment shown in FIG. 4A, FIG. 4B, FIG. 4C, and FIG. 4D or FIG. 5A, FIG. 5B, FIG. 5C, and FIG. 5D, the method 1 or the method 2 for creating a session is used for creating the first session between the terminal device and SM 1. It can be learned from the foregoing description that there are three existing session creation methods (the method 1, the method 2, and the method 3). A session migration method provided in an embodiment shown in FIG. 6A, FIG. 6B, FIG. 6C, and FIG. 6D is applicable to an application scenario in which a first session is created between a terminal device and SM 1 by using the method 3 and the terminal device moves from a first TA to a second TA. In this application scenario, instruction information is used to instruct MM 2 to select SM 2 after MM 2 obtains to-be-sent uplink data of the terminal device, to trigger creation of a second session.

As shown in FIG. 6A, FIG. 6B, FIG. 6C, and FIG. 6D, in this application scenario, the session migration method provided in this embodiment of this application includes the following operations.

S600. Create the first session between the terminal device and SM 1.

A method for creating the first session herein is as follows: After the terminal device attaches to a network of the first TA, the terminal device directly sends uplink data, to trigger MM 1 to create the first session between SM 1 and the terminal device. For a process of creating the first session herein, refer to the method 3 for creating a session.

As in the embodiment shown in FIG. 4A, FIG. 4B, FIG. 4C, and FIG. 4D or FIG. 5A, FIG. 5B, FIG. 5C, and FIG. 5D, after the first session is created between the terminal device and SM 1 in S600, data of the terminal device is transmitted based on the first session. As shown in FIG. 6A, FIG. 6B, FIG. 6C, and FIG. 6D, uplink data of the terminal device is transmitted in a path of the terminal device→a base station 1→MM 1→SM 1→a user plane network element 1. Correspondingly, downlink data to be sent to the terminal device is transmitted in a path of the user plane network element 1→SM 1→MM 1→the base station 1→the terminal device.

S601. The terminal device sends a first request message to a base station 2 after moving from the first TA to the second TA.

The first request message carries an identifier of the first TA, a DNN, an identifier of MM 1, and a temporary ID 1.

S602. The base station 2 forwards the first request message in S601 to MM 2.

S603. MM 2 sends, to MM 1, a second request message that carries an identifier of MM 2 and the temporary ID 1, to request to obtain a mobility management context of the terminal device.

S604. MM 1 searches a mobility management context list stored on MM 1, to determine that SM corresponding to the temporary ID 1 is SM 1 and determine a permanent identifier of the terminal device corresponding to the temporary ID 1, and sends, to SM 1, a second notification message that carries the identifier of MM 2 and the permanent identifier of the terminal device, to instruct SM 1 to update, to the identifier of MM 2, the identifier of MM 1 in a context that is of the first session and that is stored on SM 1.

S605. SM 1 determines, based on the identifier of MM 2, whether to update a session of the terminal device.

S606. If SM 1 determines to update a session of the terminal device, SM 1 retains the context of the first session, and sends, to MM 1, a first response message that carries the instruction information and an identifier of SM 1.

The instruction information in this embodiment (the embodiment shown in FIG. 6A, FIG. 6B, FIG. 6C, and FIG. 6D) is used to instruct MM 2 to select SM 2 after MM 2 obtains to-be-sent uplink data of the terminal device, to trigger creation of the second session.

S607. MM 1 sends, to MM 2, a third response message that carries the instruction information, the identifier of SM 1, the mobility management context of the terminal device, and the permanent identifier of the terminal device.

S608. MM 2 stores the identifier of SM 1 and the mobility management context of the terminal device, and allocates a temporary ID 2 to the terminal device.

S609. MM 2 sends, to the base station 2, a second response message that carries the temporary ID 2 and the identifier of MM 2.

S610. The base station 2 forwards the second response message in S609 to the terminal device.

Because SM 1 retains the context of the first session, before the second session is created, even if the user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device. This is not limited in this embodiment of this application.

S611. The terminal device sends, to the base station 2, an uplink data packet that carries the temporary ID 2 and the identifier of MM 2.

S612. The base station 2 forwards the uplink data packet in S611 to MM 2.

S613. After receiving the uplink data packet, MM 2 performs authentication and authorization on the terminal device according to the instruction information by using the mobility management context of the terminal device, and selects SM 2 for the terminal device based on information such as subscription data of the terminal device and a data type of the uplink data packet.

S614. MM 2 sends a session create request and the permanent identifier of the terminal device to SM 2.

S615. SM 2 obtains session management subscription data of the terminal device based on the permanent identifier of the terminal device, and selects a user plane network element 2 for the terminal device based on the session management subscription data of the terminal device.

S616. SM 2 sends a user plane forwarding rule to the user plane network element 2, and creates a context of the second session.

S617. SM 2 sends a session create response to MM 2.

S618. MM 2 sends the uplink data packet received by MM 2 in S612 to SM 2, and SM 2 forwards the uplink data packet to the user plane network element 2.

After MM 2 receives the session create response, a creation process of the second session ends. In this case, uplink data of the terminal device is transmitted in a path of the terminal device→the base station 2→MM 2→SM 2→the user plane network element 2. Correspondingly, downlink data to be sent to the terminal device is transmitted in a path of the user plane network element 2→SM 2→MM 2→the base station 2→the terminal device.

After the second session is created, MM 2 may further send a first notification message to SM 1, to instruct SM 1 to release the context of the first session, so that resource waste of a source core network device is reduced.

As shown in FIG. 6A, FIG. 6B, FIG. 6C, and FIG. 6D, after S617, the session migration method provided in this embodiment of this application further includes S619 and S620.

S619. MM 2 sends the first notification message to SM 1, to instruct SM 1 to release the context of the first session.

A transmission path of the first notification message may be MM 2→SM 1, or may be MM 2→MM 1→SM 1. This is not limited in this embodiment of this application.

S620. SM 1 releases the context of the first session.

In this embodiment of this application, SM 1 may perform S618 before S619, or may perform S619 before S618, or may perform S618 and S619 simultaneously. This is not limited in this embodiment of this application.

S600 to S608 in this embodiment are similar to S400 to S408 in the embodiment shown in FIG. 4A, FIG. 4B, FIG. 4C, and FIG. 4D. A difference lies in that the method for creating the first session in S600 in this embodiment is different from the method for creating the first session in S400, and content indicated by the instruction information in this embodiment is different from content indicated by the instruction information in the embodiment shown in FIG. 4A, FIG. 4B, FIG. 4C, and FIG. 4D.

The instruction information in this embodiment instructs MM 2 to select SM 2 after MM 2 obtains the to-be-sent uplink data of the terminal device, to trigger creation of the second session. Therefore, in comparison with the embodiment shown in FIG. 4A, FIG. 4B, FIG. 4C, and FIG. 4D, in this embodiment, the instruction information does not need to be sent to the terminal device, and the session create request is initiated by MM 2, but the session create request is initiated by the terminal device in FIG. 4A, FIG. 4B, FIG. 4C, and FIG. 4D.

With reference to FIG. 6A, FIG. 6B, FIG. 6C, and FIG. 6D, in the session migration method provided in this embodiment of this application, after S605, SM 1 may alternatively determine that a session of the terminal device does not need to be updated. A procedure in this application scenario is shown in FIG. 7A, FIG. 7B, FIG. 7C, and FIG. 7D in the embodiments of this application.

Referring to FIG. 7A, FIG. 7B, FIG. 7C, and FIG. 7D, a session migration method provided in an embodiment of this application includes the following operations.

S700. Create a first session between a terminal device and SM 1.

S701. The terminal device sends a first request message to a base station 2 after moving from a first TA to a second TA.

The first request message carries an identifier of the first TA, a DNN, an identifier of MM 1, and a temporary ID 1.

S702. The base station 2 forwards the first request message in S701 to MM 2.

S703. MM 2 sends, to MM 1, a second request message that carries an identifier of MM 2 and the temporary ID 1, to request to obtain a mobility management context of the terminal device.

S704. MM 1 searches a mobility management context list stored on MM 1, to determine that SM corresponding to the temporary ID 1 is SM 1 and determine a permanent identifier of the terminal device corresponding to the temporary ID 1, and sends, to SM 1, a second notification message that carries the identifier of MM 2 and the permanent identifier of the terminal device, to instruct SM 1 to update, to the identifier of MM 2, the identifier of MM 1 in a context that is of the first session and that is stored on SM 1.

S705. SM 1 determines, based on the identifier of MM 2, whether to update a session of the terminal device.

S706. If SM 1 determines that a session of the terminal device does not need to be updated temporarily, SM 1 retains the context of the first session, and sends, to MM 1, a first response message that is of SM 1 and that carries an identifier of SM 1.

S707. MM 1 sends, to MM 2, a third response message that carries the identifier of SM 1, the mobility management context of the terminal device, and the permanent identifier of the terminal device.

S708. MM 2 stores the identifier of SM 1 and the mobility management context of the terminal device, and allocates a temporary ID 2 to the terminal device.

S709. MM 2 sends, to the base station 2, a second response message that carries the temporary ID 2 and the identifier of MM 2.

S710. The base station 2 forwards the second response message in S709 to the terminal device.

As in the embodiment shown in FIG. 6A, FIG. 6B, FIG. 6C, and FIG. 6D, in the embodiment shown in FIG. 7A, FIG. 7B, FIG. 7C, and FIG. 7D, because SM 1 retains the context of the first session, before a second session is created, even if a user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device. This is not limited in this embodiment of this application.

After a preset time period elapses after SM 1 determines, in S706, that a session of the terminal device does not need to be updated temporarily, SM 1 re-determines whether to update a session of the terminal device.

S711. SM 1 determines whether to update a session of the terminal device.

In a process of performing S711, the terminal device may send uplink data, and correspondingly, SM 1 receives the uplink data, and sends the uplink data received by SM 1 to the user plane network element 1. Then SM 1 receives an uplink data answer message sent by the user plane network element 1.

S712. If SM 1 determines to update a session of the terminal device, SM 1 retains the context of the first session, adds instruction information to the received uplink data answer message, and sends, to MM 2, the uplink data answer message that carries the instruction information.

The instruction information in this embodiment (the embodiment shown in FIG. 7A, FIG. 7B, FIG. 7C, and FIG. 7D) is used to instruct MM 2 to select SM 2 after MM 2 obtains to-be-sent uplink data of the terminal device, to trigger creation of the second session.

S713. MM 2 sends the uplink data answer message to the base station 2.

S714. The base station 2 sends the uplink data answer message to the terminal device.

S715. The terminal device sends, to the base station 2, an uplink data packet that carries the temporary ID 2 and the identifier of MM 2.

S716. The base station 2 forwards the uplink data packet in S715 to MM 2.

S717. After receiving the uplink data packet, MM 2 performs authentication and authorization on the terminal device according to the instruction information carried in the uplink data answer message received by MM 2 in S712 and by using the mobility management context of the terminal device, and selects SM 2 for the terminal device based on information such as subscription data of the terminal device and a data type of the uplink data packet.

S718. MM 2 sends a session create request and the permanent identifier of the terminal device to SM 2.

S719. SM 2 obtains session management subscription data of the terminal device based on the permanent identifier of the terminal device, and selects a user plane network element 2 for the terminal device based on the session management subscription data of the terminal device.

S720. SM 2 sends a user plane forwarding rule to the user plane network element 2, and creates a context of the second session.

S721. SM 2 sends a session create response to MM 2.

S722. MM 2 sends the uplink data packet received by MM 2 in S716 to SM 2, and SM 2 forwards the uplink data packet to the user plane network element 2.

After MM 2 receives the session create response, a creation process of the second session ends. In this case, uplink data of the terminal device is transmitted in a path of the terminal device→the base station 2→MM 2→SM 2→the user plane network element 2. Correspondingly, downlink data to be sent to the terminal device is transmitted in a path of the user plane network element 2→SM 2→MM 2→the base station 2→the terminal device.

After the second session is created, MM 2 may further send a first notification message to SM 1, to instruct SM 1 to release the context of the first session, so that resource waste of a source core network device is reduced.

As shown in FIG. 7A, FIG. 7B, FIG. 7C, and FIG. 7D, after S721, the session migration method provided in this embodiment of this application further includes S723 and S724.

S723. MM 2 sends the first notification message to SM 1, to instruct SM 1 to release the context of the first session.

A transmission path of the first notification message may be MM 2→SM 1, or may be MM 2→MM 1→SM 1. This is not limited in this embodiment of this application.

S724. SM 1 releases the context of the first session.

In this embodiment of this application, SM 1 may perform S723 before S724, or may perform S724 before S723, or may perform S723 and S724 simultaneously. This is not limited in this embodiment of this application.

S700 to S712 in this embodiment are similar to S500 to S512 in FIG. 5A, FIG. 5B, FIG. 5C, and FIG. 5D. A difference lies in that the instruction information in this embodiment is used to instruct MM 2 to select SM 2 after MM 2 obtains the to-be-sent uplink data of the terminal device, to trigger creation of the second session, but the instruction information in the embodiment shown in FIG. 5A, FIG. 5B, FIG. 5C, and FIG. 5D is used to instruct the terminal device to send the session create request to MM 2 after the terminal device obtains to-be-sent data of the terminal device, to trigger creation of the second session.

For S700 to S705, refer to the description of S600 to S605 in FIG. 6A, FIG. 6B, FIG. 6C, and FIG. 6D. For S715 to S724, refer to the description of S611 to S620 in FIG. 6A, FIG. 6B, FIG. 6C, and FIG. 6D. Details are not described herein again.

In the embodiment shown in FIG. 6A, FIG. 6B, FIG. 6C, and FIG. 6D or FIG. 7A, FIG. 7B, FIG. 7C, and FIG. 7D, before the second session is created, SM 1 retains the context of the first session. Therefore, even if there is downlink data to be sent to the terminal device, the downlink data can be accurately sent to the terminal device, so that no packet loss occurs in the downlink data. In addition, creation of the second session is triggered by MM 2 after MM 2 obtains the to-be-sent uplink data of the terminal device. Therefore, a case in which the second session is created but no data is transmitted does not occur, so that waste of core network resources and unnecessary signaling transmission are reduced.

In comparison with the embodiment shown in FIG. 4A, FIG. 4B, FIG. 4C, and FIG. 4D or FIG. 5A, FIG. 5B, FIG. 5C, and FIG. 5D, in the embodiment shown in FIG. 6A, FIG. 6B, FIG. 6C, and FIG. 6D or FIG. 7A, FIG. 7B, FIG. 7C, and FIG. 7D, the terminal device is unaware of a session migration procedure, so that signaling transmission of the terminal device is further reduced.

It can be learned from the foregoing description that in the embodiment shown in FIG. 5A, FIG. 5B, FIG. 5C, and FIG. 5D, SM 1 determines whether the amount of uplink data received in the preset time period that elapses after S506 is greater than or equal to the preset threshold, to determine whether to update a session of the terminal device. Correspondingly, SM 1 may alternatively determine whether an amount of downlink data received in a preset time period that elapses after S506 is greater than or equal to a preset threshold, to determine whether to update a session of the terminal device.

With reference to FIG. 5A, FIG. 5B, FIG. 5C, and FIG. 5D, FIG. 8A, FIG. 8B, FIG. 8C, and FIG. 8D in the embodiments of this application show a procedure in an application scenario in which SM 1 determines whether an amount of downlink data received in a preset time period that elapses after S506 is greater than or equal to a preset threshold, to determine whether to update a session of a terminal device.

As shown in FIG. 8A, FIG. 8B, FIG. 8C, and FIG. 8D, a session migration method provided in an embodiment of this application includes the following operations.

S800. Create a first session between the terminal device and SM 1.

S801. The terminal device sends a first request message to a base station 2 after moving from a first TA to a second TA.

The first request message carries an identifier of the first TA, a DNN, an identifier of MM 1, and a temporary ID 1 of the terminal device.

S802. The base station 2 forwards the first request message in S801 to MM 2.

S803. MM 2 sends a second request message to MM 1, to request to obtain a mobility management context of the terminal device.

S804. MM 1 searches a mobility management context list stored on MM 1, to determine that SM corresponding to the temporary ID 1 is SM 1 and determine a permanent identifier of the terminal device corresponding to the temporary ID 1, and sends a second notification message to SM 1, to instruct SM 1 to update, to an identifier of MM 2, the identifier of MM 1 in a context that is of the first session and that is stored on SM 1.

The second notification message carries the identifier of MM 2 and the permanent identifier of the terminal device.

S805. SM 1 determines, based on the identifier of MM 2, whether to update a session of the terminal device.

S806. If SM 1 determines that a session of the terminal device does not need to be updated temporarily, SM 1 retains the context of the first session, and sends, to MM 1, a first response message that carries an identifier of SM 1.

S807. MM 1 sends, to MM 2, a third response message that carries the identifier of SM 1, the mobility management context of the terminal device, and the permanent identifier of the terminal device.

S808. MM 2 stores the identifier of SM 1 and the mobility management context of the terminal device, and allocates a temporary ID 2 to the terminal device.

S809. MM 2 sends, to the base station 2, a second response message that carries the temporary ID 2 and the identifier of MM 2.

S810. The base station 2 forwards the second response message in S809 to the terminal device.

Because SM 1 retains the context of the first session, before a second session is created, even if a user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device. This is not limited in this embodiment of this application.

After a preset time period elapses after SM 1 determines, in S806, that a session of the terminal device does not need to be updated temporarily, SM 1 re-determines whether to update a session of the terminal device.

S811. SM 1 determines whether to update a session of the terminal device.

SM 1 has determined, in S805, that the terminal device moves. Therefore, in S811, SM 1 determines whether an amount of downlink data received by SM 1 in the preset time period that elapses after S806 is greater than or equal to a preset threshold.

If the amount of downlink data received by SM 1 in the preset time period that elapses after S806 is greater than or equal to the preset threshold, SM 1 determines to update a session of the terminal device. If the amount of downlink data received by SM 1 in the preset time period that elapses after S806 is less than the preset threshold, SM 1 still determines that a session of the terminal device does not need to be updated temporarily.

In a process of performing S811, SM 1 may receive downlink data to be sent to the terminal device. The downlink data is data sent by the user plane network element 1 to SM 1.

S812. If SM 1 determines to update a session of the terminal device, SM 1 retains the context of the first session, adds instruction information to the received downlink data to be sent to the terminal device, and sends, to MM 2, the downlink data that carries the instruction information.

The instruction information in this embodiment (the embodiment shown in FIG. 8A, FIG. 8B, FIG. 8C, and FIG. 8D) is used to instruct the terminal device to send a session create request to MM 2 immediately after the terminal device obtains the instruction information, to trigger creation of the second session.

It is easy to understand that, in this embodiment, on the premise that an amount of downlink data that is received by SM 1 in a time period and that is to be sent to the terminal device is greater than or equal to the preset threshold, SM 1 determines to update a session of the terminal device. In this scenario, the second session needs to be created immediately, so that the downlink data to be sent to the terminal device is transmitted based on the second session.

After receiving the downlink data that carries the instruction information, MM 2 sends, to the terminal device, the downlink data that carries the instruction information. In one embodiment, because the terminal device does not send uplink data after moving to the second TA, the terminal device may be in an idle mode or may be in a connected mode. If the terminal device is in an idle mode, S813 and S814 are performed after S812, and S815 is performed after S814; or if the terminal device is in a connected mode, S814 is performed after S812. S813 and S814 are optional, and therefore are represented by dashed lines in FIG. 8A, FIG. 8B, FIG. 8C, and FIG. 8D.

S813. MM 2 sends a paging message to the terminal device.

S814. The terminal device sends a paging response to MM 2.

S815. MM 2 sends, to the base station 2, the downlink data that is received by MM 2 in S812 and that carries the instruction information.

S816. The base station 2 sends, to the terminal device, the downlink data that carries the instruction information.

S817. The terminal device sends a downlink data answer message to the base station 2, the base station 2 forwards the downlink data answer message to MM 2, MM 2 forwards the downlink data answer message to SM 1, and SM 1 forwards the downlink data answer message to the user plane network element 1.

S817 herein is an optional operation, and therefore is represented by a dashed line in FIG. 8A, FIG. 8B, FIG. 8C, and FIG. 8D.

S818. The terminal device sends, to the base station 2 according to the instruction information carried in the downlink data received by the terminal device in S816, the session create request that carries the DNN and session type information.

S819. The base station 2 forwards the session create request in S818 to MM 2.

S820. MM 2 performs authentication and authorization on the terminal device based on the mobility management context of the terminal device, and selects SM 2 for the terminal device based on the DNN and the session type information that are carried in the session create request in S819 and subscription data of the terminal device that is locally stored on MM 2.

S821. MM 2 sends the session create request and the permanent identifier of the terminal device to SM 2.

S822. SM 2 obtains session management subscription data of the terminal device based on the permanent identifier of the terminal device, and selects a user plane network element 2 for the terminal device based on the session management subscription data of the terminal device.

S823. SM 2 sends a user plane forwarding rule to the user plane network element 2, and creates a context of the second session.

S824. SM 2 sends a session create response to MM 2, MM 2 sends the session create response to the base station 2, and the base station 2 sends the session create response to the terminal device.

After the second session is created, MM 2 may further send a first notification message to SM 1, to instruct SM 1 to release the context of the first session, so that resource waste of a source core network device is reduced.

As shown in FIG. 8A, FIG. 8B, FIG. 8C, and FIG. 8D, after S824, the session migration method provided in this embodiment of this application further includes S825 and S826.

S825. MM 2 sends the first notification message to SM 1, to instruct SM 1 to release the context of the first session.

S826. SM 1 releases the context of the first session.

For S800 to S810, refer to the description of S500 to S510 in FIG. 5A, FIG. 5B, FIG. 5C, and FIG. 5D. For S819 to S826, refer to the description of S516 to S523 in FIG. 5A, FIG. 5B, FIG. 5C, and FIG. 5D. Details are not described herein again.

Further, a session migration process in this embodiment occurs due to downlink data. Therefore, after S824 in this embodiment, the terminal device further sends a second uplink registration packet to MM 2. After receiving the second uplink registration packet, MM 2 sends the second uplink registration packet to the user plane network element 2 by using SM 2. After receiving the second uplink registration packet, the user plane network element 2 forwards the second uplink registration packet to an application server, so that the application server updates a forwarding path that is of downlink data to be sent to the terminal device and that is stored on the application server. This process is not shown in FIG. 8A, FIG. 8B, FIG. 8C, and FIG. 8D.

It can be learned from the foregoing description that in the application scenario to which the embodiment shown in FIG. 8A, FIG. 8B, FIG. 8C, and FIG. 8D is applicable, the instruction information is used to instruct the terminal device to send the session create request to MM 2 immediately after the terminal device obtains the instruction information, to trigger creation of the second session. In addition, in the session migration method provided in the embodiments of this application, in the application scenario to which the embodiment shown in FIG. 8A, FIG. 8B, FIG. 8C, and FIG. 8D is applicable, the instruction information may be alternatively used to instruct the terminal device to send a first uplink registration packet to MM 2 immediately after the terminal device obtains the instruction information, to trigger creation of the second session. FIG. 9A, FIG. 9B, FIG. 9C, and FIG. 9D show a procedure in this case.

As shown in FIG. 9A, FIG. 9B, FIG. 9C, and FIG. 9D, a session migration method provided in an embodiment of this application includes the following operations.

S900. Create a first session between a terminal device and SM 1.

S901. The terminal device sends a first request message to a base station 2 after moving from a first TA to a second TA.

The first request message carries an identifier of the first TA, a DNN, an identifier of MM 1, and a temporary ID 1.

S902. The base station 2 forwards the first request message in S901 to MM 2.

S903. MM 2 sends, to MM 1, a second request message that carries an identifier of MM 2 and the temporary ID 1, to request to obtain a mobility management context of the terminal device.

S904. MM 1 searches a mobility management context list stored on MM 1, to determine that SM corresponding to the temporary ID 1 is SM 1 and determine a permanent identifier of the terminal device corresponding to the temporary ID 1, and sends, to SM 1, a second notification message that carries the identifier of MM 2 and the permanent identifier of the terminal device, to instruct SM 1 to update, to the identifier of MM 2, the identifier of MM 1 in a context that is of the first session and that is stored on SM 1.

S905. SM 1 determines, based on the identifier of MM 2, whether to update a session of the terminal device.

S906. If SM 1 determines that a session of the terminal device does not need to be updated temporarily, SM 1 retains the context of the first session, and sends, to MM 1, a first response message that is of SM 1 and that carries an identifier of SM 1.

S907. MM 1 sends, to MM 2, a third response message that carries the identifier of SM 1, the mobility management context of the terminal device, and the permanent identifier of the terminal device.

S908. MM 2 stores the identifier of SM 1 and the mobility management context of the terminal device, and allocates a temporary ID 2 to the terminal device.

S909. MM 2 sends, to the base station 2, a second response message that carries the temporary ID 2 and the identifier of MM 2.

S910. The base station 2 forwards the second response message in S909 to the terminal device.

Because SM 1 retains the context of the first session, before a second session is created, even if a user plane network element 1 receives downlink data to be sent to the terminal device, the downlink data can be transmitted to the terminal device, so that no packet loss occurs in the downlink data.

SM 1 is connected to MM 1, and may also be connected to MM 2, and SM 1 has learned that the terminal device has moved to a service area of MM 2. Therefore, for downlink data that is received by the user plane network element 1 and that is to be sent to the terminal device, the downlink data may be transmitted in a path of the user plane network element 1→SM 1→MM 2→the base station 2→the terminal device, or may be transmitted in a path of the user plane network element 1→SM 1→MM 1→MM 2→the base station 2→the terminal device. This is not limited in this embodiment of this application.

After a preset time period elapses after SM 1 determines, in S906, that a session of the terminal device does not need to be updated temporarily, SM 1 re-determines whether to update a session of the terminal device.

S911. SM 1 determines whether to update a session of the terminal device.

SM 1 has determined, in S905, that the terminal device moves. Therefore, in S911, SM 1 determines whether an amount of downlink data received by SM 1 in the preset time period that elapses after S906 is greater than or equal to a preset threshold.

If the amount of downlink data received by SM 1 in the preset time period that elapses after S906 is greater than or equal to the preset threshold, SM 1 determines to update a session of the terminal device. If the amount of downlink data received by SM 1 in the preset time period that elapses after S906 is less than the preset threshold, SM 1 still determines that a session of the terminal device does not need to be updated temporarily.

In a process of performing S911, SM 1 may receive downlink data to be sent to the terminal device. The downlink data is data sent by the user plane network element 1 to SM 1.

S912. If SM 1 determines to update a session of the terminal device, SM 1 retains the context of the first session, adds instruction information to the received downlink data to be sent to the terminal device, and sends, to MM 2, the downlink data that carries the instruction information.

The instruction information in this embodiment (the embodiment shown in FIG. 9A, FIG. 9B, FIG. 9C, and FIG. 9D) is used to instruct the terminal device to send a first uplink registration packet to MM 2 immediately after the terminal device obtains the instruction information, to trigger creation of the second session.

After receiving the downlink data that carries the instruction information, MM 2 sends, to the terminal device, the downlink data that carries the instruction information. In one embodiment, because the terminal device does not send uplink data after moving to the second TA, the terminal device may be in an idle mode or may be in a connected mode. For example, if the terminal device is in an idle mode, S913 and S914 are performed after S912; or if the terminal device is in a connected mode, S914 is performed after S912. S913 and S914 are optional, and therefore are represented by dashed lines in FIG. 9A, FIG. 9B, FIG. 9C, and FIG. 9D.

S913. MM 2 sends a paging message to the terminal device.

S914. The terminal device sends a paging response to MM 2.

S915. MM 2 sends, to the base station 2, the downlink data that carries the instruction information.

S916. The base station 2 sends, to the terminal device, the downlink data that carries the instruction information.

S917. The terminal device sends a downlink data answer message to the base station 2, the base station 2 forwards the downlink data answer message to MM 2, MM 2 forwards the downlink data answer message to SM 1, and SM 1 forwards the downlink data answer message to the user plane network element 1.

S917 herein is an optional operation, and therefore is represented by a dashed line in FIG. 9A, FIG. 9B, FIG. 9C, and FIG. 9D.

S918. The terminal device sends, to the base station 2, the first uplink registration packet that carries the temporary ID 2 and the identifier of MM 2.

S919. The base station 2 sends the first uplink registration packet in S918 to MM 2.

S920. After receiving the first uplink registration packet, MM 2 performs authentication and authorization on the terminal device based on the mobility management context of the terminal device, and selects SM 2 for the terminal device based on information such as subscription data of the terminal device and a data type of the first uplink registration packet.

S921. MM 2 sends a session create request and the permanent identifier of the terminal device to SM 2.

S922. SM 2 obtains session management subscription data of the terminal device based on the permanent identifier of the terminal device, and selects a user plane network element 2 for the terminal device based on the session management subscription data of the terminal device.

S923. SM 2 sends a user plane forwarding rule to the user plane network element 2, and creates a context of the second session.

S924. SM 2 sends a session create response to MM 2, MM 2 sends the session create response to the base station 2, and the base station 2 sends the session create response to the terminal device.

S925. MM 2 sends the first uplink registration packet received by MM 2 in S919 to SM 2, and SM 2 forwards the first uplink registration packet to the user plane network element 2.

After the second session is created, MM 2 may further send a first notification message to SM 1, to instruct SM 1 to release the context of the first session, so that resource waste of a source core network device is reduced.

As shown in FIG. 9A, FIG. 9B, FIG. 9C, and FIG. 9D, after S924, the session migration method provided in this embodiment of this application further includes S926 and S927.

S926. MM 2 sends the first notification message to SM 1, to instruct SM 1 to release the context of the first session.

S927. SM 1 releases the context of the first session.

For S900 to S917, refer to the description of S800 to S817 in FIG. 8A, FIG. 8B, FIG. 8C, and FIG. 8D. For S921 to S924, refer to the description of S821 to S824 in FIG. 8A, FIG. 8B, FIG. 8C, and FIG. 8D. For S926 and S927, refer to the description of S825 and S826 in FIG. 8A, FIG. 8B, FIG. 8C, and FIG. 8D. Details are not described herein again. The application scenario to which this embodiment is applicable is the same as the application scenario to which the embodiment shown in FIG. 8A, FIG. 8B, FIG. 8C, and FIG. 8D is applicable. A difference lies in that content indicated by the instruction information in this embodiment is different from content indicated by the instruction information in the embodiment shown in FIG. 8A, FIG. 8B, FIG. 8C, and FIG. 8D.

SM 1 retains the context of the first session before the second session is created in the embodiment shown in any one of FIG. 4A, FIG. 4B, FIG. 4C, and FIG. 4D to FIG. 9A, FIG. 9B, FIG. 9C, and FIG. 9D. Therefore, even if there is downlink data to be sent to the terminal device, the downlink data can be accurately sent to the terminal device, so that no packet loss occurs in the downlink data. In addition, the second session is created after to-be-sent data of the terminal device is obtained. Therefore, a case in which the second session is created but no data is transmitted does not occur, so that waste of core network resources and unnecessary signaling transmission are reduced.

In addition, in the embodiment shown in FIG. 6A, FIG. 6B, FIG. 6C, and FIG. 6D or FIG. 7A, FIG. 7B, FIG. 7C, and FIG. 7D, the terminal device is unaware of a session migration procedure, so that signaling transmission of the terminal device is further reduced.

It can be learned from the foregoing description that a mobility management function entity and a session management function entity may be independently disposed, or may be integrated into a same device. An example in which a mobility management function entity and a session management function entity are independently disposed is used for description in all the embodiments shown in FIG. 4A, FIG. 4B, FIG. 4C, and FIG. 4D to FIG. 9A, FIG. 9B, FIG. 9C, and FIG. 9D, and the session migration method provided in the embodiments of this application is described below by using an example in which a mobility management function entity and a session management function entity are integrated into a same device.

For ease of description, in the embodiments of this application, a source radio access network device is represented by a base station 1, a source control plane network element is represented by a control plane network element 1, a source user plane network element is represented by a user plane network element 1, a target radio access network device is represented by a base station 2, a target control plane network element is represented by a control plane network element 2, and a target user plane network element is represented by a user plane network element 2.

Figure 10A:
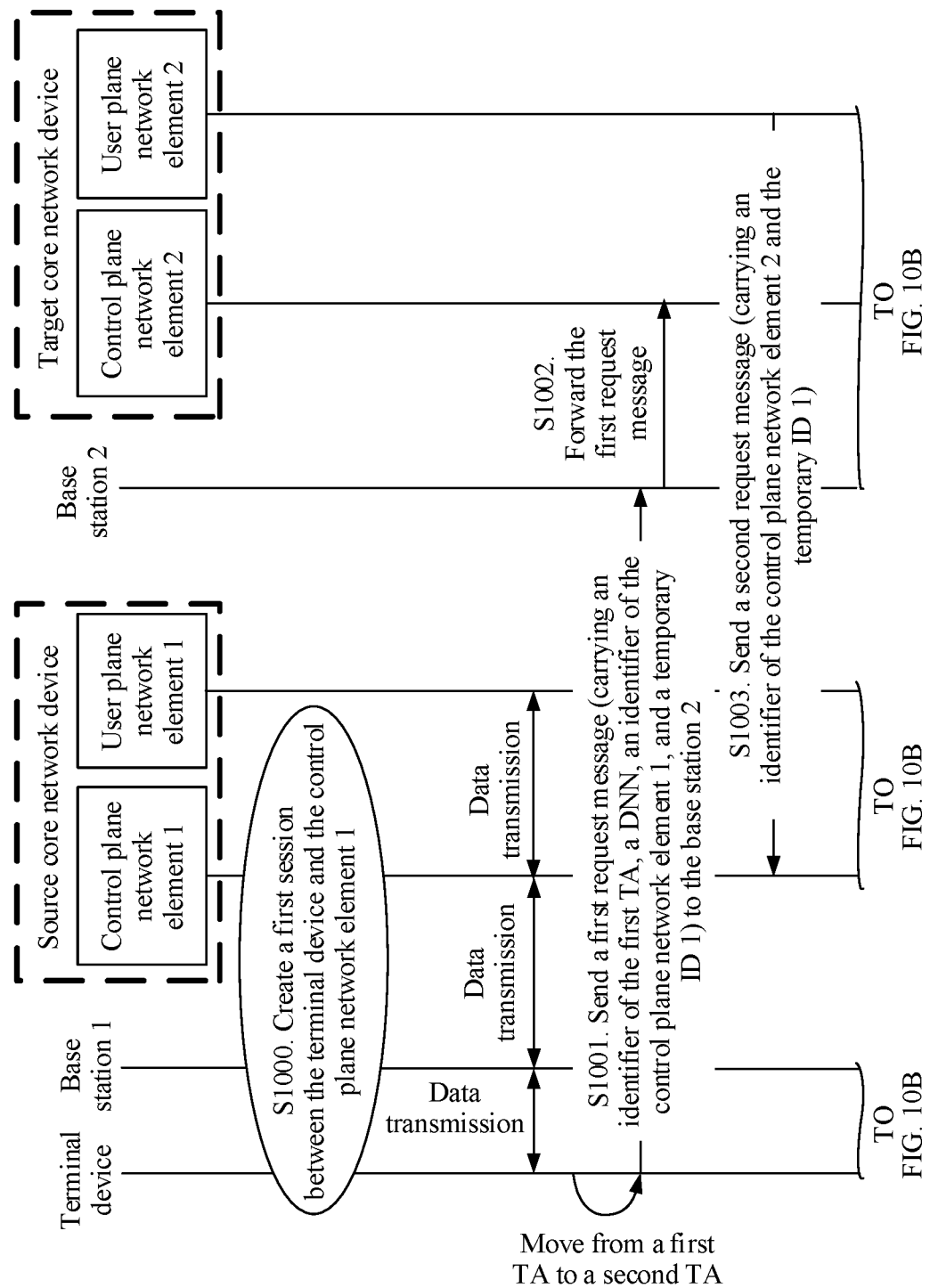
FIG. 10A, FIG. 10B, and FIG. 10C are a schematic flowchart 8 of a session migration method according to an embodiment of this application.
Figure 10B:
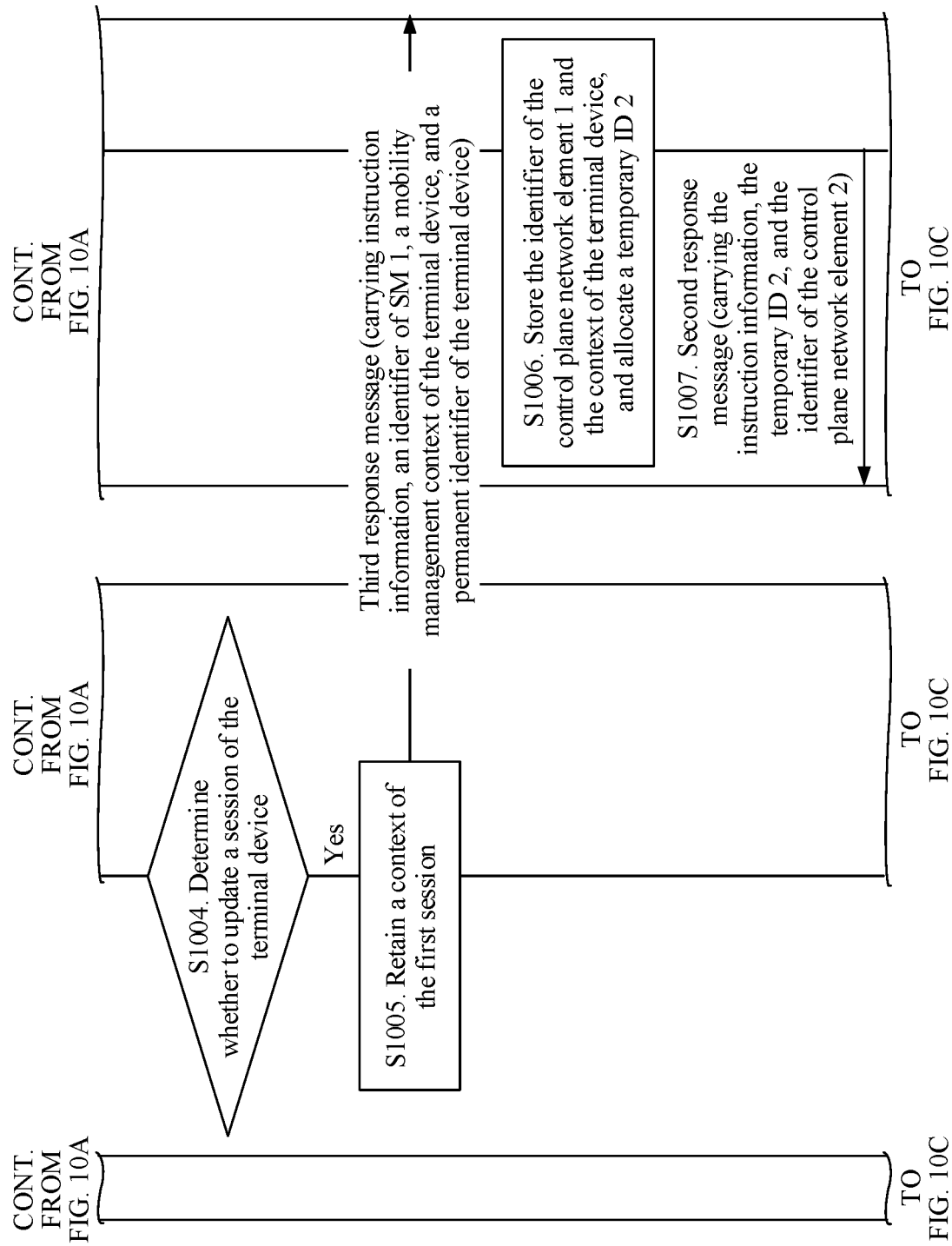
Figure 10C:
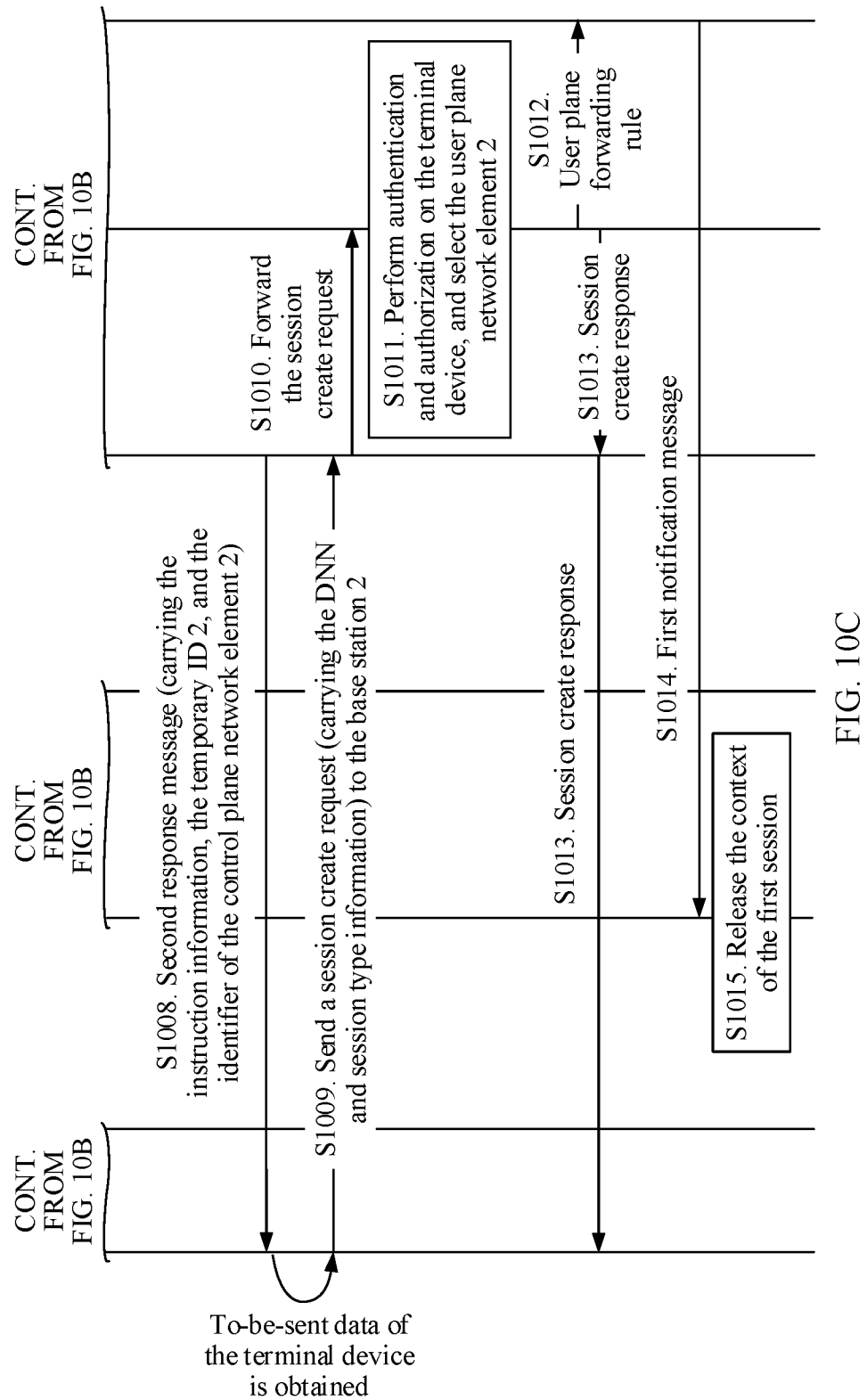

For example, in a scenario in which a mobility management function entity and a session management function entity are integrated into a same device, FIG. 10A, FIG. 10B, and FIG. 10C show a session migration method corresponding to the embodiment shown in FIG. 4A, FIG. 4B, FIG. 4C, and FIG. 4D.

Referring to FIG. 10A, FIG. 10B, and FIG. 10C, the session migration method includes the following operations.

S1000. Create a first session between a terminal device and a control plane network element 1.

Herein, a service area of the control plane network element 1 includes a first TA, and the control plane network element 1 stores a context of the first session.

S1001. The terminal device sends a first request message to a base station 2 after moving from the first TA to a second TA.

The first request message carries an identifier of the first TA, a DNN, an identifier of the control plane network element 1, and a temporary ID 1 of the terminal device.

S1002. The base station 2 forwards the first request message in S1001 to a control plane network element 2.

S1003. The control plane network element 2 sends a second request message to the control plane network element 1, to request to obtain a context of the terminal device.

The second request message carries an identifier of the control plane network element 2 and the temporary ID 1. Herein, the context of the terminal device includes a mobility management context of the terminal device and a session management context of the terminal device.

S1004. The control plane network element 1 determines, based on the identifier of the control plane network element 2, whether to update a session of the terminal device.

S1005. If the control plane network element 1 determines to update a session of the terminal device, the control plane network element 1 retains the context of the first session, and sends, to the control plane network element 2, a third response message that carries instruction information, the identifier of the control plane network element 1, the context (including the mobility management context and the session management context) of the terminal device, and a permanent identifier of the terminal device.

S1006. The control plane network element 2 stores the identifier of the control plane network element 1 and the mobility management context of the terminal device, and allocates a temporary ID 2 to the terminal device.

S1007. The control plane network element 2 sends, to the base station 2, a second response message that carries the instruction information, the temporary ID 2, and the identifier of the control plane network element 2.

S1008. The base station 2 forwards the second response message in S1007 to the terminal device.

S1009. After obtaining to-be-sent data of the terminal device, the terminal device sends, to the base station 2 according to the instruction information carried in the second response message in S1008, a session create request that carries the DNN and session type information.

S1010. The base station 2 forwards the session create request in S1009 to the control plane network element 2.

S1011. The control plane network element 2 performs authentication and authorization on the terminal device based on the mobility management context of the terminal device, and selects a user plane network element 2 for the terminal device based on the DNN and the session type information that are carried in the session create request in S1010 and subscription data of the terminal device that is locally stored on the control plane network element 2.

S1012. The control plane network element 2 sends a user plane forwarding rule to the user plane network element 2, and creates a context of a second session.

S1013. The control plane network element 2 sends a session create response to the base station 2, and the base station 2 sends the session create response to the terminal device.

After the terminal device receives the session create response, a creation process of the second session ends.

After the second session is created, the session migration method provided in this embodiment of this application further includes S1014 and S1015.

S1014. The control plane network element 2 sends a first notification message to the control plane network element 1, to instruct the control plane network element 1 to release the context of the first session.

S1015. The control plane network element 1 releases the context of the first session.

For the procedure shown in FIG. 10A, FIG. 10B, and FIG. 10C, refer to the procedure shown in FIG. 4A, FIG. 4B, FIG. 4C, and FIG. 4D. Details are not described herein again.

Figure 11A:
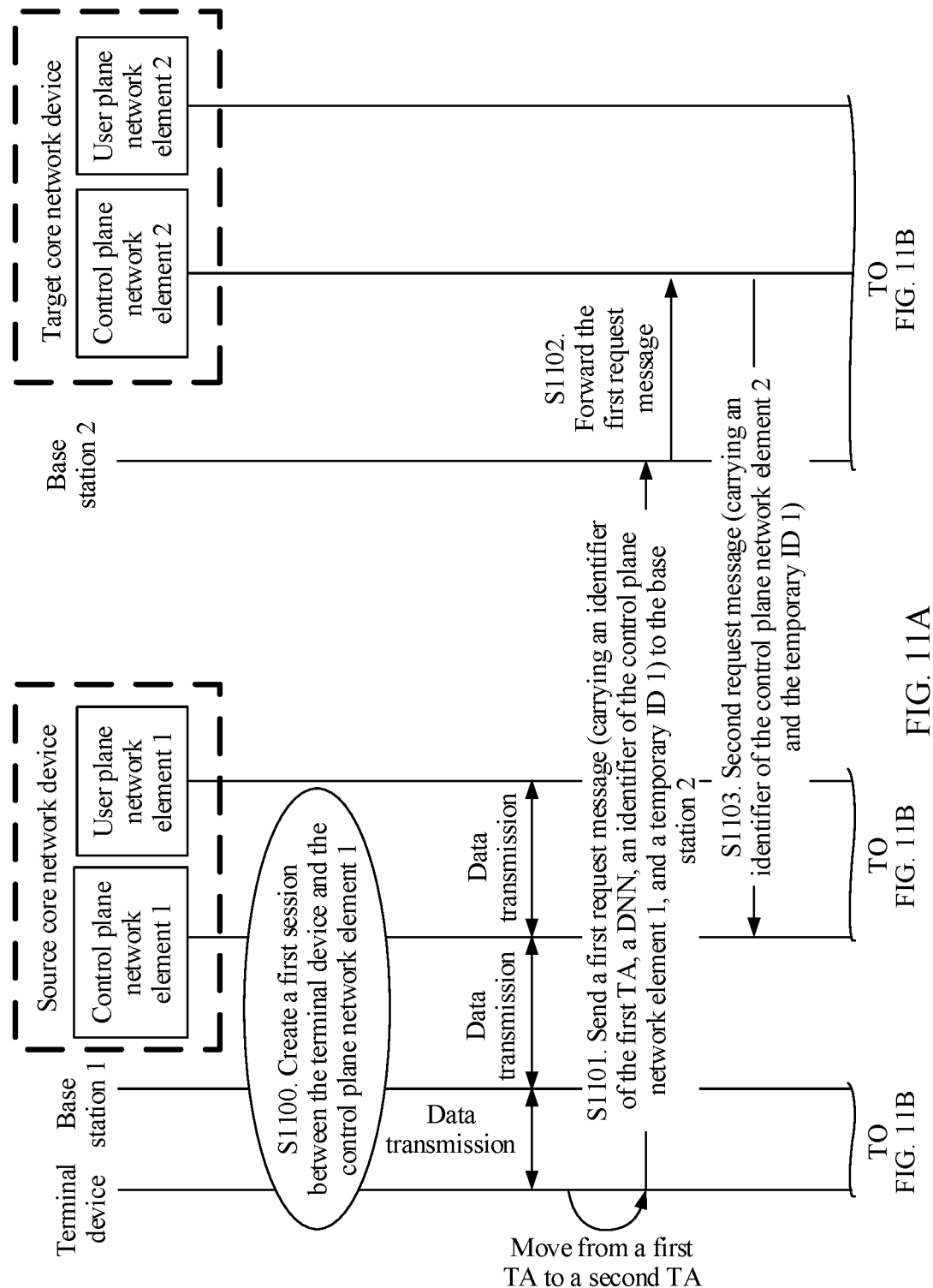
Figure 11C:
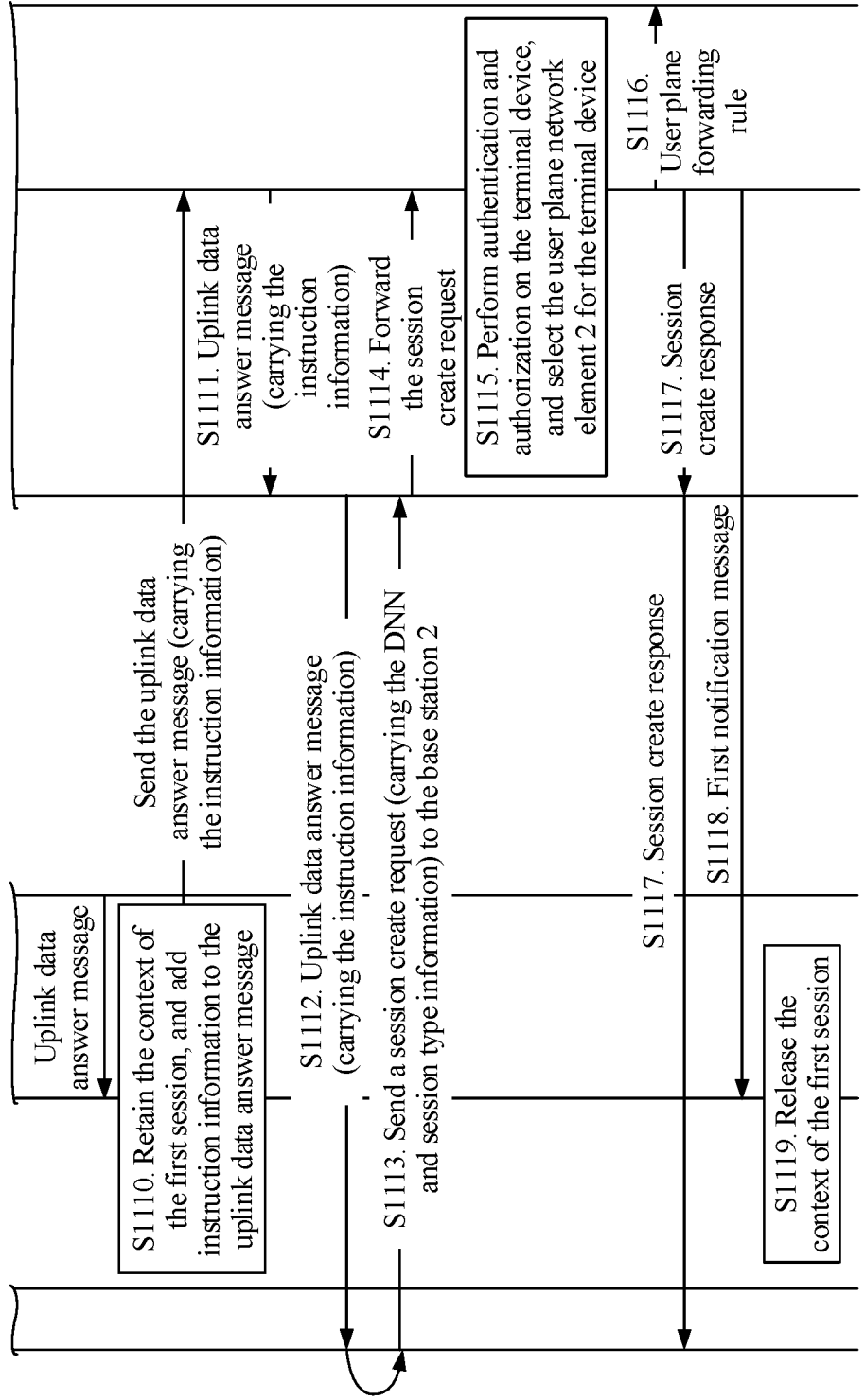

In a scenario in which a mobility management function entity and a session management function entity are integrated into a same device, FIG. 11A, FIG. 11B, and FIG. 11C show a session migration method corresponding to the embodiment shown in FIG. 5A, FIG. 5B, FIG. 5C, and FIG. 5D.

Referring to FIG. 11A, FIG. 11B, and FIG. 11C, the session migration method includes the following operations.

S1100. Create a first session between a terminal device and a control plane network element 1.

Herein, a service area of the control plane network element 1 includes a first TA, and the control plane network element 1 stores a context of the first session.

S1101. The terminal device sends a first request message to a base station 2 after moving from the first TA to a second TA.

The first request message carries an identifier of the first TA, a DNN, an identifier of the control plane network element 1, and a temporary ID 1 of the terminal device.

S1102. The base station 2 forwards the first request message in S1101 to a control plane network element 2.

S1103. The control plane network element 2 sends a second request message to the control plane network element 1, to request to obtain a context of the terminal device.

The second request message carries an identifier of the control plane network element 2 and the temporary ID 1, and the context of the terminal device includes a mobility management context and a session management context.

S1104. The control plane network element 1 determines, based on the identifier of the control plane network element 2, whether to update a session of the terminal device.

S1105. If the control plane network element 1 determines that a session of the terminal device does not need to be updated temporarily, the control plane network element 1 retains the context of the first session, and sends, to the control plane network element 2, a third response message that carries the identifier of the control plane network element 1, the context (including the mobility management context and the session management context) of the terminal device, and a permanent identifier of the terminal device.

S1106. The control plane network element 2 stores the identifier of the control plane network element 1 and the context of the terminal device, and allocates a temporary ID 2 to the terminal device.

S1107. The control plane network element 2 sends, to the base station 2, a second response message that carries the temporary ID 2 and the identifier of the control plane network element 2.

S1108. The base station 2 forwards the second response message in S1107 to the terminal device.

After a preset time period elapses after the control plane network element 1 determines, in S1105, that a session of the terminal device does not need to be updated temporarily, the control plane network element 1 re-determines whether to update a session of the terminal device.

S1109. The control plane network element 1 determines whether to update a session of the terminal device.

The control plane network element 1 has determined, in S1104, that the terminal device moves. Therefore, in S1109, the control plane network element 1 determines whether an amount of uplink data received by the control plane network element 1 in the preset time period that elapses after S1105 is greater than or equal to a preset threshold.

If the amount of uplink data received by the control plane network element 1 in the preset time period that elapses after S1105 is greater than or equal to the preset threshold, the control plane network element 1 determines to update a session of the terminal device. If the amount of uplink data received by the control plane network element 1 in the preset time period that elapses after S1105 is less than the preset threshold, the control plane network element 1 still determines that a session of the terminal device does not need to be updated temporarily.

In a process of performing S1109, the terminal device may send uplink data, and correspondingly, the control plane network element 1 receives the uplink data, and sends the uplink data received by the control plane network element 1 to a user plane network element 1. Then the control plane network element 1 receives an uplink data answer message sent by the user plane network element 1.

S1110. If the control plane network element 1 determines to update a session of the terminal device, the control plane network element 1 retains the context of the first session, adds instruction information to the received uplink data answer message, and sends, to the control plane network element 2, the uplink data answer message that carries the instruction information.

S1111. The control plane network element 2 forwards, to the base station 2, the uplink data answer message that carries the instruction information.

S1112. The base station 2 forwards, to the terminal device, the uplink data answer message that carries the instruction information.

S1113. After obtaining to-be-sent data of the terminal device, the terminal device sends, to the base station 2 according to the instruction information carried in the uplink data answer message in S1112, a session create request that carries the DNN and session type information.

S1114. The base station 2 forwards the session create request in S1113 to the control plane network element 2.

S1115. The control plane network element 2 performs authentication and authorization on the terminal device based on the mobility management context of the terminal device, and selects a user plane network element 2 for the terminal device based on the DNN and the session type information that are carried in the session create request in S1113 and subscription data of the terminal device that is locally stored on the control plane network element 2.

S1116. The control plane network element 2 sends a user plane forwarding rule to the user plane network element 2, and creates a context of a second session.

S1117. The control plane network element 2 sends a session create response to the base station 2, and the base station 2 sends the session create response to the terminal device.

After the terminal device receives the session create response, a creation process of the second session ends.

After the second session is created, the session migration method provided in this embodiment of this application further includes S1118 and S1119.

S1118. The control plane network element 2 sends a first notification message to the control plane network element 1, to instruct the control plane network element 1 to release the context of the first session.

S1119. The control plane network element 1 releases the context of the first session.

For the procedure shown in FIG. 11A, FIG. 11B, and FIG. 11C, refer to the procedure shown in FIG. 5A, FIG. 5B, FIG. 5C, and FIG. 5D. Details are not described herein again.

Figure 12A:
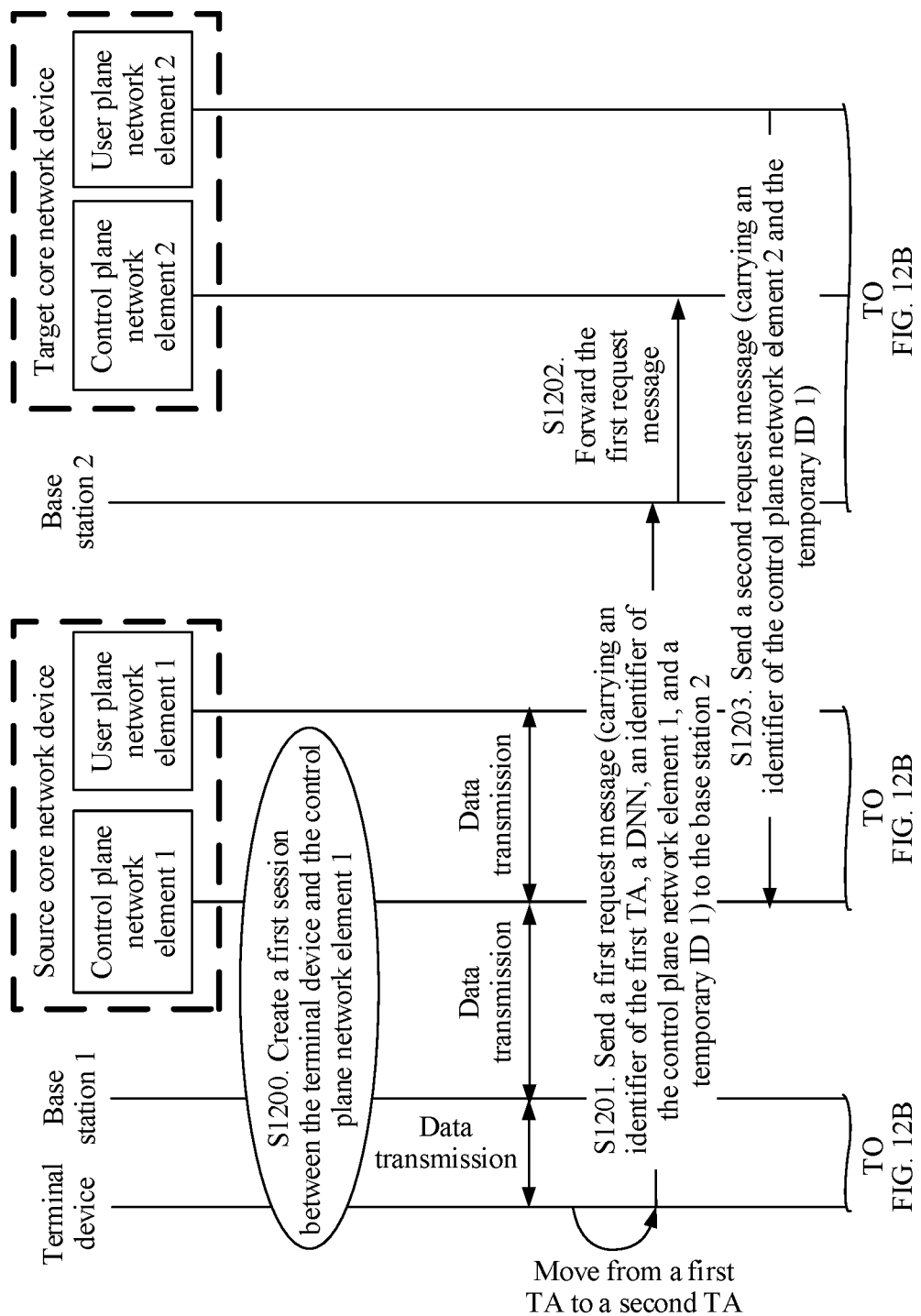
FIG. 12A, FIG. 12B, and FIG. 12C are a schematic flowchart 10 of a session migration method according to an embodiment of this application.
Figure 12B:
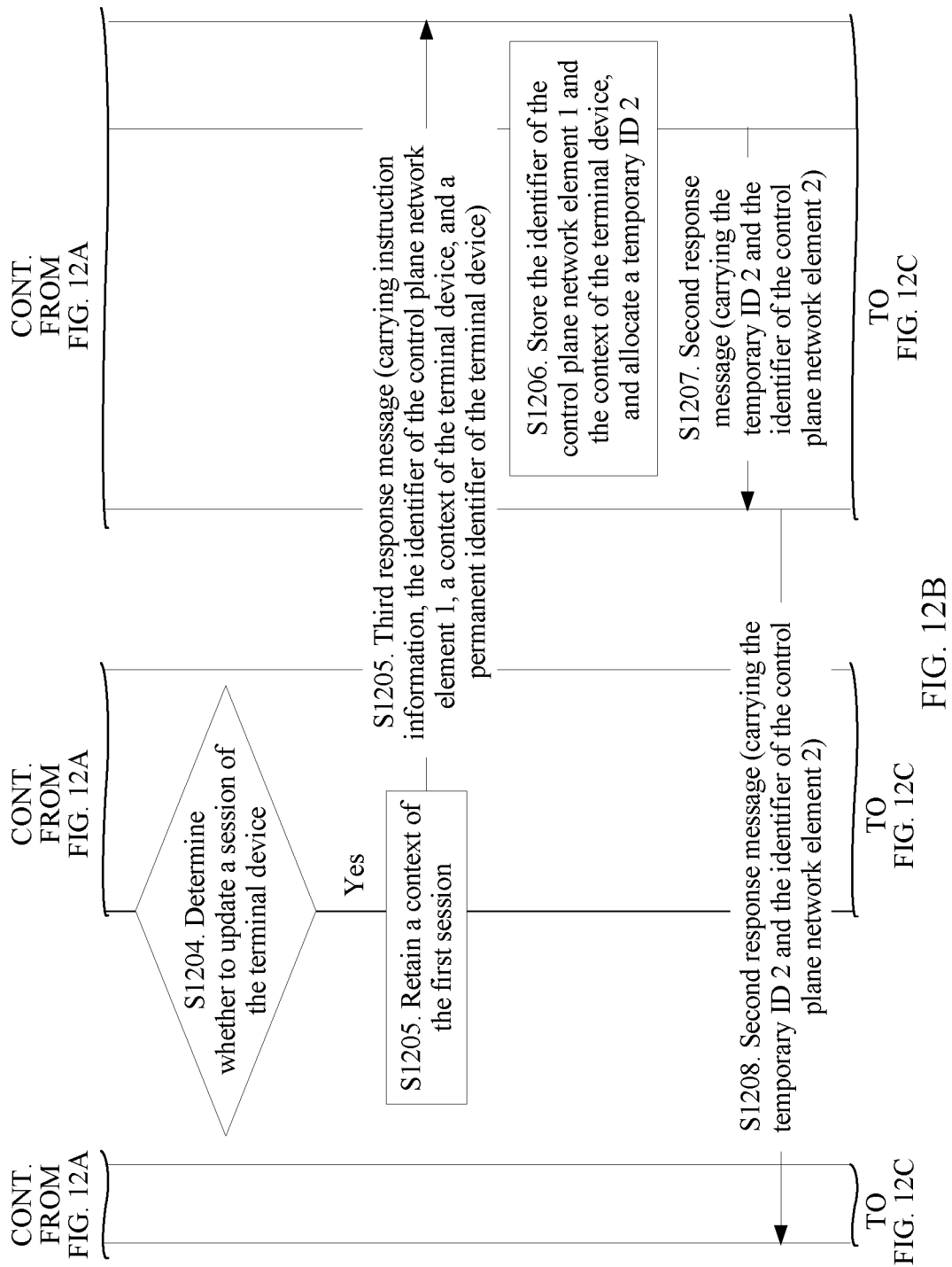
Figure 12C:
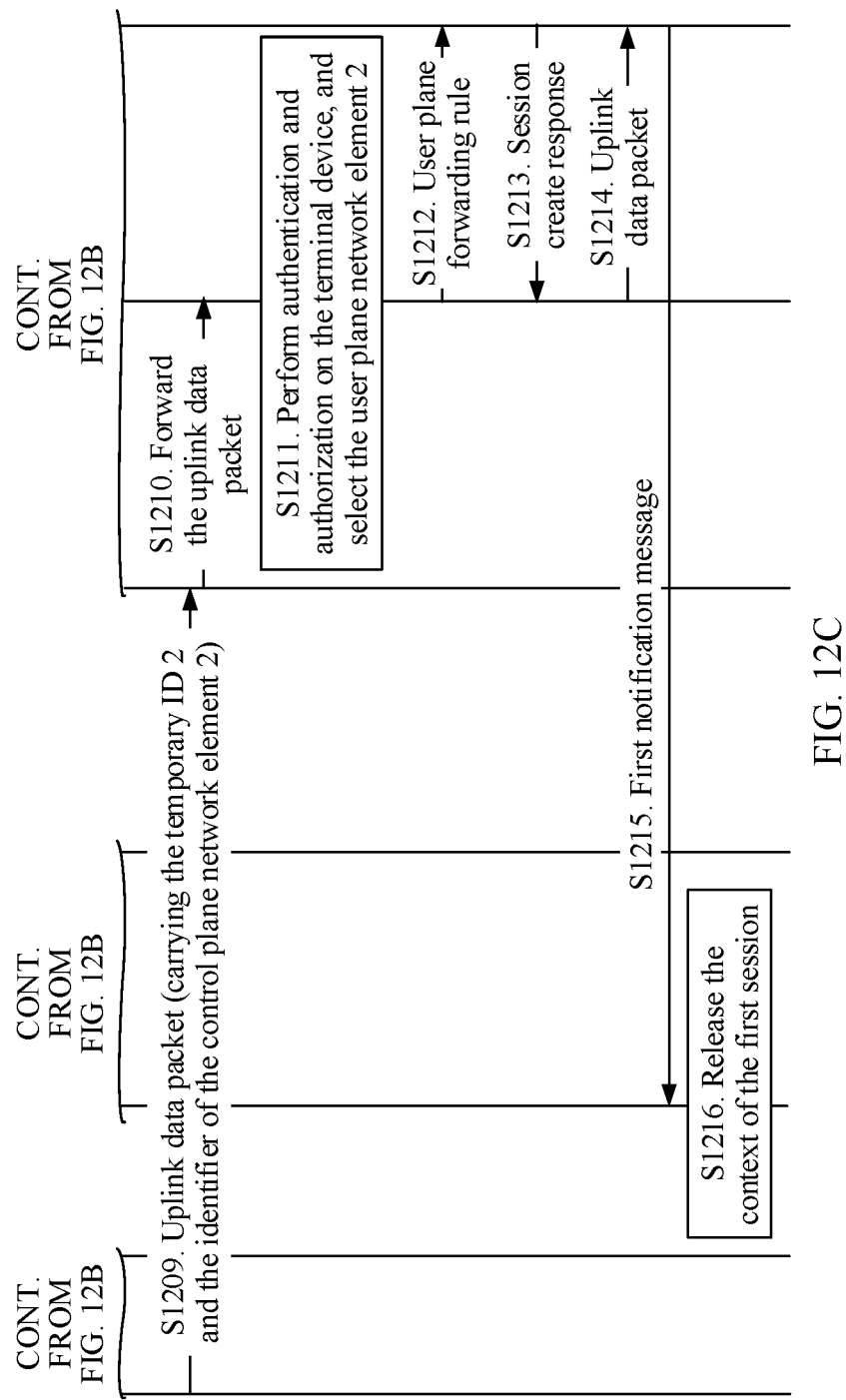
Figure 13A:
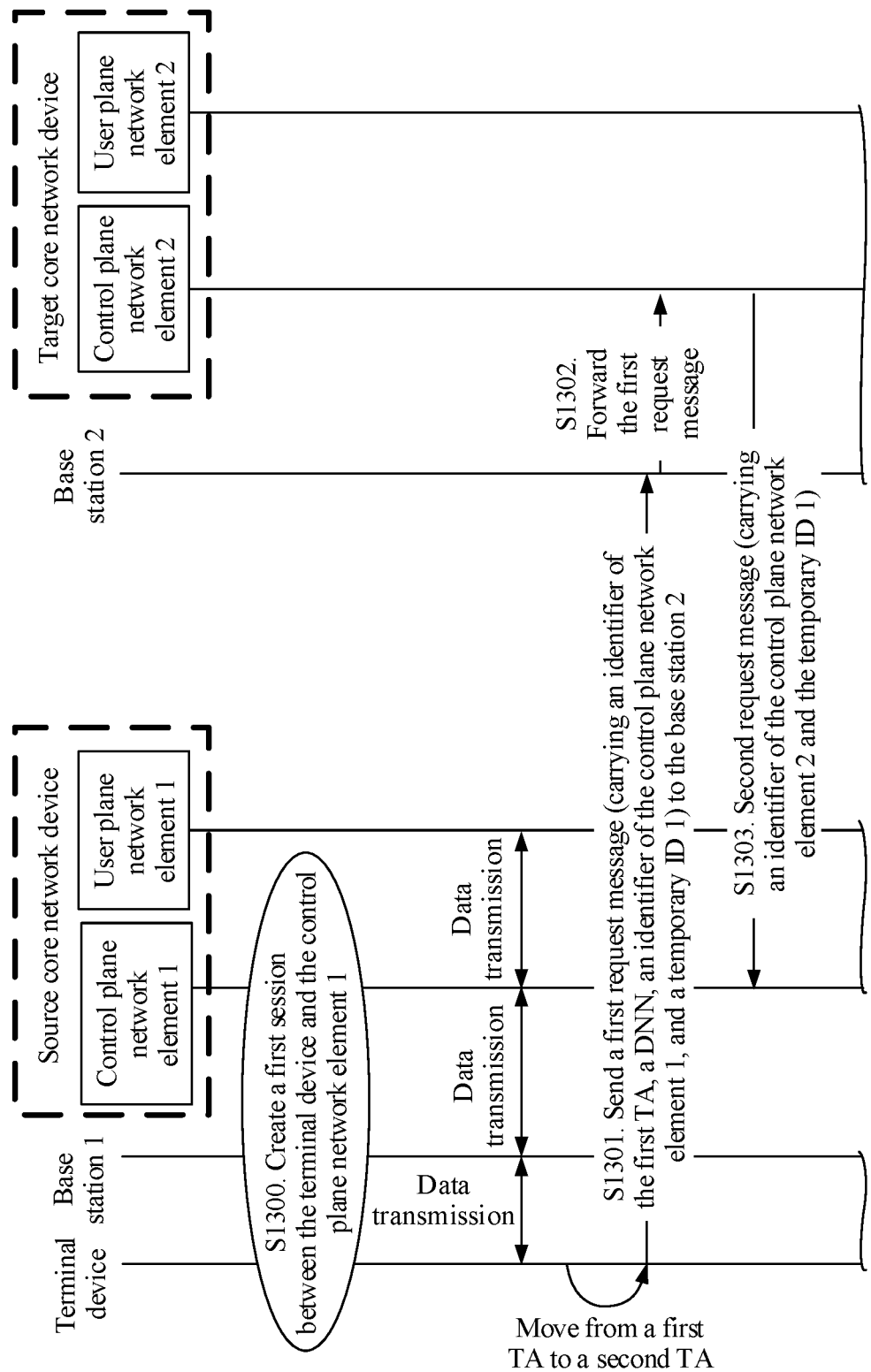
FIG. 13A, FIG. 13B, FIG. 13C, and FIG. 13D are a schematic flowchart 11 of a session migration method according to an embodiment of this application.
Figure 13B:
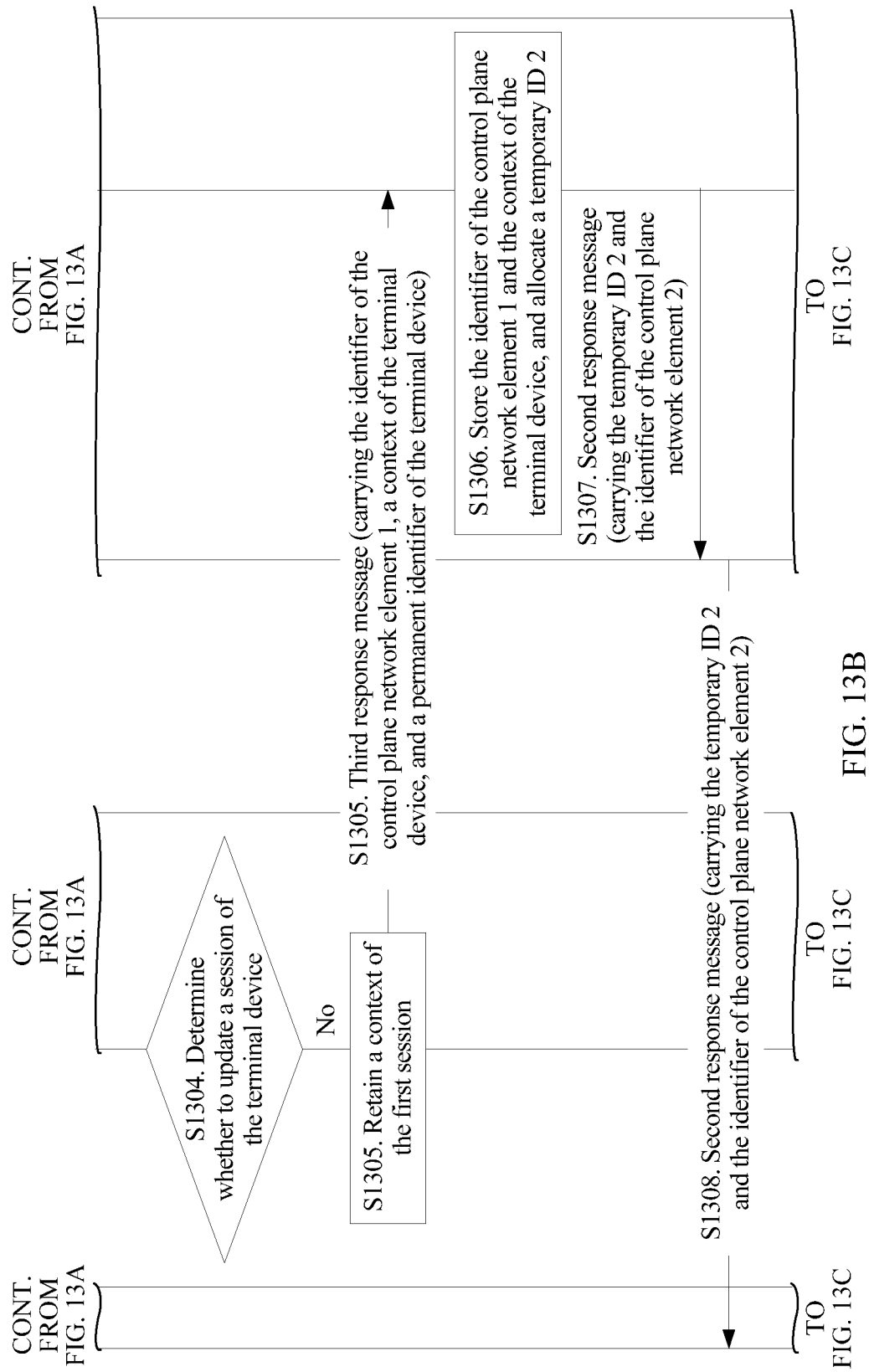
Figure 13C:
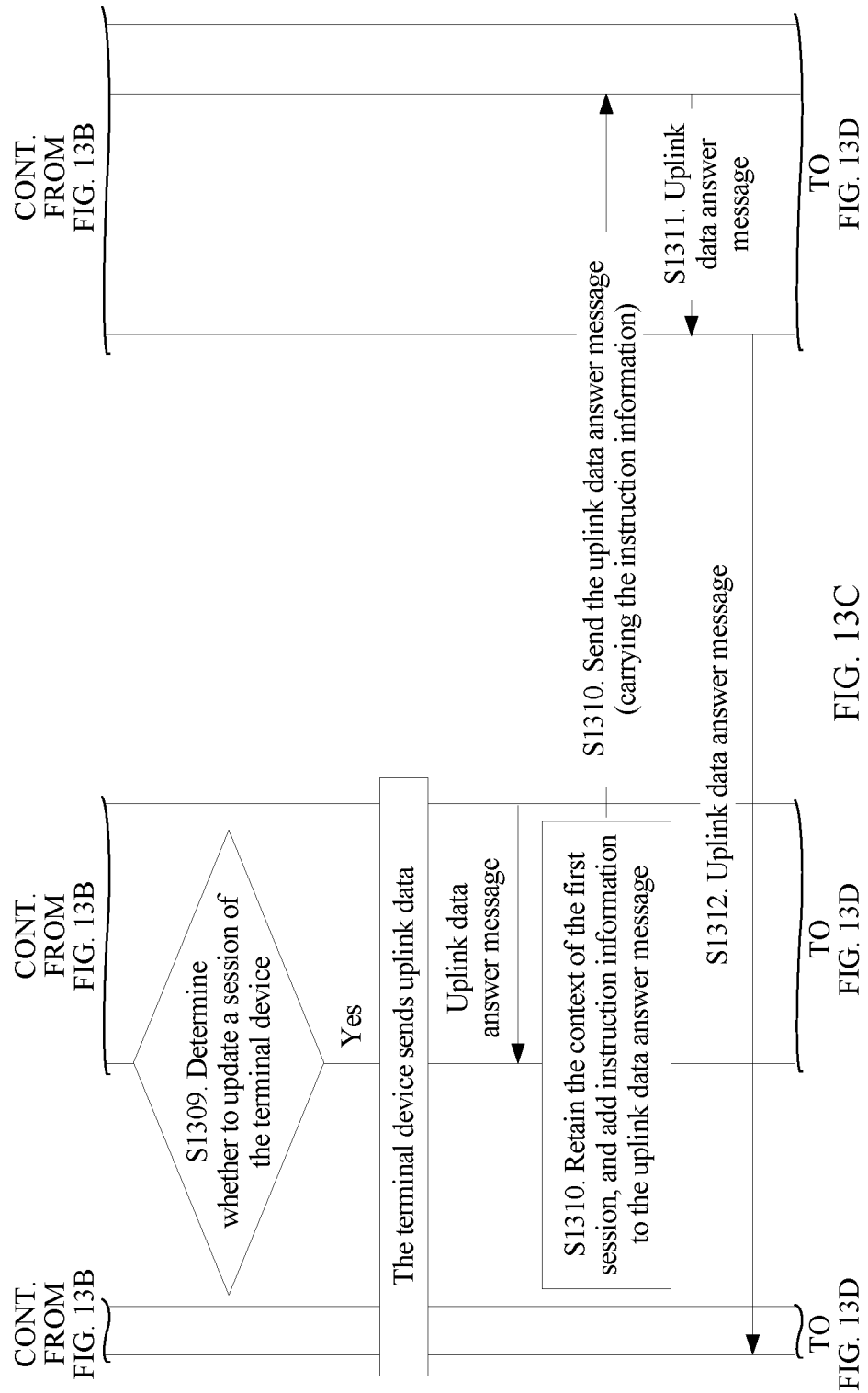
Figure 13D:
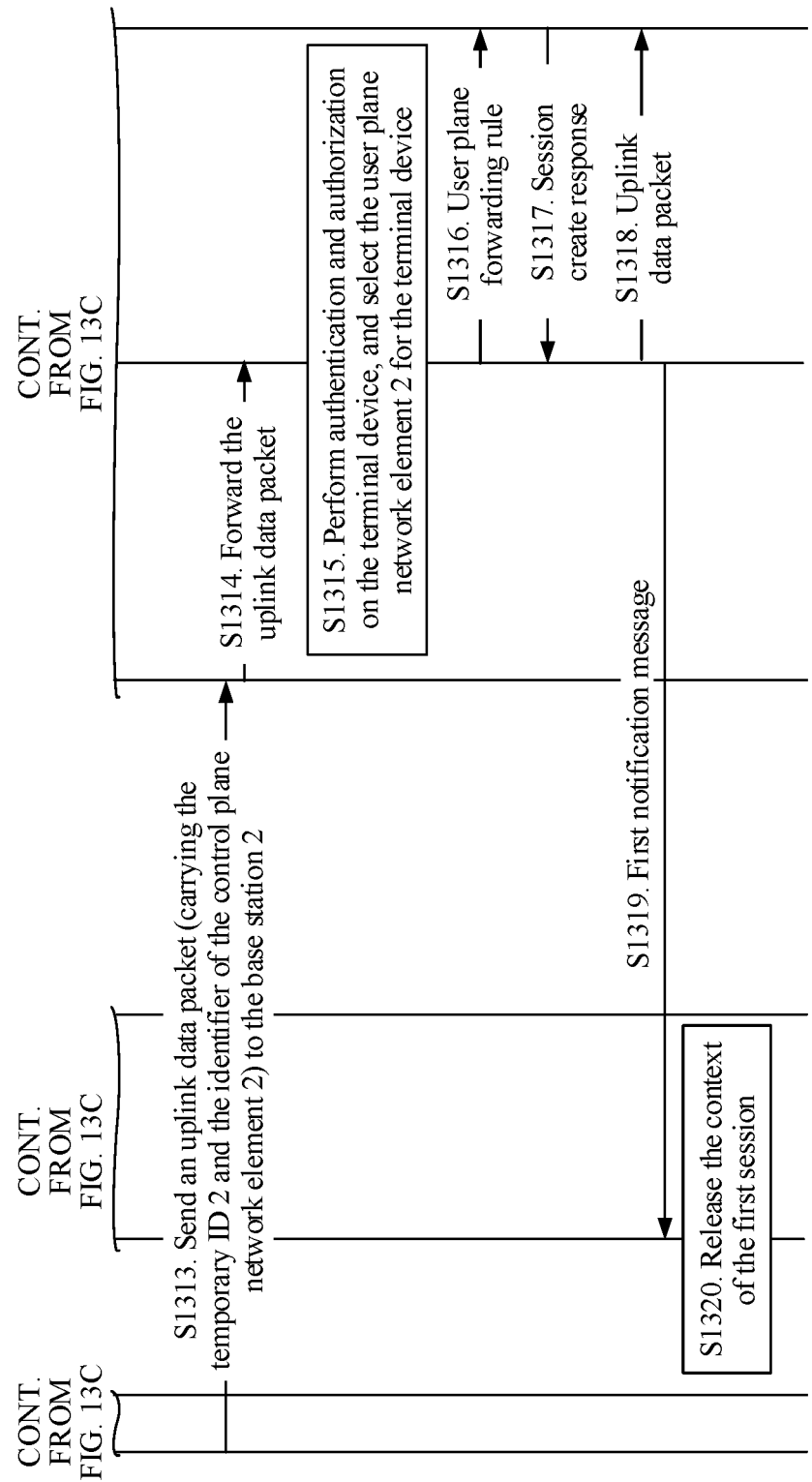
Figure 14A:
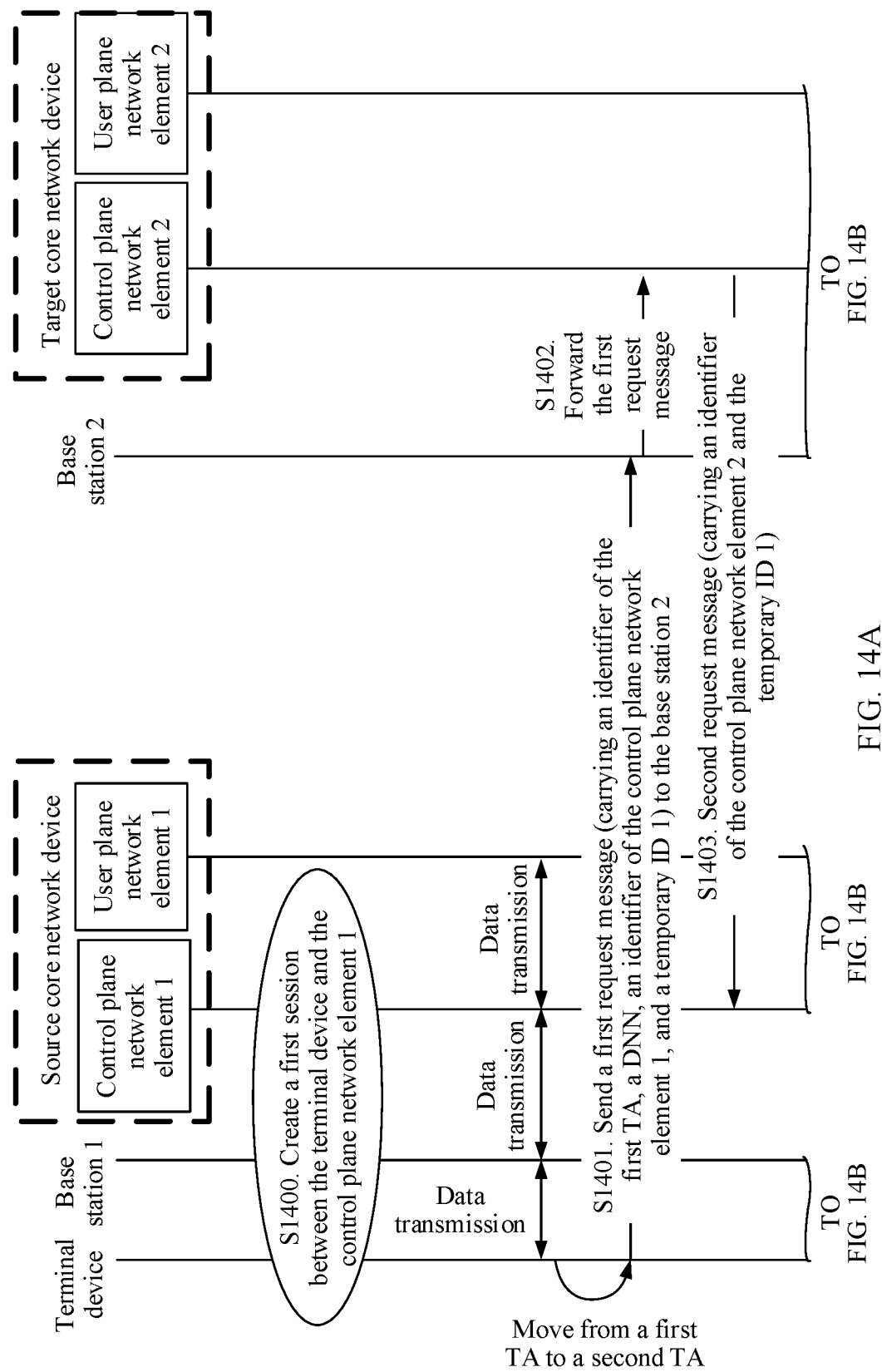
FIG. 14A, FIG. 14B, FIG. 14C, and FIG. 14D are a schematic flowchart 12 of a session migration method according to an embodiment of this application.
Figure 14B:
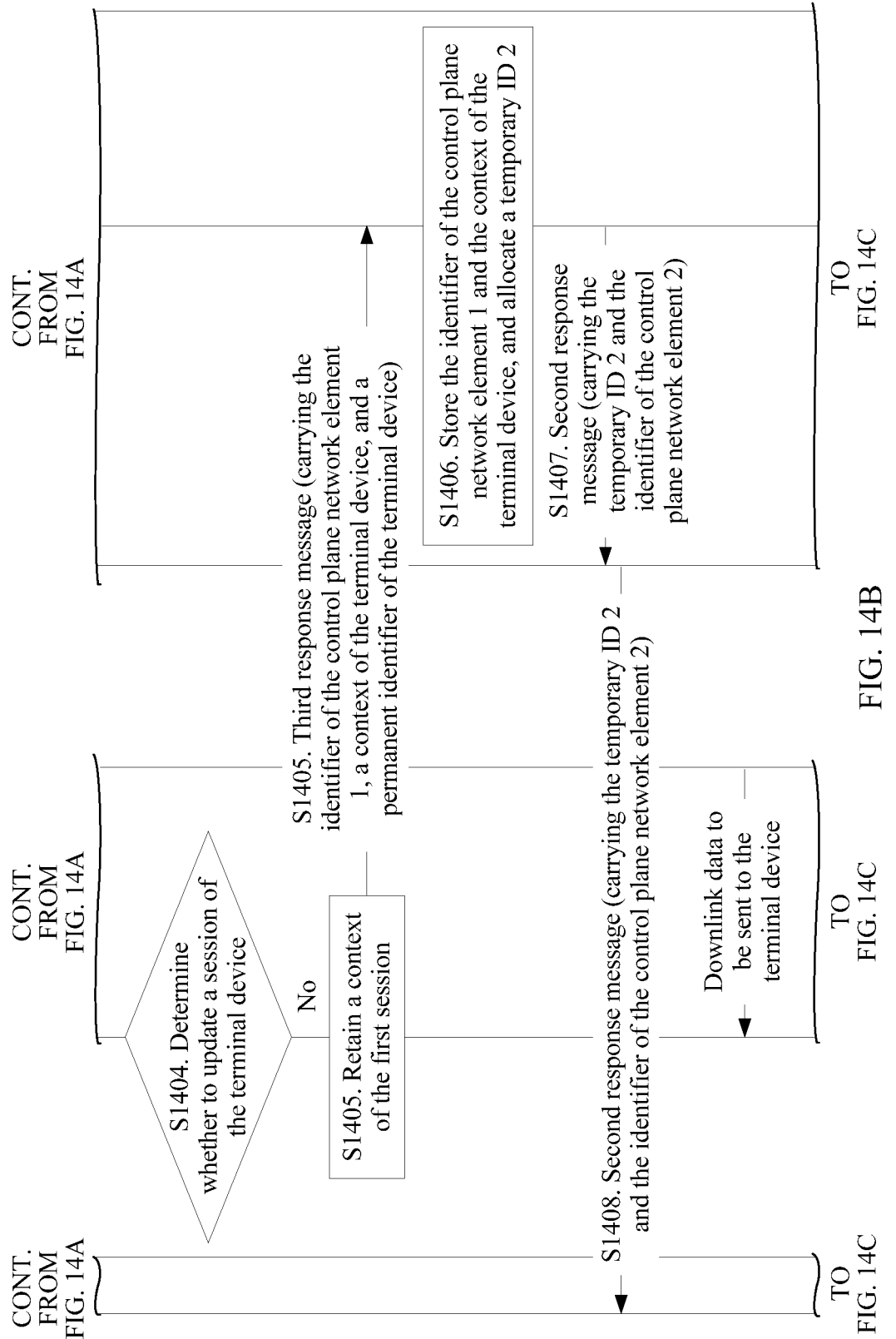
Figure 14C:
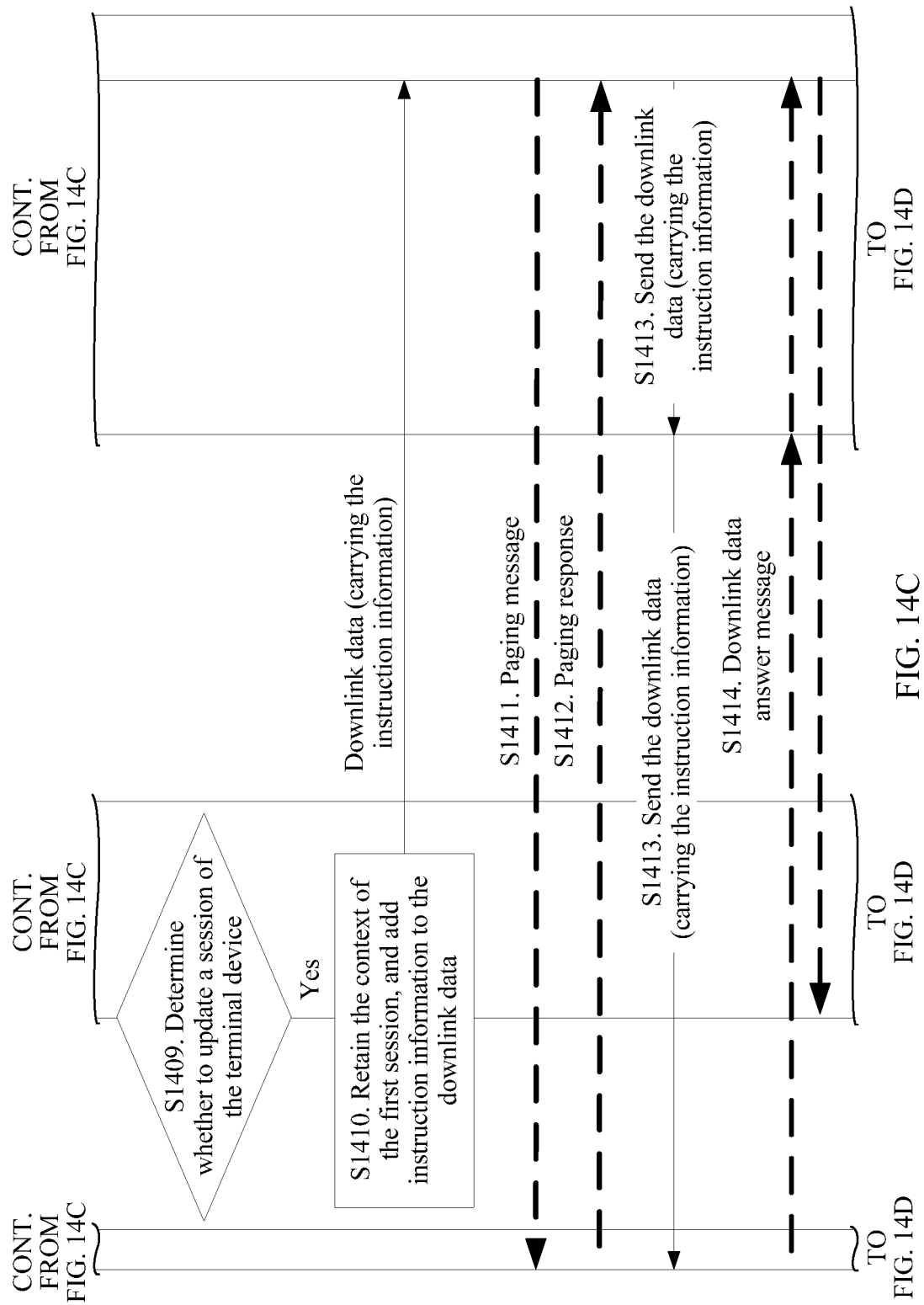
Figure 14D:
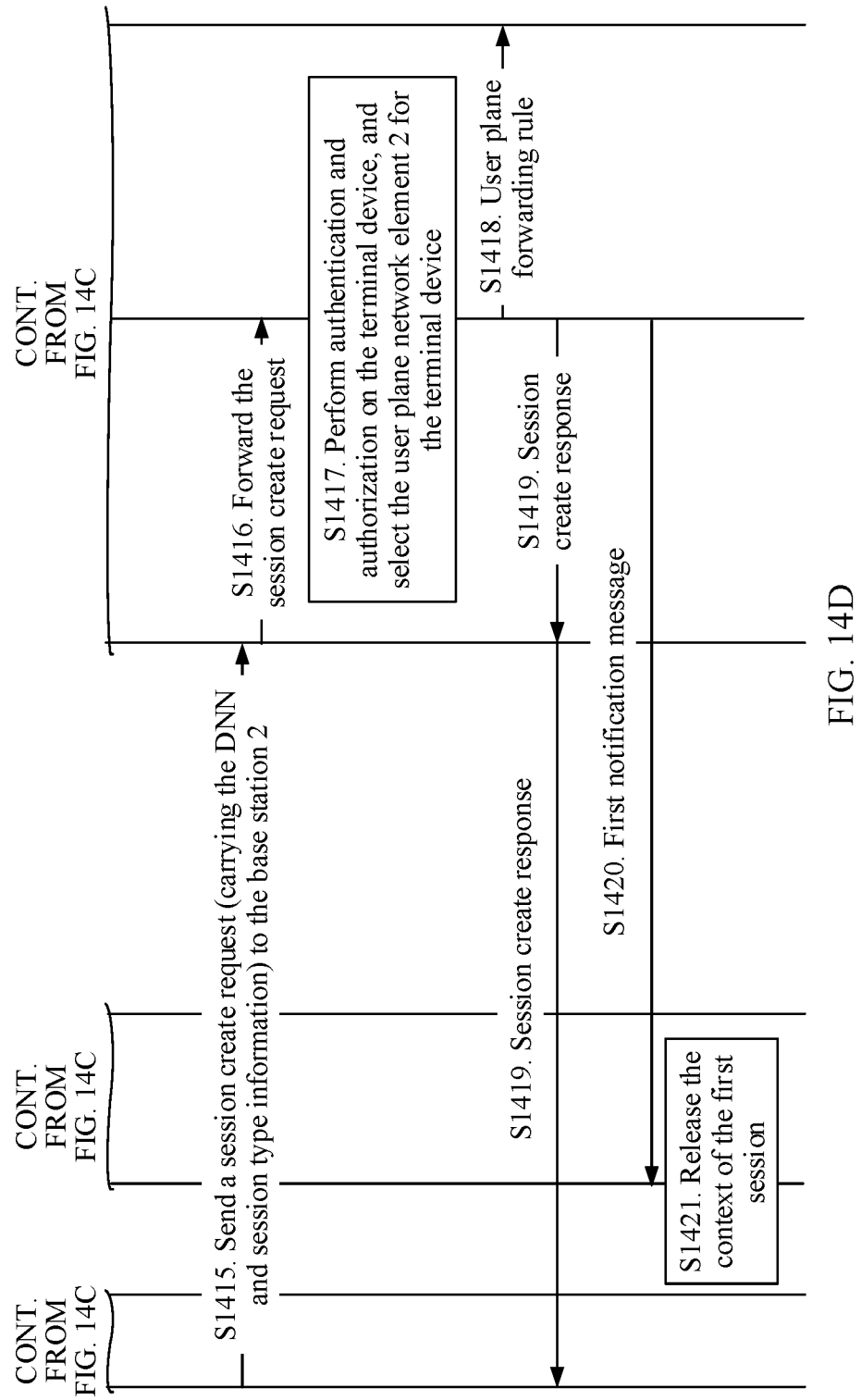
Figure 15A:
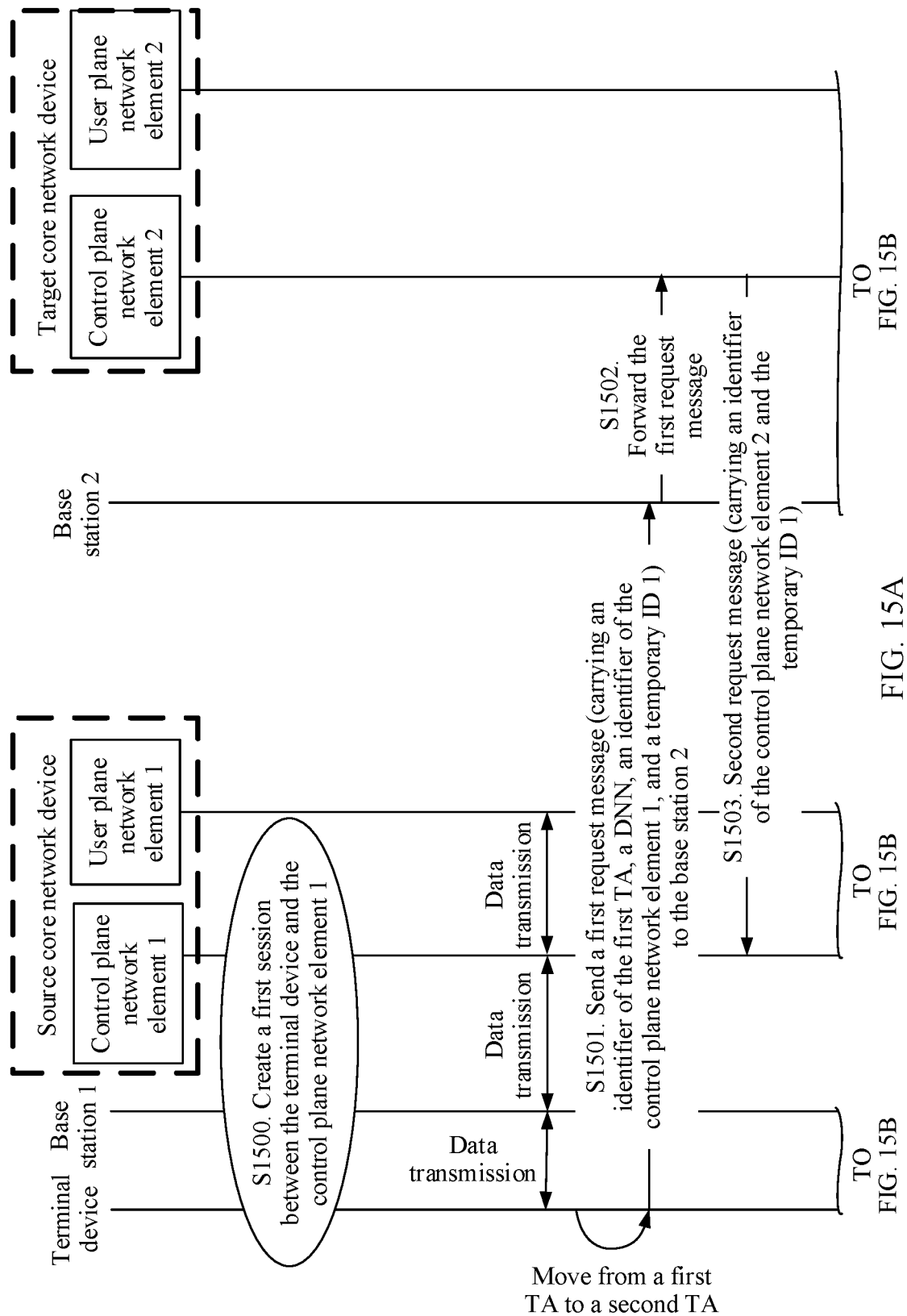
FIG. 15A, FIG. 15B, FIG. 15C, and FIG. 15D are a schematic flowchart 13 of a session migration method according to an embodiment of this application.
Figure 15B:
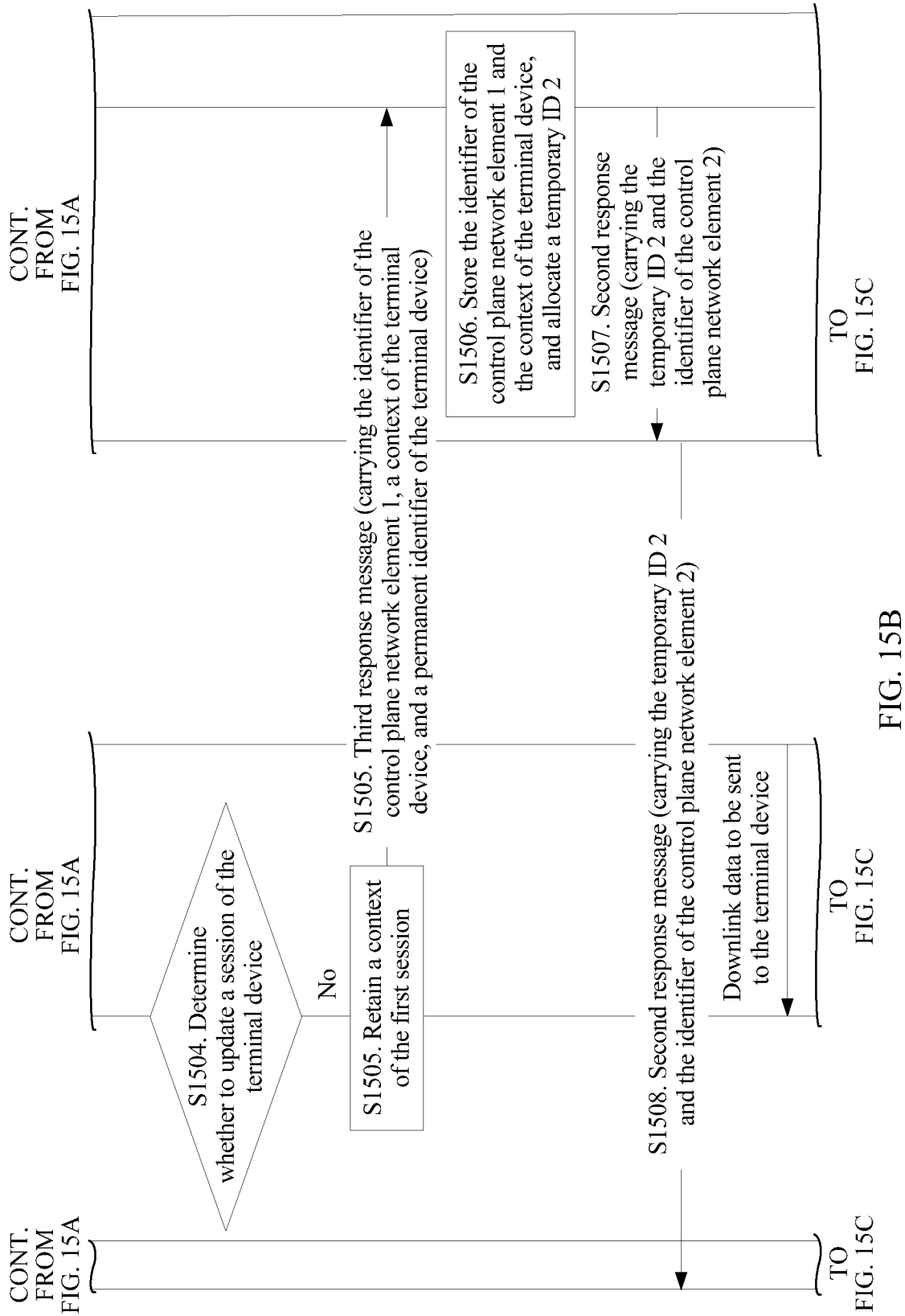
Figure 15C:
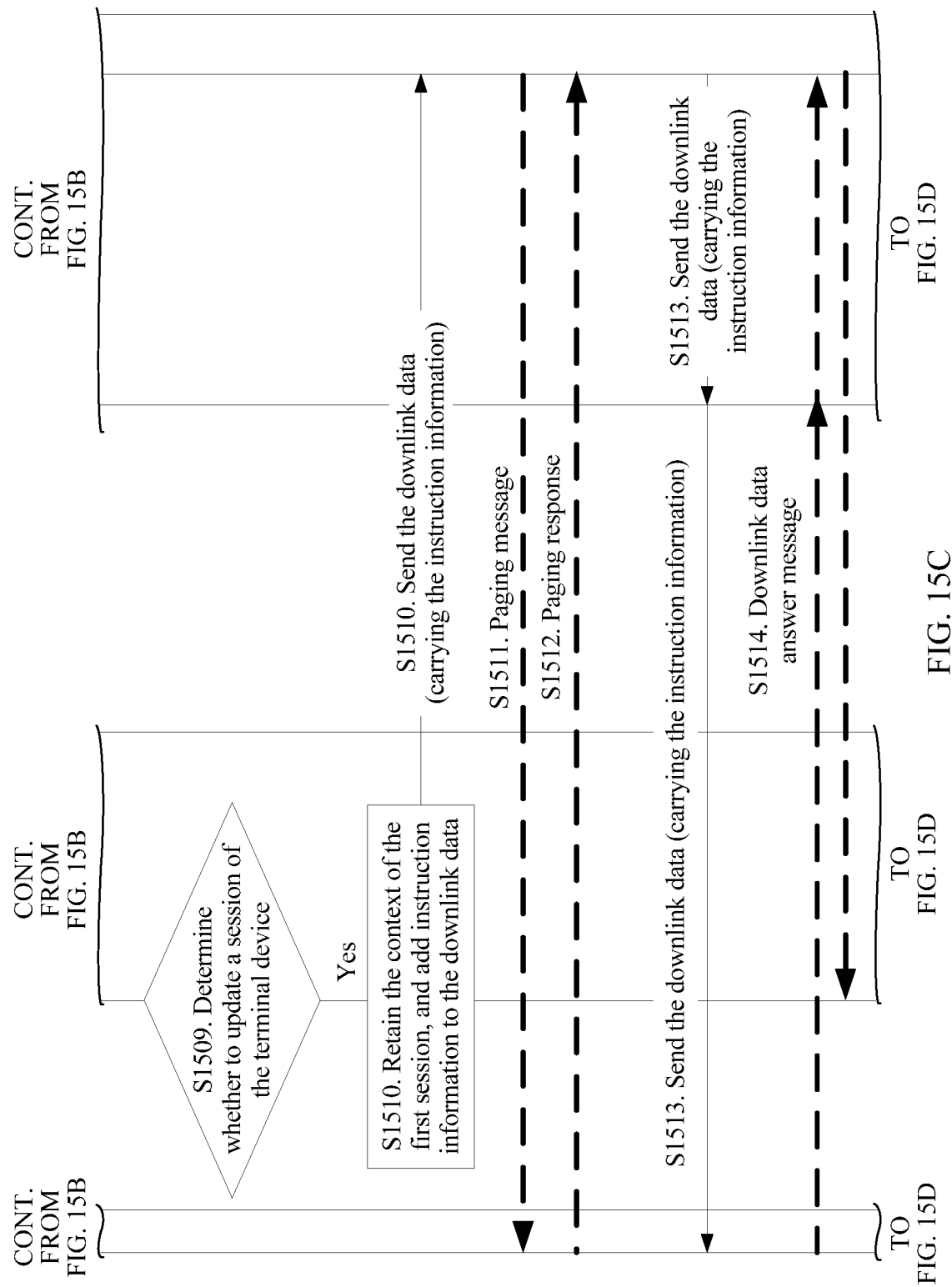
Figure 15D:
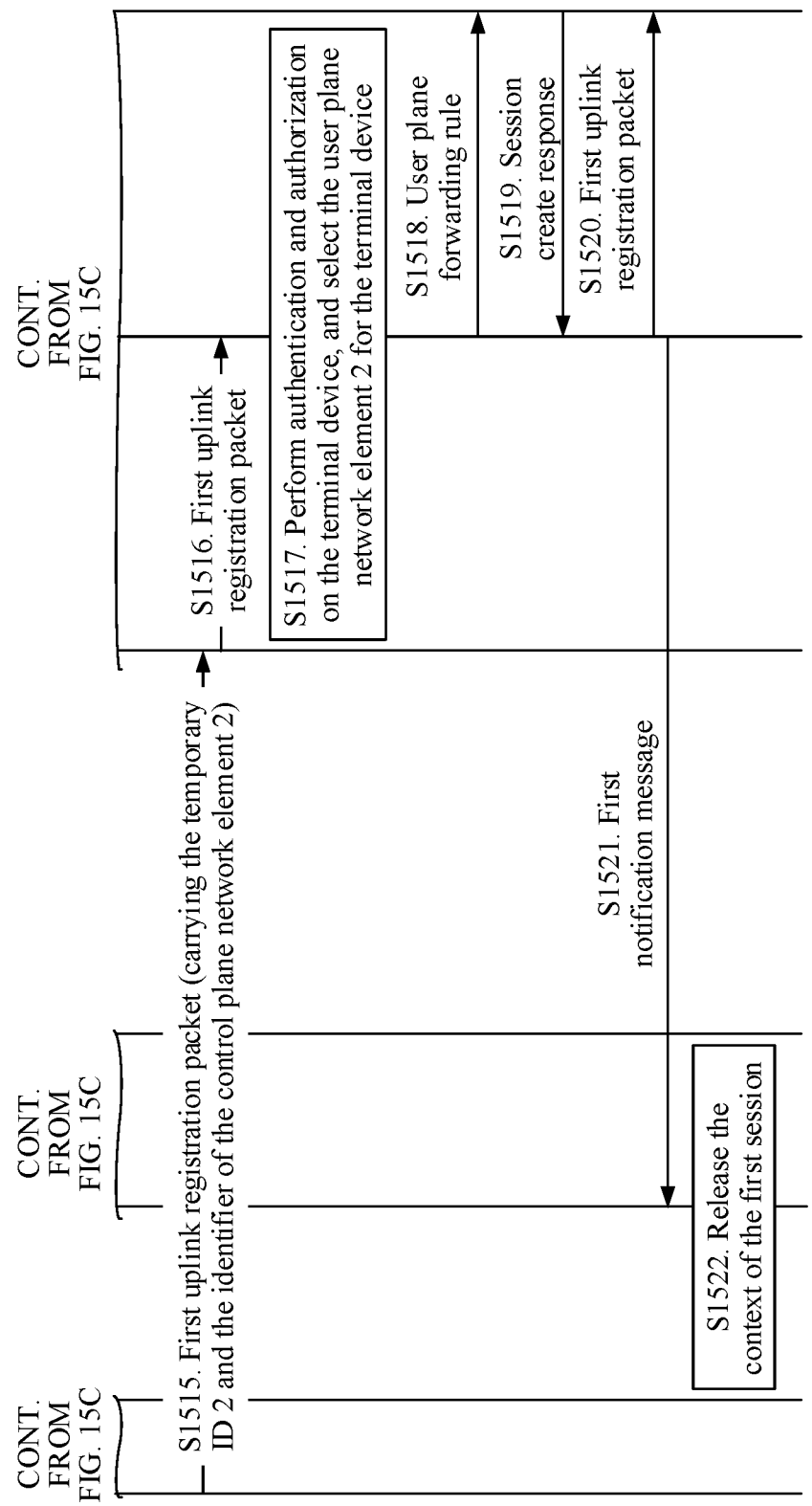

In a scenario in which a mobility management function entity and a session management function entity are integrated into a same device, FIG. 12A, FIG. 12B, and FIG. 12C show a session migration method corresponding to the embodiment shown in FIG. 6A, FIG. 6B, FIG. 6C, and FIG. 6D.

Referring to FIG. 12A, FIG. 12B, and FIG. 12C, the session migration method includes the following operations.

S1200. Create a first session between a terminal device and a control plane network element 1.

Herein, a service area of the control plane network element 1 includes a first TA, and the control plane network element 1 stores a context of the first session.

S1201. The terminal device sends a first request message to a base station 2 after moving from the first TA to a second TA.

The first request message carries an identifier of the first TA, a DNN, an identifier of the control plane network element 1, and a temporary ID 1 of the terminal device.

S1202. The base station 2 forwards the first request message in S1201 to a control plane network element 2.

S1203. The control plane network element 2 sends a second request message to the control plane network element 1, to request to obtain a context of the terminal device.

The second request message carries an identifier of the control plane network element 2 and the temporary ID 1, and the context of the terminal device includes a mobility management context and a session management context.

S1204. The control plane network element 1 determines, based on the identifier of the control plane network element 2, whether to update a session of the terminal device.

S1205. If the control plane network element 1 determines to update a session of the terminal device, the control plane network element 1 retains the context of the first session, and sends, to the control plane network element 2, a third response message that carries instruction information, the identifier of the control plane network element 1, the context (including the mobility management context and the session management context) of the terminal device, and a permanent identifier of the terminal device.

S1206. The control plane network element 2 stores the identifier of the control plane network element 1 and the context of the terminal device, and allocates a temporary ID 2 to the terminal device.

S1207. The control plane network element 2 sends, to the base station 2, a second response message that carries the temporary ID 2 and the identifier of the control plane network element 2.

S1208. The base station 2 forwards the second response message in S1207 to the terminal device.

S1209. The terminal device sends, to the base station 2, an uplink data packet that carries the temporary ID 2 and the identifier of the control plane network element 2.

S1210. The base station 2 forwards the uplink data packet in S1209 to the control plane network element 2.

S1211. The control plane network element 2 performs authentication and authorization on the terminal device according to the instruction information by using the mobility management context of the terminal device, and selects a user plane network element 2 for the terminal device based on information such as subscription data of the terminal device and a data type of the uplink data packet.

S1212. The control plane network element 2 sends a user plane forwarding rule to the user plane network element 2, and creates a context of a second session.

S1213. The user plane network element 2 sends a session create response to the control plane network element 2.

After the control plane network element 2 receives the session create response, a creation process of the second session ends.

S1214. The control plane network element 2 forwards the uplink data packet received by the control plane network element 2 in S1210 to the user plane network element 2.

After the second session is created, the session migration method provided in this embodiment of this application further includes S1215 and S1216.

S1215. The control plane network element 2 sends a first notification message to the control plane network element 1, to instruct the control plane network element 1 to release the context of the first session.

S1216. The control plane network element 1 releases the context of the first session.

In this embodiment of this application, the control plane network element 2 may perform S1214 before S1215, or may perform S1215 before S1214, or may perform S1214 and S1215 simultaneously. This is not limited in this embodiment of this application.

For the procedure shown in FIG. 12A, FIG. 12B, and FIG. 12C, refer to the procedure shown in FIG. 6A, FIG. 6B, FIG. 6C, and FIG. 6D. Details are not described herein again.

In a scenario in which a mobility management function entity and a session management function entity are integrated into a same device, FIG. 13A, FIG. 13B, FIG. 13C, and FIG. 13D show a session migration method corresponding to the embodiment shown in FIG. 7A, FIG. 7B, FIG. 7C, and FIG. 7D.

Referring to FIG. 13A, FIG. 13B, FIG. 13C, and FIG. 13D, the session migration method includes the following operations.

S1300. Create a first session between a terminal device and a control plane network element 1.

Herein, a service area of the control plane network element 1 includes a first TA, and the control plane network element 1 stores a context of the first session.

S1301. The terminal device sends a first request message to a base station 2 after moving from the first TA to a second TA.

The first request message carries an identifier of the first TA, a DNN, an identifier of the control plane network element 1, and a temporary ID 1 of the terminal device.

S1302. The base station 2 forwards the first request message in S1301 to a control plane network element 2.

S1303. The control plane network element 2 sends a second request message to the control plane network element 1, to request to obtain a context of the terminal device.

The second request message carries an identifier of the control plane network element 2 and the temporary ID 1, and the context of the terminal device includes a mobility management context and a session management context.

S1304. The control plane network element 1 determines, based on the identifier of the control plane network element 2, whether to update a session of the terminal device.

S1305. If the control plane network element 1 determines that a session of the terminal device does not need to be updated temporarily, the control plane network element 1 retains the context of the first session, and sends, to the control plane network element 2, a third response message that carries the identifier of the control plane network element 1, the context (including the mobility management context and the session management context) of the terminal device, and a permanent identifier of the terminal device.

S1306. The control plane network element 2 stores the identifier of the control plane network element 1 and the context of the terminal device, and allocates a temporary ID 2 to the terminal device.

S1307. The control plane network element 2 sends, to the base station 2, a second response message that carries the temporary ID 2 and the identifier of the control plane network element 2.

S1308. The base station 2 forwards the second response message in S1307 to the terminal device.

After a preset time period elapses after the control plane network element 1 determines, in S1305, that a session of the terminal device does not need to be updated temporarily, the control plane network element 1 re-determines whether to update a session of the terminal device.

S1309. The control plane network element 1 determines whether to update a session of the terminal device.

In a process of performing S1309, the terminal device may send uplink data, and correspondingly, the control plane network element 1 receives the uplink data, and sends the uplink data received by the control plane network element 1 to a user plane network element 1. Then the control plane network element 1 receives an uplink data answer message sent by the user plane network element 1.

S1310. If the control plane network element 1 determines to update a session of the terminal device, the control plane network element 1 retains the context of the first session, adds instruction information to the received uplink data answer message, and sends, to the control plane network element 2, the uplink data answer message that carries the instruction information.

S1311. The control plane network element 2 sends the uplink data answer message to the base station 2.

S1312. The base station 2 forwards the uplink data answer message in S1311 to the terminal device.

S1313. The terminal device sends, to the base station 2, an uplink data packet that carries the temporary ID 2 and the identifier of the control plane network element 2.

S1314. The base station 2 forwards the uplink data packet in S1313 to the control plane network element 2.

S1315. The control plane network element 2 performs authentication and authorization on the terminal device according to the instruction information carried in the uplink data answer message received by the control plane network element 2 in S1310 and by using the mobility management context of the terminal device, and selects a user plane network element 2 for the terminal device based on information such as subscription data of the terminal device and a data type of the uplink data packet.

S1316. The control plane network element 2 sends a user plane forwarding rule to the user plane network element 2, and creates a context of a second session.

S1317. The user plane network element 2 sends a session create response to the control plane network element 2.

S1318. The control plane network element 2 sends the uplink data packet received by the control plane network element 2 in S1314 to the user plane network element 2.

After the control plane network element 2 receives the session create response, a creation process of the second session ends.

After the second session is created, the session migration method provided in this embodiment of this application further includes S1319 and S1320.

S1319. The control plane network element 2 sends a first notification message to the control plane network element 1, to instruct the control plane network element 1 to release the context of the first session.

S1320. The control plane network element 1 releases the context of the first session.

In this embodiment of this application, the control plane network element 2 may perform S1318 before S1319, or may perform S1319 before S1318, or may perform S1318 and S1319 simultaneously. This is not limited in this embodiment of this application.

For the procedure shown in FIG. 13A, FIG. 13B, FIG. 13C, and FIG. 13D, refer to the procedure shown in FIG. 7A, FIG. 7B, FIG. 7C, and FIG. 7D. Details are not described herein again.

In a scenario in which a mobility management function entity and a session management function entity are integrated into a same device, FIG. 14A, FIG. 14B, FIG. 14C, and FIG. 14D show a session migration method corresponding to the embodiment shown in FIG. 8A, FIG. 8B, FIG. 8C, and FIG. 8D.

Referring to FIG. 14A, FIG. 14B, FIG. 14C, and FIG. 14D, the session migration method includes the following operations.

S1400. Create a first session between a terminal device and a control plane network element 1.

Herein, a service area of the control plane network element 1 includes a first TA, and the control plane network element 1 stores a context of the first session.

S1401. The terminal device sends a first request message to a base station 2 after moving from the first TA to a second TA.

The first request message carries an identifier of the first TA, a DNN, an identifier of the control plane network element 1, and a temporary ID 1 of the terminal device.

S1402. The base station 2 forwards the first request message in S1401 to a control plane network element 2.

S1403. The control plane network element 2 sends a second request message to the control plane network element 1, to request to obtain a context of the terminal device.

The second request message carries an identifier of the control plane network element 2 and the temporary ID 1, and the context of the terminal device includes a mobility management context and a session management context.

S1404. The control plane network element 1 determines, based on the identifier of the control plane network element 2, whether to update a session of the terminal device.

S1405. If the control plane network element 1 determines that a session of the terminal device does not need to be updated temporarily, the control plane network element 1 retains the context of the first session, and sends, to the control plane network element 2, a third response message that carries the identifier of the control plane network element 1, the context (including the mobility management context and the session management context) of the terminal device, and a permanent identifier of the terminal device.

S1406. The control plane network element 2 stores the identifier of the control plane network element 1 and the context of the terminal device, and allocates a temporary ID 2 to the terminal device.

S1407. The control plane network element 2 sends, to the base station 2, a second response message that carries the temporary ID 2 and the identifier of the control plane network element 2.

S1408. The base station 2 forwards the second response message in S1407 to the terminal device.

After a preset time period elapses after the control plane network element 1 determines, in S1405, that a session of the terminal device does not need to be updated temporarily, the control plane network element 1 re-determines whether to update a session of the terminal device.

S1409. The control plane network element 1 determines whether to update a session of the terminal device.

In a process of performing S1409, the control plane network element 1 may receive downlink data to be sent to the terminal device. The downlink data is data sent by a user plane network element 1 to the control plane network element 1.

S1410. If the control plane network element 1 determines to update a session of the terminal device, the control plane network element 1 retains the context of the first session, adds instruction information to the received downlink data, and sends, to the control plane network element 2, the downlink data that carries the instruction information.

After receiving the downlink data that carries the instruction information, the control plane network element 2 sends, to the terminal device, the downlink data that carries the instruction information. In one embodiment, because the terminal device does not send uplink data after moving to the second TA, the terminal device may be in an idle mode or may be in a connected mode. For example, if the terminal device is in an idle mode, S1411 and S1412 are performed after S1410, and S1413 is performed after S1412; or if the terminal device is in a connected mode, S1413 is performed after S1410. S1411 and S1412 are optional, and therefore are represented by dashed lines in FIG. 14A, FIG. 14B, FIG. 14C, and FIG. 14D.

S1411. The control plane network element 2 sends a paging message to the terminal device.

S1412. The terminal device sends a paging response to the control plane network element 2.

S1413. The control plane network element 2 sends, to the base station 2, the downlink data that carries the instruction information, and the base station 2 forwards, to the terminal device, the downlink data that carries the instruction information.

S1414. The terminal device sends a downlink data answer message to the base station 2, the base station 2 forwards the downlink data answer message to the control plane network element 2, the control plane network element 2 forwards the downlink data answer message to the control plane network element 1, and the control plane network element 1 forwards the downlink data answer message to the user plane network element 1.

S1414 herein is an optional operation, and therefore is represented by a dashed line in FIG. 14A, FIG. 14B, FIG. 14C, and FIG. 14D.

S1415. The terminal device sends, to the base station 2 according to the instruction information carried in the downlink data received by the terminal device in S1413, a session create request that carries the DNN and session type information.

S1416. The base station 2 forwards the session create request in S1415 to the control plane network element 2.

S1417. The control plane network element 2 performs authentication and authorization on the terminal device based on the mobility management context of the terminal device, obtains session management subscription data of the terminal device based on the permanent identifier of the terminal device, and selects a user plane network element 2 for the terminal device based on the DNN and the session type information that are carried in the session create request in S1416 and subscription data of the terminal device that is locally stored on the control plane network element 2.

S1418. The control plane network element 2 sends a user plane forwarding rule to the user plane network element 2, and creates a context of a second session.

S1419. The control plane network element 2 sends a session create response to the base station 2, and the base station 2 sends the session create response to the terminal device.

After the terminal device receives the session create response, a creation process of the second session ends.

For example, after the second session is created, the session migration method provided in this embodiment of this application further includes S1420 and S1421.

S1420. The control plane network element 2 sends a first notification message to the control plane network element 1, to instruct the control plane network element 1 to release the context of the first session.

S1421. The control plane network element 1 releases the context of the first session.

Further, a session migration process in this embodiment occurs due to downlink data. Therefore, after S1419 in this embodiment, the terminal device further sends a second uplink registration packet to the control plane network element 2. After receiving the second uplink registration packet, the control plane network element 2 forwards the second uplink registration packet to the user plane network element 2. The user plane network element 2 forwards the second uplink registration packet to an application server, so that the application server updates a forwarding path that is of downlink data to be sent to the terminal device and that is stored on the application server. This process is not shown in FIG. 14A, FIG. 14B, FIG. 14C, and FIG. 14D.

For the procedure shown in FIG. 14A, FIG. 14B, FIG. 14C, and FIG. 14D, refer to the procedure shown in FIG. 8A, FIG. 8B, FIG. 8C, and FIG. 8D. Details are not described herein again.

In a scenario in which a mobility management function entity and a session management function entity are integrated into a same device, FIG. 15A, FIG. 15B, FIG. 15C, and FIG. 15D show a session migration method corresponding to the embodiment shown in FIG. 9A, FIG. 9B, FIG. 9C, and FIG. 9D.

Referring to FIG. 15A, FIG. 15B, FIG. 15C, and FIG. 15D, the session migration method includes the following operations.

S1500. Create a first session between a terminal device and a control plane network element 1.

Herein, a service area of the control plane network element 1 includes a first TA, and the control plane network element 1 stores a context of the first session.

S1501. The terminal device sends a first request message to a base station 2 after moving from the first TA to a second TA.

The first request message carries an identifier of the first TA, a DNN, an identifier of the control plane network element 1, and a temporary ID 1 of the terminal device.

S1502. The base station 2 forwards the first request message in S1501 to a control plane network element 2.

S1503. The control plane network element 2 sends a second request message to the control plane network element 1, to request to obtain a context of the terminal device.

The second request message carries an identifier of the control plane network element 2 and the temporary ID 1, and the context of the terminal device includes a mobility management context and a session management context.

S1504. The control plane network element 1 determines, based on the identifier of the control plane network element 2, whether to update a session of the terminal device.

S1505. If the control plane network element 1 determines that a session of the terminal device does not need to be updated temporarily, the control plane network element 1 retains the context of the first session, and sends, to the control plane network element 2, a third response message that carries the identifier of the control plane network element 1, the context (including the mobility management context and the session management context) of the terminal device, and a permanent identifier of the terminal device.

S1506. The control plane network element 2 stores the identifier of the control plane network element 1 and the context of the terminal device, and allocates a temporary ID 2 to the terminal device.

S1507. The control plane network element 2 sends, to the base station 2, a second response message that carries the temporary ID 2 and the identifier of the control plane network element 2.

S1508. The base station 2 forwards the second response message in S1507 to the terminal device.

After a preset time period elapses after the control plane network element 1 determines, in S1505, that a session of the terminal device does not need to be updated temporarily, the control plane network element 1 re-determines whether to update a session of the terminal device.

S1509. The control plane network element 1 determines whether to update a session of the terminal device.

In a process of performing S1509, the control plane network element 1 may continue to receive downlink data to be sent to the terminal device. The downlink data is data sent by a user plane network element 1 to the control plane network element 1.

S1510. If the control plane network element 1 determines to update a session of the terminal device, the control plane network element 1 retains the context of the first session, adds instruction information to the received downlink data, and sends, to the control plane network element 2, the downlink data that carries the instruction information.

After receiving the downlink data that carries the instruction information, the control plane network element 2 sends, to the terminal device, the downlink data that carries the instruction information. In one embodiment, because the terminal device does not send uplink data after moving to the second TA, the terminal device may be in an idle mode or may be in a connected mode. For example, if the terminal device is in an idle mode, S1511 and S1512 are performed after S1510, and S1513 is performed after S1512; or if the terminal device is in a connected mode, S1513 is performed after S1510. S1511 and S1512 are optional, and therefore are represented by dashed lines in FIG. 15A, FIG. 15B, FIG. 15C, and FIG. 15D.

S1511. The control plane network element 2 sends a paging message to the terminal device.

S1512. The terminal device sends a paging response to the control plane network element 2.

S1513. The control plane network element 2 sends, to the base station 2, the downlink data that carries the instruction information, and the base station 2 forwards, to the terminal device, the downlink data that carries the instruction information.

S1514. The terminal device sends a downlink data answer message to the base station 2, the base station 2 forwards the downlink data answer message to the control plane network element 2, the control plane network element 2 forwards the downlink data answer message to the control plane network element 1, and the control plane network element 1 forwards the downlink data answer message to the user plane network element 1.

S1514 herein is an optional operation, and therefore is represented by a dashed line in FIG. 15A, FIG. 15B, FIG. 15C, and FIG. 15D.

S1515. The terminal device sends, to the base station 2 according to the instruction information carried in the downlink data received by the terminal device in S1513, a first uplink registration packet that carries the temporary ID 2 and the identifier of the control plane network element 2.

S1516. The base station 2 forwards the first uplink registration packet in S1515 to the control plane network element 2.

S1517. After receiving the first uplink registration packet, the control plane network element 2 performs authentication and authorization on the terminal device based on the mobility management context of the terminal device, and selects a user plane network element 2 for the terminal device based on information such as subscription data of the terminal device and a data type of the first uplink registration packet.

S1518. The control plane network element 2 sends a user plane forwarding rule to the user plane network element 2, and creates a context of a second session.

S1519. The user plane network element 2 sends a session create response to the control plane network element 2.

After the control plane network element 2 receives the session create response, a creation process of the second session ends.

S1520. The control plane network element 2 sends the first uplink registration packet received by the control plane network element 2 in S1517 to the user plane network element 2.

After the second session is created, the session migration method provided in this embodiment of this application further includes S1521 and S1522.

S1521. The control plane network element 2 sends a first notification message to the control plane network element 1, to instruct the control plane network element 1 to release the context of the first session.

S1522. The control plane network element 1 releases the context of the first session.

For the procedure shown in FIG. 15A, FIG. 15B, FIG. 15C, and FIG. 15D, refer to the procedure shown in FIG. 9A, FIG. 9B, FIG. 9C, and FIG. 9D. Details are not described herein again.

In conclusion, the control plane network element 1 retains the context of the first session before the second session is created in the embodiment shown in any one of FIG. 10A, FIG. 10B, and FIG. 10C to FIG. 15A, FIG. 15B, FIG. 15C, and FIG. 15D. Therefore, even if there is downlink data to be sent to the terminal device, the downlink data can be accurately sent to the terminal device, so that no packet loss occurs in the downlink data. In addition, the second session is created after the to-be-sent data of the terminal device is obtained. Therefore, a case in which the second session is created but no data is transmitted does not occur, so that waste of core network resources and unnecessary signaling transmission are reduced.

In addition, in the embodiment shown in FIG. 12A, FIG. 12B, and FIG. 12C or FIG. 13A, FIG. 13B, FIG. 13C, and FIG. 13D, the terminal device is unaware of a session migration procedure, so that signaling transmission of the terminal device is further reduced.

An embodiment of this application provides a session management function entity, and the session management function entity is configured to perform the operations performed by the source session management function entity in the foregoing session migration method. The session management function entity provided in this embodiment of this application may include modules corresponding to the corresponding operations.

In the embodiments of this application, the session management function entity may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software functional module. In the embodiments of this application, module division is an example, and is merely logical function division. There may be another division manner in actual implementation.

Figure 16:
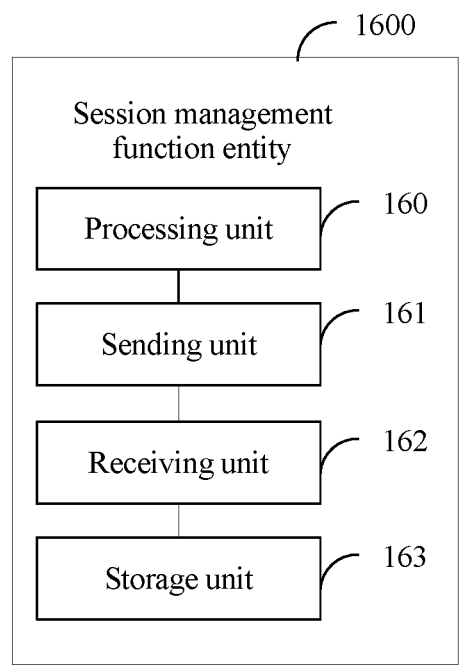
FIG. 16 is a schematic structural diagram 1 of a session management function entity according to an embodiment of this application.

When functional modules corresponding to various functions are obtained through division, FIG. 16 is a possible schematic structural diagram of the session management function entity in the foregoing embodiment. As shown in FIG. 16, a session management function entity 1600 includes a processing unit 160, a sending unit 161, and a receiving unit 162. The processing unit 160 is configured to support the session management function entity 1600 in performing S301, S302, S405, S406, S419, S505, S506, S511, S523, S605, S606, S620, S705, S706, S711, S724, S805, S806, S811, S812, S826, S911, S912, S927, and the like in the foregoing embodiments, and/or is used for another process of the technology described in this specification. The sending unit 161 is configured to support the session management function entity 1600 in performing S302a, S302b, S406, S506, S606, S706, S712, S806, S812, S906, S912, and the like in the foregoing embodiments, and/or is used for another process of the technology described in this specification. The receiving unit 162 is configured to support the session management function entity 1600 in performing S304, S404, S418, S504, S522, S604, S619, S704, S723, S804, S825, S904, S926, and the like in the foregoing embodiments, and/or is used for another process of the technology described in this specification. All related content of steps or operations in the foregoing method embodiments may be cited in function descriptions of corresponding functional modules, and details are not described herein again. Certainly, the session management function entity 1600 provided in this embodiment of this application includes but is not limited to the foregoing modules. For example, the session management function entity 1600 may further include a storage unit 163. The storage unit 163 may be configured to store a context of a first session, and may also be configured to store program code and data of the session management function entity.

When an integrated unit is used, the processing unit 160 in this embodiment of this application may be a processor or a controller, for example, a central processing unit (CPU) or a digital signal processor (DSP). The processing unit 160 may implement or execute various example logical blocks, modules, and circuits described with reference to content disclosed in this application. Alternatively, the processing unit 160 may be a combination that implements a computing function, for example, a combination that includes one or more microprocessors, or a combination of a DSP and a microprocessor. The sending unit 161 and the receiving unit 162 may be integrated into one communications unit for implementation. The communications unit may be a communications interface. The storage unit 163 may be a memory.

Figure 17:
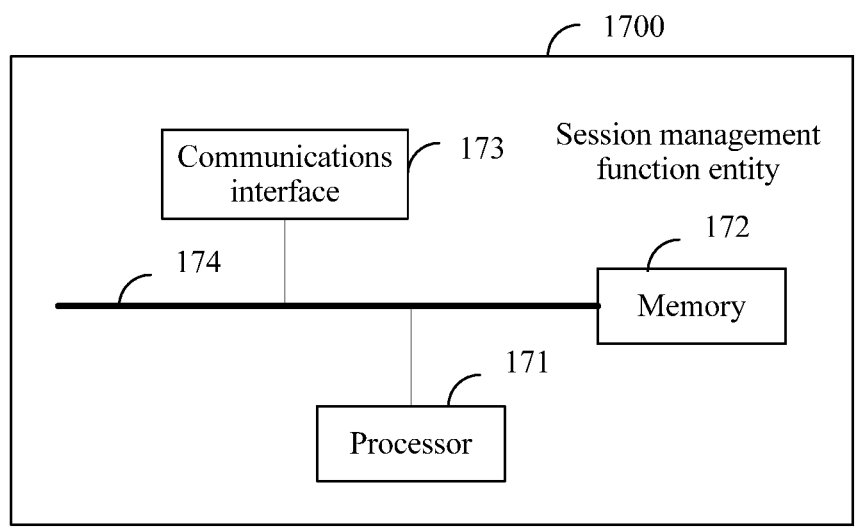
FIG. 17 is a schematic structural diagram 2 of a session management function entity according to an embodiment of this application.

When the processing unit is a processor, the storage unit is a memory, and the communications unit is a communications interface, the session management function entity 1600 in this embodiment of this application may be a session management function entity 1700 shown in FIG. 17. As shown in FIG. 17, the session management function entity 1700 includes a processor 171, a memory 172, and a communications interface 173. The processor 171, the memory 172, and the communications interface 173 are connected to each other by using a bus 174.

The bus 174 may be an industry standard architecture (ISA) bus, a peripheral component interconnect (PCI) bus, an extended industry standard architecture (EISA) bus, or the like. The bus 174 may be classified into an address bus, a data bus, a control bus, and the like. For ease of representation, only one thick line is used to represent the bus in FIG. 17, but this does not mean that there is only one bus or only one type of bus.

For example, the session management function entity 1700 may include one or more processors 171, in other words, the session management function entity 1700 may include a multi-core processor.

When the session management function entity 1700 runs, the session management function entity 1700 performs the session migration method in the embodiment shown in any one of FIG. 3 to FIG. 9A, FIG. 9B, FIG. 9C, and FIG. 9D.

For a session migration method, refer to related descriptions in the embodiment shown in any one of FIG. 3 to FIG. 9A, FIG. 9B, FIG. 9C, and FIG. 9D. Details are not described herein again.

Another embodiment of this application further provides a computer readable storage medium, the computer readable storage medium includes one or more pieces of program code, and the one or more programs include an instruction. When the processor 171 in the session management function entity 1700 executes the program code, the session management function entity 1700 performs the session migration method shown in any one of FIG. 3 to FIG. 9A, FIG. 9B, FIG. 9C, and FIG. 9D.

Another embodiment of this application further provides a computer program product, the computer program product includes a computer executable instruction, and the computer executable instruction is stored in a computer readable storage medium. At least one processor in a session management function entity may read the computer executable instruction from the computer readable storage medium, and the at least one processor executes the computer executable instruction, so that the session management function entity performs the operations of SM 2 in the session migration method shown in any one of FIG. 3 to FIG. 9A, FIG. 9B, FIG. 9C, and FIG. 9D.

An embodiment of this application provides a terminal device, and the terminal device is configured to perform the operations performed by the terminal device in the foregoing session migration method. The terminal device provided in this embodiment of this application may include modules corresponding to the corresponding operations.

In the embodiments of this application, the terminal device may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software functional module. In the embodiments of this application, module division is an example, and is merely logical function division. There may be another division manner in actual implementation.

Figure 18:
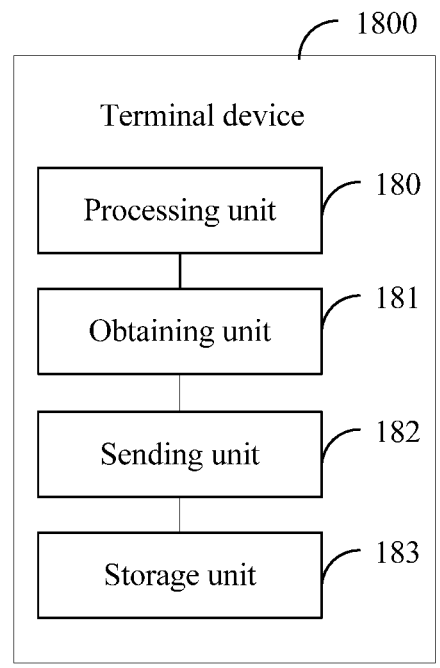
FIG. 18 is a schematic structural diagram 1 of a terminal device according to an embodiment of this application.

When functional modules corresponding to various functions are obtained through division, FIG. 18 is a possible schematic structural diagram of the terminal device in the foregoing embodiment. As shown in FIG. 18, a terminal device 1800 includes a processing unit 180, an obtaining unit 181, and a sending unit 182. The processing unit 180 is configured to support the terminal device 1800 in performing S300, S400, S500, S600, S700, S800, S900, and the like in the foregoing embodiments, and/or is used for another process of the technology described in this specification. The obtaining unit 181 is configured to support the terminal device 1800 in performing S410, S510, S610, S710, S714, S810, S813, S816, S824, S910, S913, S916, and the like in the foregoing embodiments, and/or is used for another process of the technology described in this specification. The sending unit 182 is configured to support the terminal device 1800 in performing S401, S411, S501, S515, S601, S611, S701, S715, S801, S814, S818, S901, S914, S918, and the like in the foregoing embodiments, and/or is used for another process of the technology described in this specification. All related content of steps or operations in the foregoing method embodiments may be cited in function descriptions of corresponding functional modules, and details are not described herein again. Certainly, the terminal device 1800 provided in this embodiment of this application includes but is not limited to the foregoing modules. For example, the terminal device 1800 may further include a storage unit 183. The storage unit 183 is configured to store program code and data of the terminal device.

When an integrated unit is used, the processing unit 180 in this embodiment of this application may be a processor or a controller, for example, a CPU or a DSP. The processing unit 180 may implement or execute various example logical blocks, modules, and circuits described with reference to content disclosed in this application. Alternatively, the processing unit 180 may be a combination that implements a computing function, for example, a combination that includes one or more microprocessors, or a combination of a DSP and a microprocessor. The obtaining unit 181 and the sending unit 182 may be integrated into one communications unit for implementation. The communications unit may be a communications interface. The storage unit 183 may be a memory.

Figure 19:
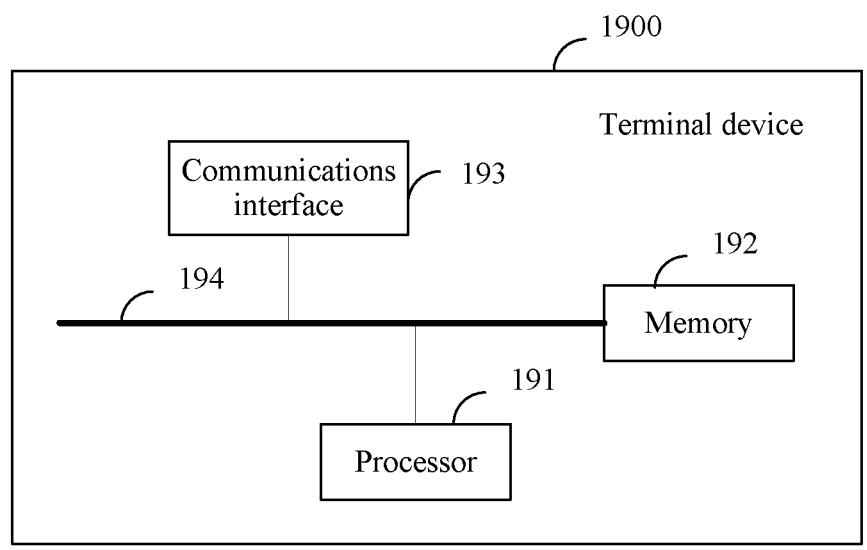
FIG. 19 is a schematic structural diagram 2 of a terminal device according to an embodiment of this application.

When the processing unit is a processor, the storage unit is a memory, and the communications unit is a communications interface, the terminal device 1800 in this embodiment of this application may be a terminal device 1900 shown in FIG. 19. As shown in FIG. 19, the terminal device 1900 includes a processor 191, a memory 192, and a communications interface 193. The processor 191, the memory 192, and the communications interface 193 are connected to each other by using a bus 194.

The bus 194 may be a PCI bus, an EISA bus, or the like. The bus 194 may be classified into an address bus, a data bus, a control bus, and the like. For ease of representation, only one thick line is used to represent the bus in FIG. 19, but this does not mean that there is only one bus or only one type of bus.

For example, the terminal device 1900 may include one or more processors 191, in other words, the terminal device 1900 may include a multi-core processor.

When the terminal device 1900 runs, the terminal device 1900 performs the session migration method in the embodiment shown in any one of FIG. 3 to FIG. 9A, FIG. 9B, FIG. 9C, and FIG. 9D. For a session migration method, refer to related descriptions in the embodiment shown in any one of FIG. 3 to FIG. 9A, FIG. 9B, FIG. 9C, and FIG. 9D. Details are not described herein again.

Another embodiment of this application further provides a computer readable storage medium, the computer readable storage medium includes one or more pieces of program code, and the one or more programs include an instruction. When the processor 191 in the terminal device 1900 executes the program code, the terminal device 1900 performs the session migration method shown in any one of FIG. 3 to FIG. 9A, FIG. 9B, FIG. 9C, and FIG. 9D.

Another embodiment of this application further provides a computer program product, the computer program product includes a computer executable instruction, and the computer executable instruction is stored in a computer readable storage medium. At least one processor in a terminal device may read the computer executable instruction from the computer readable storage medium, and the at least one processor executes the computer executable instruction, so that the terminal device performs the operations of SM 2 in the session migration method shown in any one of FIG. 3 to FIG. 9A, FIG. 9B, FIG. 9C, and FIG. 9D.

An embodiment of this application provides a mobility management function entity, and the mobility management function entity is configured to perform the operations performed by the target mobility management function entity in the foregoing session migration method. The mobility management function entity provided in this embodiment of this application may include modules corresponding to the corresponding operations.

In the embodiments of this application, the mobility management function entity may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software functional module. In the embodiments of this application, module division is an example, and is merely logical function division. There may be another division manner in actual implementation.

Figure 20:
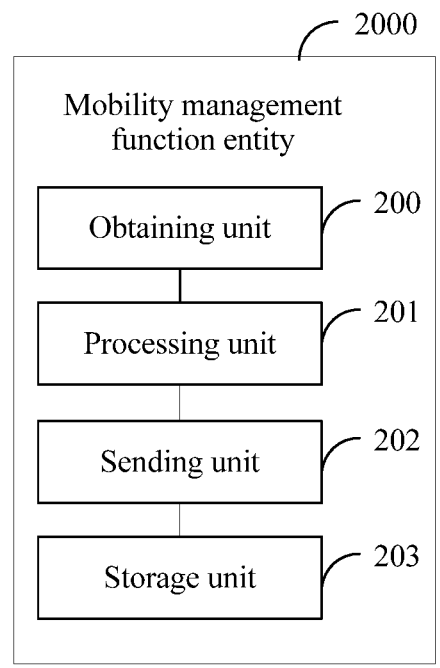
FIG. 20 is a schematic structural diagram 1 of a mobility management function entity according to an embodiment of this application.

When functional modules corresponding to various functions are obtained through division, FIG. 20 is a possible schematic structural diagram of the mobility management function entity in the foregoing embodiment. As shown in FIG. 20, a mobility management function entity 2000 includes an obtaining unit 200, a processing unit 201, and a sending unit 202. The obtaining unit 200 is configured to support the mobility management function entity 2000 in performing S402, S407, S412, S417, S502, S507, S516, S521, S602, S612, S617, and the like in the foregoing embodiments, and/or is used for another process of the technology described in this specification. The processing unit 201 is configured to support the mobility management function entity 2000 in performing S408, S413, S508, S517, S608, S613, and the like in the foregoing embodiments, and/or is used for another process of the technology described in this specification. The sending unit 202 is configured to support the mobility management function entity 2000 in performing S403, S409, S414, S503, S509, S513, S603, S609, S614, and the like in the foregoing embodiments, and/or is used for another process of the technology described in this specification. All related content of operations in the foregoing method embodiments may be cited in function descriptions of corresponding functional modules, and details are not described herein again. Certainly, the mobility management function entity 2000 provided in this embodiment of this application includes but is not limited to the foregoing modules. For example, the mobility management function entity 2000 may further include a storage unit 203. The storage unit 203 may be configured to store a mobility management context of a terminal device, and may also be configured to store program code and data of the mobility management function entity.

When an integrated unit is used, the processing unit 201 in this embodiment of this application may be a processor or a controller, for example, a CPU or a DSP. The processing unit 201 may implement or execute various example logical blocks, modules, and circuits described with reference to content disclosed in this application. Alternatively, the processing unit 201 may be a combination that implements a computing function, for example, a combination that includes one or more microprocessors, or a combination of a DSP and a microprocessor. The obtaining unit 201 and the sending unit 202 may be integrated into one communications unit for implementation. The communications unit may be a communications interface. The storage unit 203 may be a memory.

Figure 21:
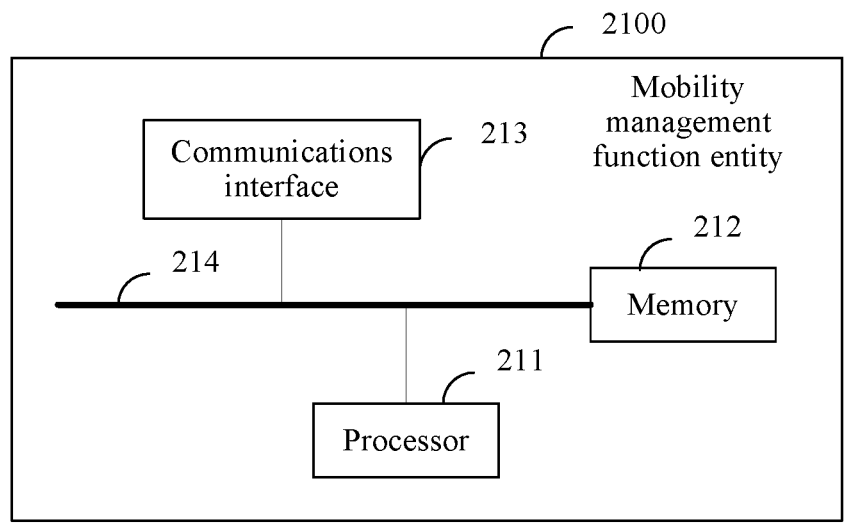
FIG. 21 is a schematic structural diagram 2 of a mobility management function entity according to an embodiment of this application.

When the processing unit is a processor, the storage unit is a memory, and the communications unit is a communications interface, the mobility management function entity 2000 in this embodiment of this application may be a mobility management function entity 2100 shown in FIG. 21. As shown in FIG. 21, the mobility management function entity 2100 includes a processor 211, a memory 212, and a communications interface 213. The processor 211, the memory 212, and the communications interface 213 are connected to each other by using a bus 214.

The bus 214 may be a PCI bus, an EISA bus, or the like. The bus 214 may be classified into an address bus, a data bus, a control bus, and the like. For ease of representation, only one thick line is used to represent the bus in FIG. 21, but this does not mean that there is only one bus or only one type of bus.

For example, the mobility management function entity 2100 may include one or more processors 211, in other words, the mobility management function entity 2100 may include a multi-core processor.

When the mobility management function entity 2100 runs, the mobility management function entity 2100 performs the session migration method in the embodiment shown in any one of FIG. 3 to FIG. 9A, FIG. 9B, FIG. 9C, and FIG. 9D. For a session migration method, refer to related descriptions in the embodiment shown in any one of FIG. 3 to FIG. 9A, FIG. 9B, FIG. 9C, and FIG. 9D. Details are not described herein again.

Another embodiment of this application further provides a computer readable storage medium, the computer readable storage medium includes one or more pieces of program code, and the one or more programs include an instruction. When the processor 211 in the mobility management function entity 2100 executes the program code, the mobility management function entity 2100 performs the session migration method shown in any one of FIG. 3 to FIG. 9A, FIG. 9B, FIG. 9C, and FIG. 9D.

Another embodiment of this application further provides a computer program product, the computer program product includes a computer executable instruction, and the computer executable instruction is stored in a computer readable storage medium. At least one processor in a mobility management function entity may read the computer executable instruction from the computer readable storage medium, and the at least one processor executes the computer executable instruction, so that the mobility management function entity performs the operations of MM 2 in the session migration method shown in any one of FIG. 3 to FIG. 9A, FIG. 9B, FIG. 9C, and FIG. 9D.

The foregoing descriptions about implementations allow a person skilled in the art to understand that, for the purpose of convenient and brief description, division of the foregoing functional modules is used as an example for illustration. In actual application, the foregoing functions may be allocated to different functional modules and implemented as required, in other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps or operations of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A session migration method comprising:
   creating, by a terminal device, a first session between the terminal device and a source session management function entity, wherein a service area of the source session management function entity comprises a first tracking area (TA);
   sending, by the terminal device, a first request message to a target mobility management function (MMF) entity;
   after moving from the first TA to a second TA, receiving, by the terminal device from the target (MMF) entity, a second response message that carries instruction information; and
   sending, by the terminal device, information used to trigger creation of a second session to the target (MMF) entity according to the instruction information, wherein the second session is a session between a target session management function entity and the terminal device, and both a service area of the target (MMF) entity and a service area of the target session management function entity comprise the second TA.

2. The method according to claim 1, wherein the information used to trigger the creation of the second session is a session create request; and
   the sending, by the terminal device, the information used to trigger creation of a second session to a target mobility management function (MMF) entity according to the instruction information comprises:
   sending, by the terminal device, the session create request to the target (MMF) entity according to the instruction information after obtaining to-be-sent data of the terminal device.

3. The method according to claim 1, wherein the the instruction information comprises:
   an uplink data answer message that carries the instruction information.

4. The method according to claim 3, wherein the information used to trigger the creation of the second session is a session create request; and
   the sending, by the terminal device, the information used to trigger creation of a second session to a target (MMF) entity according to the instruction information comprises:
   sending, by the terminal device, the session create request to the target (MMF) entity according to the instruction information after obtaining to-be-sent data of the terminal device.

5. The method according to claim 1, wherein the instruction information comprises:
   downlink data that carries the instruction information.

6. The method according to claim 5, wherein the information used to trigger creation of the second session is a session create request or a first uplink registration packet; and
   the sending, by the terminal device, the information used to trigger creation of a second session to the target (MMF) entity according to the instruction information comprises:
   after receiving the instruction information, sending, by the terminal device, the session create request or the first uplink registration packet to the target (MMF) entity.

7. The method according to claim 6, further comprising:
   sending, by the terminal device, a second uplink registration packet to the target (MMF) entity, wherein the second uplink registration packet is used to instruct the target (MMF) entity to instruct an application server to update a downlink transmission path, and the downlink transmission path is a path used to transmit downlink data to be sent to the terminal device.

8. An apparatus comprising:
   an interface;
   a processor; and
   a non-transitory computer-readable storage medium storing a program to be executed by the processor, the program including instructions to:
   create a first session between a terminal device and a source session management function entity, wherein a service area of the source session management function entity comprises a first tracking area (TA);
   sending a first request message to a target mobility management function (MMF) entity;
   after the terminal device moves from the first TA to a second TA, receiving, from the target (MMF) entity, a second response message that carries instruction information; and
   send information used to trigger creation of a second session to the target MMF entity according to instruction information obtained by an obtaining unit, wherein the second session is a session between a target session management function entity and the terminal device, and both a service area of the target MMF entity and a service area of the target session management function entity comprise the second TA.

9. The apparatus according to claim 8, wherein the information used to trigger creation of the second session is a session create request, the program further comprises instructions to send the session create request to the target (MMF) entity according to the instruction information after to-be-sent data of the terminal device is obtained.

10. The apparatus according to claim 8, wherein the program further comprises instructions to receive, from the target (MMF) entity, an uplink data answer message that carries the instruction information.

11. The apparatus according to claim 10, wherein the information used to trigger creation of the second session is a session create request, the program further comprises instructions to send the session create request to the target (MMF) entity according to the instruction information after to-be-sent data of the terminal device is obtained.

12. The apparatus according to claim 8, wherein the program further comprises instructions to:
   receive downlink data that carries the instruction information, and the information used to trigger creation of the second session is a session create request or a first uplink registration packet; and
   send the session create request or the first uplink registration packet to the target (MMF) entity.

13. The apparatus according to claim 12, wherein the program further comprises instructions to:
   send a second uplink registration packet to the target (MMF) entity, wherein the second registration packet is used to instruct the target (MMF) entity to instruct an application server to update a downlink transmission path, and the downlink transmission path is a path used to transmit downlink data to be sent to the terminal device.

14. The apparatus according to claim 8, wherein the apparatus comprises the terminal device.

15. A non-transitory computer-readable medium storing computer instructions for execution by one or more processors, wherein the computer instructions instruct the one or more processors to perform operations comprising:
   creating a first session between a terminal device and a source session management function entity, wherein a service area of the source session management function entity comprises a first tracking area (TA);
   sending a first request message to a target mobility management function (MMF) entity;
   after moving from the first TA to a second TA, receiving, from the target (MMF) entity, a second response message that carries instruction information; and
   sending information used to trigger creation of a second session to the target (MMF) entity according to the instruction information, wherein the second session is a session between a target session management function entity and the terminal device, and both a service area of the target (MMF) entity and a service area of the target session management function entity comprise the second TA.

16. The computer-readable medium according to claim 15, wherein the information used to trigger creation of the second session is a session create request, further comprising operations to send the session create request to the target (MMF) entity according to the instruction information after to-be-sent data of the terminal device is obtained.

17. The computer-readable medium according to claim 15, further comprising operations to receive, from the target (MMF) entity, an uplink data answer message that carries the instruction information.

* * * * *